(12) United States Patent
Minano et al.

(10) Patent No.: US 8,419,232 B2
(45) Date of Patent: Apr. 16, 2013

(54) FREE-FORM LENTICULAR OPTICAL ELEMENTS AND THEIR APPLICATION TO CONDENSERS AND HEADLAMPS

(75) Inventors: Juan Carlos Minano, Madrid (ES); Pablo Benitez, Madrid (ES); Maikel Hernandez, Madrid (ES); Jose Blen, Madrid (ES); Ruben Mohedano, Madrid (ES); Oliver Dross, Madrid (ES)

(73) Assignee: Light Prescriptions Innovators, LLC, Altadena, CA (US)

( * ) Notice: Subject to any disclaimer, the term of this patent is extended or adjusted under 35 U.S.C. 154(b) by 452 days.

(21) Appl. No.: 11/997,142

(22) PCT Filed: Jul. 28, 2006

(86) PCT No.: PCT/US2006/029464
§ 371 (c)(1),
(2), (4) Date: Jun. 30, 2008

(87) PCT Pub. No.: WO2007/016363
PCT Pub. Date: Feb. 8, 2007

(65) Prior Publication Data
US 2008/0316761 A1    Dec. 25, 2008

Related U.S. Application Data

(60) Provisional application No. 60/776,596, filed on Feb. 24, 2006, provisional application No. 60/703,667, filed on Jul. 28, 2005.

(51) Int. Cl.
*F21V 5/00* (2006.01)
(52) U.S. Cl.
USPC .......................... 362/328; 362/299; 362/300

(58) Field of Classification Search ............. 362/249.02, 362/297–300, 311.11–311.02, 326–329, 362/545, 800
See application file for complete search history.

(56) References Cited

U.S. PATENT DOCUMENTS

| | | | |
|---|---|---|---|
| 1,399,973 | A | 12/1921 | Limpert |
| 2,254,961 | A | 9/1941 | Harris |
| 2,362,176 | A | 11/1944 | Swanson |
| 2,908,197 | A | 10/1959 | Wells et al. |
| 3,746,853 | A | 7/1973 | Kosman et al. |
| 3,760,237 | A | 9/1973 | Jaffe |

(Continued)

FOREIGN PATENT DOCUMENTS

| | | |
|---|---|---|
| EP | 0450560 A2 | 10/1991 |
| EP | 0563874 | 10/1993 |

(Continued)

OTHER PUBLICATIONS

*International Search Report*, PCT/US03/38024, W004051223, mail date Nov. 10, 2004.

(Continued)

*Primary Examiner* — Jason Moon Han
(74) *Attorney, Agent, or Firm* — Drinker Biddle & Reath LLP

(57) ABSTRACT

Some embodiments provide an illumination optical system. The optical system can include a first surface and a second surface. Each of the first and second surfaces can further comprises a multiplicity of corresponding Cartesian-oval lenticulations such that each lenticulation of the first surface focuses a source upon a corresponding lenticulation of the second surface and each lenticulation of the second surface focuses a target upon a corresponding lenticulation of the first surface.

24 Claims, 45 Drawing Sheets

U.S. PATENT DOCUMENTS

| | | |
|---|---|---|
| 3,774,021 A | 11/1973 | Johnson |
| 3,938,177 A | 2/1976 | Hansen et al. |
| 4,114,592 A | 9/1978 | Winston |
| 4,188,111 A | 2/1980 | Marvin |
| 4,192,994 A | 3/1980 | Kastner |
| 4,211,955 A | 7/1980 | Ray |
| 4,337,759 A | 7/1982 | Popovich et al. |
| 4,342,908 A | 8/1982 | Henningsen et al. |
| 4,350,412 A | 9/1982 | Steenblik et al. |
| 4,384,769 A | 5/1983 | Brei et al. |
| 4,388,673 A | 6/1983 | Maglica |
| 4,464,707 A | 8/1984 | Forrest |
| 4,638,343 A | 1/1987 | Althaus et al. |
| 4,675,725 A | 6/1987 | Parkyn |
| 4,683,348 A | 7/1987 | Pidgeon et al. |
| 4,698,730 A | 10/1987 | Sakai et al. |
| 4,709,312 A | 11/1987 | Heinisch et al. |
| 4,727,289 A | 2/1988 | Uchida |
| 4,727,457 A | 2/1988 | Thillays |
| 4,868,723 A | 9/1989 | Kobayashi |
| 4,920,404 A | 4/1990 | Shrimali et al. |
| 5,055,892 A | 10/1991 | Gardner et al. |
| 5,140,220 A | 8/1992 | Hasegawa |
| 5,153,780 A | 10/1992 | Jorgensen et al. |
| 5,302,778 A | 4/1994 | Maurinus |
| 5,335,157 A | 8/1994 | Lyons |
| 5,343,330 A | 8/1994 | Hoffman et al. |
| 5,404,282 A | 4/1995 | Klinke et al. |
| 5,404,869 A | 4/1995 | Parkyn, Jr. et al. |
| 5,438,453 A | 8/1995 | Kuga |
| 5,452,190 A | 9/1995 | Priesemuth |
| 5,453,877 A | 9/1995 | Gerbe et al. |
| 5,471,371 A | 11/1995 | Koppolu et al. |
| 5,528,474 A | 6/1996 | Roney et al. |
| 5,557,471 A | 9/1996 | Fernandez |
| 5,577,492 A | 11/1996 | Parkyn et al. |
| 5,580,142 A | 12/1996 | Kurematsu et al. |
| 5,594,526 A | 1/1997 | Mori |
| 5,600,487 A | 2/1997 | Kiyomoto et al. |
| 5,608,290 A | 3/1997 | Hutchisson et al. |
| 5,613,769 A | 3/1997 | Parkyn et al. |
| 5,655,830 A | 8/1997 | Ruskouski |
| 5,655,832 A | 8/1997 | Pelka et al. |
| 5,676,453 A | 10/1997 | Parkyn et al. |
| 5,699,186 A | 12/1997 | Richard |
| 5,757,557 A | 5/1998 | Medvedev |
| 5,777,433 A | 7/1998 | Lester et al. |
| 5,806,955 A | 9/1998 | Parkyn, Jr. et al. |
| 5,813,743 A | 9/1998 | Naka |
| 5,839,812 A | 11/1998 | Ge et al. |
| 5,865,529 A | 2/1999 | Yan |
| 5,894,195 A | 4/1999 | McDermott |
| 5,894,196 A | 4/1999 | McDermott |
| 5,897,201 A | 4/1999 | Simon |
| 5,898,267 A | 4/1999 | McDermott |
| 5,898,809 A | 4/1999 | Taboada et al. |
| 5,924,788 A | 7/1999 | Parkyn |
| 5,926,320 A | 7/1999 | Parkyn et al. |
| 5,966,250 A | 10/1999 | Shimizu |
| 6,019,493 A | 2/2000 | Kuo et al. |
| 6,030,099 A | 2/2000 | McDermott |
| 6,044,196 A | 3/2000 | Winston et al. |
| 6,048,083 A | 4/2000 | McDermott |
| 6,055,108 A | 4/2000 | Dreyer |
| 6,097,549 A | 8/2000 | Jenkins et al. |
| 6,139,166 A | 10/2000 | Marshall et al. |
| 6,166,860 A | 12/2000 | Medvedev et al. |
| 6,166,866 A | 12/2000 | Kimura et al. |
| 6,177,761 B1 | 1/2001 | Pelka et al. |
| 6,181,476 B1 | 1/2001 | Medvedev |
| 6,201,229 B1 | 3/2001 | Tawa et al. |
| 6,222,623 B1 | 4/2001 | Wetherell |
| 6,252,636 B1 | 6/2001 | Bartlett |
| 6,268,963 B1 | 7/2001 | Akiyama |
| 6,273,596 B1 | 8/2001 | Parkyn, Jr. |
| 6,282,821 B1 | 9/2001 | Freier et al. |
| 6,296,376 B1 | 10/2001 | Kondo et al. |
| 6,301,064 B1 | 10/2001 | Araki et al. |
| 6,350,041 B1 | 2/2002 | Tarsa et al. |
| 6,356,700 B1 | 3/2002 | Strobl |
| 6,361,190 B1 | 3/2002 | McDermott |
| 6,450,661 B1 | 9/2002 | Okumura |
| 6,473,554 B1 | 10/2002 | Popovich et al. |
| 6,483,976 B2 | 11/2002 | Shie et al. |
| 6,488,392 B1 | 12/2002 | Lu |
| 6,502,964 B1 | 1/2003 | Simon |
| 6,504,301 B1 | 1/2003 | Lowery |
| 6,536,923 B1 | 3/2003 | Merz |
| 6,547,400 B1 | 4/2003 | Yokoyama |
| 6,547,423 B2 | 4/2003 | Marshall et al. |
| 6,554,455 B2 | 4/2003 | Perlo et al. |
| 6,560,038 B1 | 5/2003 | Parkyn et al. |
| 6,578,989 B2 | 6/2003 | Osumi et al. |
| 6,580,228 B1 | 6/2003 | Chen et al. |
| 6,582,103 B1 | 6/2003 | Popovich et al. |
| 6,598,998 B2 | 7/2003 | West et al. |
| 6,603,243 B2 | 8/2003 | Parkyn et al. |
| 6,607,286 B2 | 8/2003 | West et al. |
| 6,616,287 B2 | 9/2003 | Sekita et al. |
| 6,621,222 B1 | 9/2003 | Hong |
| 6,637,924 B2 | 10/2003 | Pelka et al. |
| 6,639,733 B2 | 10/2003 | Minano et al. |
| 6,641,287 B2 | 11/2003 | Suehiro |
| 6,646,813 B2 | 11/2003 | Falicoff |
| 6,647,199 B1 | 11/2003 | Pelka et al. |
| 6,649,939 B1 | 11/2003 | Wirth |
| 6,668,820 B2 | 12/2003 | Cohen et al. |
| 6,674,096 B2 | 1/2004 | Sommers |
| 6,679,621 B2 | 1/2004 | West et al. |
| 6,688,758 B2 | 2/2004 | Thibault |
| 6,691,701 B1 | 2/2004 | Roth |
| 6,692,136 B2 | 2/2004 | Marshall et al. |
| 6,729,746 B2 | 5/2004 | Suehiro et al. |
| 6,744,196 B1 | 6/2004 | Jeon |
| 6,769,772 B2 | 8/2004 | Roddy et al. |
| 6,773,143 B2 | 8/2004 | Chang |
| 6,783,269 B2 | 8/2004 | Pashley |
| 6,786,625 B2 | 9/2004 | Wesson |
| 6,796,698 B2 | 9/2004 | Sommers et al. |
| 6,803,607 B1 | 10/2004 | Chan et al. |
| 6,811,277 B2 | 11/2004 | Amano |
| 6,830,359 B2 | 12/2004 | Fleury |
| 6,846,100 B2 | 1/2005 | Imazeki et al. |
| 6,848,820 B2 | 2/2005 | Natsume |
| 6,863,402 B2 | 3/2005 | Roddy et al. |
| 6,882,379 B1 | 4/2005 | Yokoyama et al. |
| 6,886,962 B2 | 5/2005 | Suehiro |
| 6,896,381 B2 | 5/2005 | Benitez |
| 6,924,943 B2 | 8/2005 | Minano et al. |
| 6,926,435 B2 | 8/2005 | Li |
| 6,948,836 B2 | 9/2005 | Ishida et al. |
| 6,953,265 B2 | 10/2005 | Suehiro et al. |
| 6,988,813 B2 | 1/2006 | Hoelen et al. |
| 6,997,587 B2 | 2/2006 | Albou |
| 7,006,306 B2 | 2/2006 | Falicoff et al. |
| 7,021,797 B2 | 4/2006 | Mlnano |
| 7,042,655 B2 | 5/2006 | Sun |
| 7,144,121 B2 | 12/2006 | Minano et al. |
| 7,152,985 B2 | 12/2006 | Benitez et al. |
| 7,181,378 B2 | 2/2007 | Benitez et al. |
| 7,192,173 B2 | 3/2007 | Vaughnn |
| 7,347,599 B2 | 3/2008 | Minano et al. |
| 7,377,671 B2 | 5/2008 | Minano et al. |
| 7,460,985 B2 | 12/2008 | Benitez et al. |
| 7,520,614 B2 | 4/2009 | Joos et al. |
| 2002/0034012 A1 | 3/2002 | Santoro et al. |
| 2002/0041499 A1 | 4/2002 | Pedersen |
| 2002/0080623 A1 | 6/2002 | Pashley |
| 2002/0163808 A1 | 11/2002 | West et al. |
| 2002/0185651 A1 | 12/2002 | Sommers |
| 2003/0002281 A1 | 1/2003 | Suehiro |
| 2003/0076034 A1 | 4/2003 | Marshall |
| 2004/0031517 A1 | 2/2004 | Bareis |
| 2004/0080938 A1 | 4/2004 | Holman |
| 2004/0125614 A1 | 7/2004 | Ishida et al. |
| 2004/0130907 A1 | 7/2004 | Albou |
| 2004/0145910 A1 | 7/2004 | Lisowski |

| | | | |
|---|---|---|---|
| 2004/0190304 | A1 | 9/2004 | Sugimoto et al. |
| 2004/0218390 | A1 | 11/2004 | Holman et al. |
| 2004/0228131 | A1 | 11/2004 | Minano et al. |
| 2004/0246697 | A1 | 12/2004 | Yamashita et al. |
| 2005/0024744 | A1 | 2/2005 | Falicoff |
| 2005/0086032 | A1 | 4/2005 | Benitez et al. |
| 2005/0088758 | A1 | 4/2005 | Minano et al. |
| 2005/0117125 | A1 | 6/2005 | Minano et al. |
| 2005/0129358 | A1 | 6/2005 | Minano et al. |
| 2005/0135095 | A1 | 6/2005 | Geissler |
| 2005/0169002 | A1 | 8/2005 | Steen et al. |
| 2005/0180145 | A1 | 8/2005 | Okuwaki |
| 2005/0200812 | A1 | 9/2005 | Sakata et al. |
| 2005/0219464 | A1 | 10/2005 | Yamasaki et al. |
| 2005/0225988 | A1 | 10/2005 | Chavez |
| 2005/0243570 | A1 | 11/2005 | Chaves et al. |
| 2006/0067078 | A1 | 3/2006 | Beeson et al. |
| 2006/0231133 | A1 | 10/2006 | Fork et al. |
| 2007/0036512 | A1 | 2/2007 | Winston et al. |

FOREIGN PATENT DOCUMENTS

| | | |
|---|---|---|
| ES | 2142752 | 4/2000 |
| ES | 2142752 | 12/2000 |
| JP | 50-159746 | 12/1975 |
| JP | 56-151904 | 11/1981 |
| JP | 62-58686 | 3/1987 |
| JP | 05-211343 | 8/1993 |
| JP | 06-342922 | 12/1994 |
| JP | 2006-303494 | 11/2006 |
| RU | 1282051 A1 | 1/1987 |
| WO | WO-9909349 | 2/1999 |
| WO | WO-9913266 | 3/1999 |
| WO | WO-99/15826 | 4/1999 |
| WO | WO-01/40702 | 6/2001 |
| WO | WO-0107828 A1 | 6/2001 |
| WO | WO-03/071352 | 8/2003 |
| WO | WO-03066374 A2 | 8/2003 |
| WO | WO-03066374 A3 | 8/2003 |
| WO | WO-2004007241 A2 | 1/2004 |
| WO | WO 2004038285 | 5/2004 |
| WO | WO2007/104028 | 9/2007 |

OTHER PUBLICATIONS

*International Search Report*, PCT/US04/16313, WO04104925, mail date Mar. 21, 2005.
*International Search Report*, PCT/US04/24450, WO05012952, mail date Aug. 3, 2005.
*International Search Report*, PCT/US04/38584, WO2005050710, mail date Jul. 18, 2005.
*International Search Report*, PCT/US03/38024, WO2004051321, mail date Nov. 10, 2004 Jul. 29, 2004.
*International Search Report*, PCT/US04/14938, WO04104642, mail date Mar. 1, 2005.
*Office Action* from U.S. Appl. No. 10/622,874 dated Jun. 3, 2004.
*Office action* from U.S. Appl. No. 10/461,557 dated Nov. 24, 2004.
*Office action* from U.S. Appl. No. 10/726,130 dated Jan. 17, 2006.
*Office action* from U.S. Appl. No. 10/726,130 dated Mar. 24, 2005.
*Office action* from U.S. Appl. No. 10/269,479 dated Mar. 29, 2004.
*Notice of Allowance* from U.S. Appl. No. 10/269,479 dated Mar. 29, 2004.
*Notice of Allowance* from U.S. Appl. No. 10/622,874 dated Jan. 4, 2005.
*Notice of Allowance* from U.S. Appl. No. 10/461,557 dated Aug. 8, 2005.
*Notice of Allowance* from U.S. Appl. No. 10/726,130 dated Sep. 7, 2005.
*Office Action* from U.S. Appl. No. 10/772,088 dated Apr. 24, 2007.
*Interview Summary* from U.S. Appl. No. 10/772,088 dated Apr. 5, 2007.
*Advisory Action* from U.S. Appl. No. 10/772,088 dated Dec. 6, 2006.
Chavez et al., U.S. Appl. No. 10/814,598.
*Office Action* from U.S. Appl. No. 10/772,088 dated Sep. 8, 2006.
*Office Action* from U.S. Appl. No. 10/772,088 dated Feb. 24, 2006.
*Office Action* from U.S. Appl. No. 10/772,088 dated Dec. 16, 2005.
*Notice of Allowance* from U.S. Appl. No. 10/779,259 dated Oct. 10, 2006.
*Office action* from U.S. Appl. No. 10/779,259 dated Feb. 24, 2006.
*Office action* from U.S. Appl. No. 10/779,259 dated Oct. 6, 2005.
*Notice of Allowance* from U.S. Appl. No. 10/816,228 dated Sep. 14, 2007.
*Office action* from U.S. Appl. No. 10/816,228 dated Jun. 12, 2007.
*Office action* from U.S. Appl. No. 10/816,228 dated Apr. 5, 2007.
*Office action* from U.S. Appl. No. 10/816,228 dated Dec. 13, 2006.
*Notice of Allowance* from U.S. Appl. No. 10/903,925 dated Aug. 5, 2005.
*Office action* from U.S. Appl. No. 10/903,925 dated Jan. 25, 2005.
*Office action* from U.S. Appl. No. 10/901,919 dated May 8, 2007.
*Notice of Allowance* from U.S. Appl. No. 10/880,386 dated Jul. 14, 2006.
*Office action* from U.S. Appl. No. 10/880,386 dated Feb. 28, 2006.
*Notice of Allowance* from U.S. Appl. No. 10/880,386 dated Mar. 1, 2005.
*Notice of Allowance* from U.S. Appl. No. 10/987,182 dated Apr. 25, 2006.
*Office action* from U.S. Appl. No. 10/987,182 dated Nov. 3, 2005.
*Office action* from U.S. Appl. No. 10/987,182 dated Jun. 3, 2005.
*Notice of Allowance* from U.S. Appl. No. 11/040,506 dated Sep. 20, 2007.
*Office action* from U.S. Appl. No. 11/040,506 dated Apr. 9, 2007.
*Interview Summary* from U.S. Appl. No. 10/269,479 dated Mar. 18, 2004.
*Office Action* from U.S. App. No. 10/772,088 dated Sep. 27, 2007.
*Office Action* from U.S. Appl. No. 10/816,228 dated Mar. 31, 2006.
*International Search Report and Written Opinion*, PCT/US04/24330, mail date Jun. 27, 2006.
*Office Action* from U.S. Appl. No. 10/901,919 dated Oct. 19, 2007.
*International Search Report*, PCT/US2004/003054, WO2004070433A3, mail date Aug. 19, 2004.
*International Preliminary Report on Patentability*, PCTUS0438584, mail date Aug. 21, 2006, 1-4.
*International Search Report and Written Opinion*, PCT/US2004/38162, mail date Nov. 30, 2005.
*International Search Report*, PCT/US03/32076, W02004034100, mail date Apr. 20, 2004.
*Office Action* from U.S. Appl. No. 10/851,471 dated Mar. 27, 2006.
*Office Action* from U.S. Appl. No. 10/461,557 dated Feb. 10, 2005.
*Interview Summary* from U.S. Appl. No. 10/461,557 dated Aug. 5, 2005.
*Notice of Allowability* from U.S. Appl. No. 10/461,557 dated Jan. 10, 2006.
*PCT International Search Report and Written Opinion of the International Searching Authority* from PCTUS0763522 dated Jan. 30, 2008.
*International Search Report and Written Opinion of the International Searching Authority* for PCT/US07/073530 mailed Mar. 7, 2008.
*International Search Report and Written Opinion of the International Searching Authority* for PCT/US07/75780 mailed Mar. 27, 2008.
*Notice of Allowance* for U.S. Appl. No. 12/119,039 mailed Dec. 19, 2008.
"Hyper Argus LED, Hyper-Bright 3mm LED, Non Diffused", *Infineon Technologies* Mar. 1, 2000 , 1-9.
Benitez, P., "Chapter 6: The SMS Design Method in Three Dimensions", *Conceptos avanzados de optica anidolica: diseno y fabricacion*, PhD dissertation, UPM (1998).
Benitez, P., "Design in 3D Geometry with the Simultaneous Multiple Surface design method of Nonimaging Optics", *Instituto de Engergia Solar, E.T.S.I. Telecommunicacion, Universidad Politecnica 28040. Madrid, spin* Jul. 26, 2004.
European Search Report, *Supplementary European Search Report* from EP04752067 mailed May 9, 2008.
Eurpean Patent Office, *European Search Report* dated May 19, 2008 (replacement of May 9, 2008 Search Report).
Glaeser, Georg, "Reflections on Refraction", *AMS* Sep. 5, 2001 , 1-18.

Int'l Searching Authority, *International Search Report and Written Opinion of the International Searching Authority* for PCTUS0629464 mailed Jun. 19, 2008.

Int'l Searching Authority, *International Search Report and Written Opinion of the International Searching Authority* for PCTUS0775779 mailed Jul. 24, 2008.

Parkyn, "The Black Hole: Cuspated waveguide-injectors and illuminators for LEDs", *Part of the SPIE Conference on Nonimaging Optics: Maximum Efficiency Light Transfer V*, Denver, CO Jul. 1999.

Remillard, et al., "Loss Mechanisms Optical Light Pipes", *Applied Optics*, vol. 31 #34 Dec. 1992, 7232-7241.

Spigulis, "Compact Dielectric reflective elements, Half Sphere concentrators of radially emitted light", *Applied Optics* vol. 33 Nov. 25, 1994.

*Notice of Allowance* for U.S. Appl. No. 10/901,919 mailed Jun. 16, 2008.

*Examiner Interview* for U.S. Appl. No. 10/901,919 mailed Jan. 23, 2008.

Winston, Roland et al., "NonImaging Optics", *Elsevier Academic Press*, Burlington, MA, USA, Copyright 2005.

*European Search Report* from the European Patent Office for App. No. 067888248 dated Oct. 5, 2010.

Winston et al., *Nonimaging Optics*, 2005, pp. 322-323.

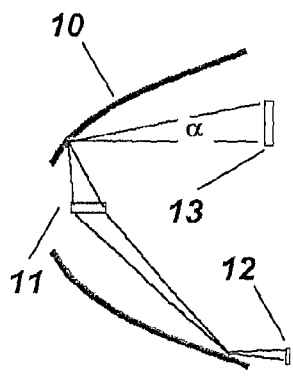
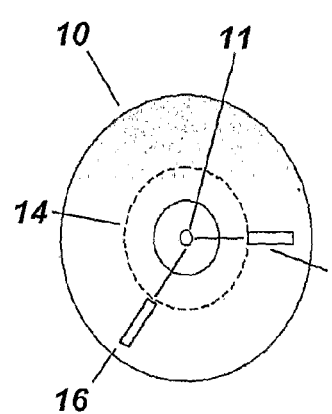
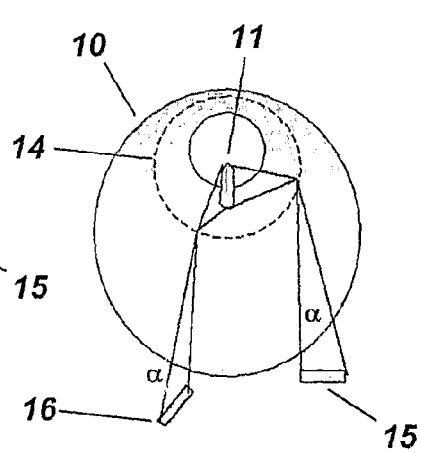
FIG. 1A            FIG. 1B            FIG. 1C
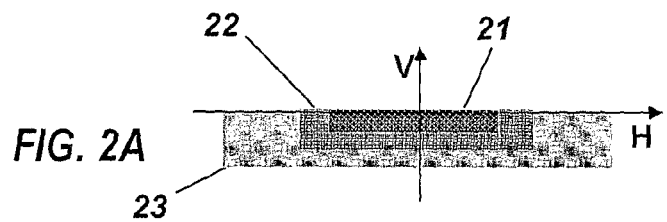
FIG. 2A
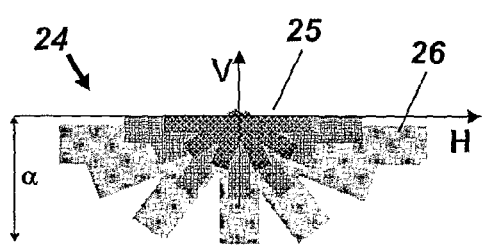
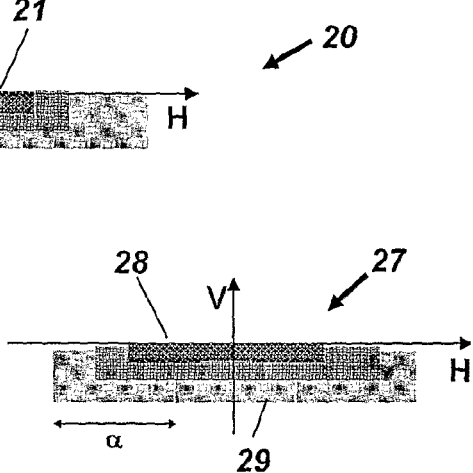
FIG. 2B            FIG. 2C

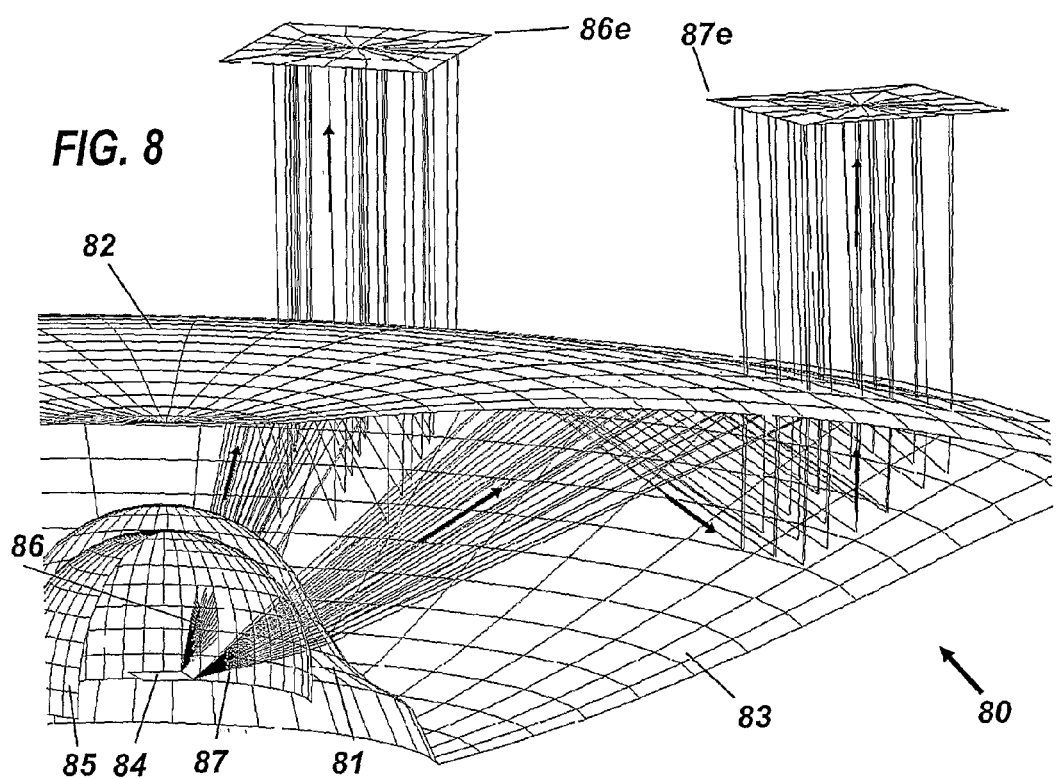

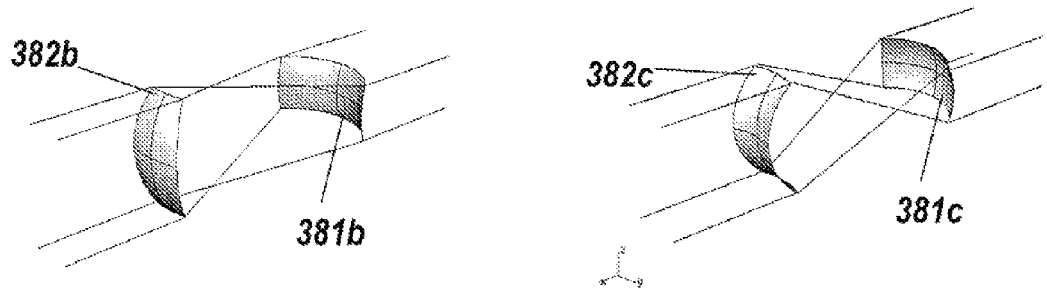
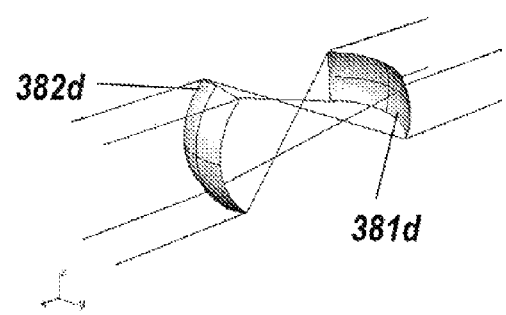
FIG. 38C
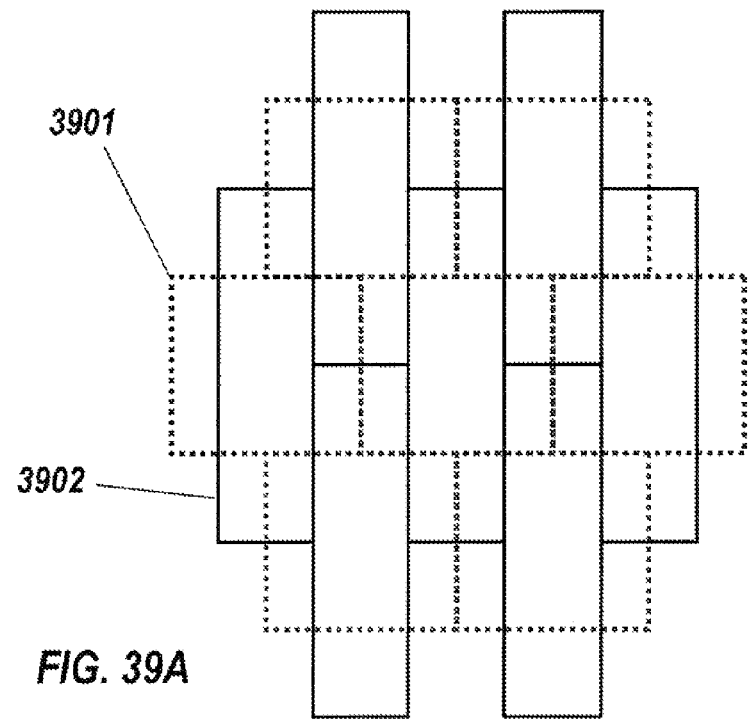
FIG. 39A

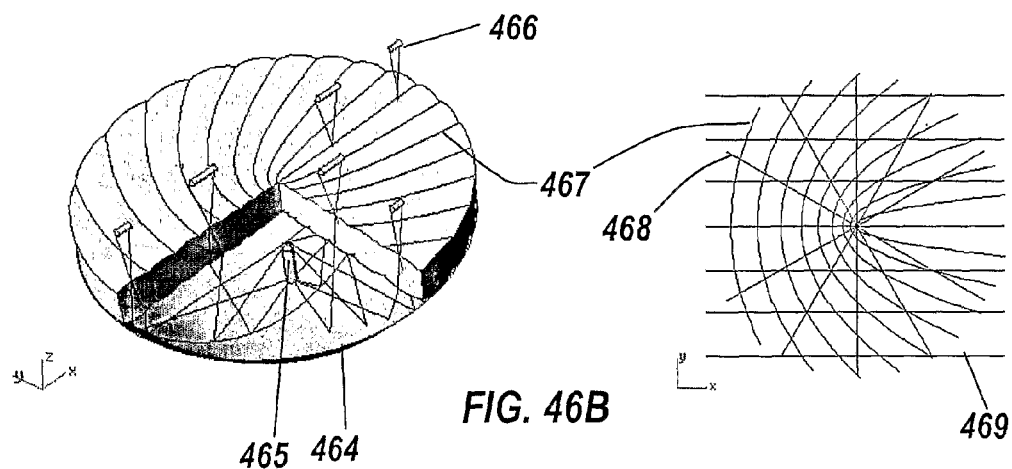
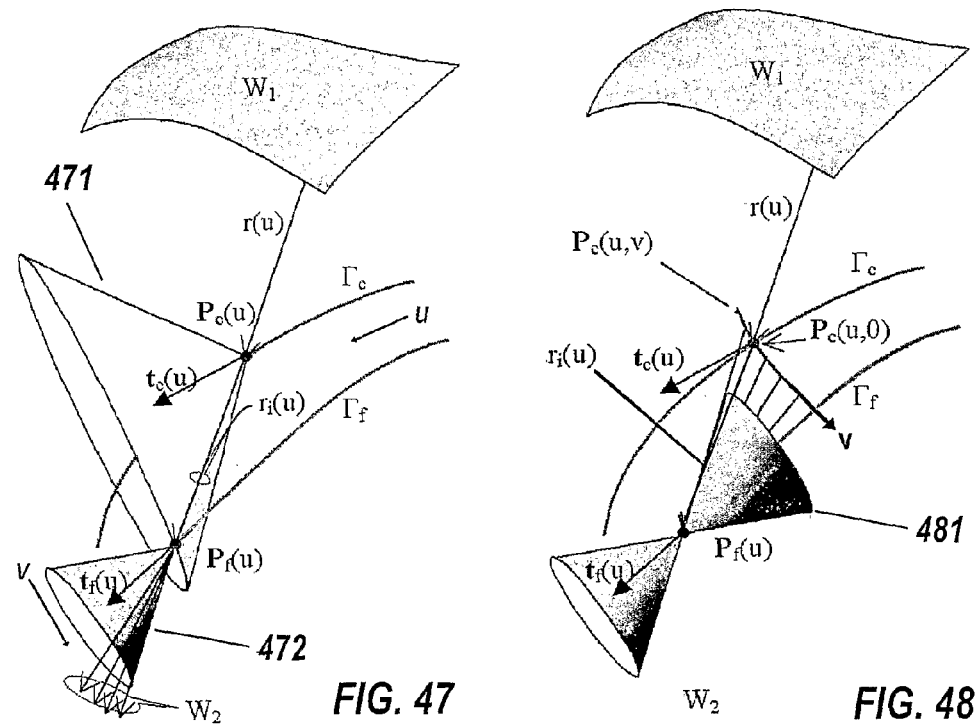
FIG. 46B
FIG. 47
FIG. 48

FREE-FORM LENTICULAR OPTICAL ELEMENTS AND THEIR APPLICATION TO CONDENSERS AND HEADLAMPS

PRIORITY CLAIM

This application claims the benefit of U.S. Provisional Application No. 60/776,596, filed Feb. 24, 2006, entitled FREE-FORM LENTICULAR OPTICAL ELEMENTS, which is incorporated by herein reference in its entirety.

This application claims the benefit of U.S. Provisional Application No. 60/703,667, filed Jul. 28, 2005, entitled FREE-FORM LENTICULAR OPTICAL ELEMENTS AND THEIR APPLICATION TO CONDENSERS AND HEADLAMPS, which is incorporated herein by reference in its entirety.

FIELD OF THE INVENTION

The present invention relates generally to optical elements and more particularly to illumination and/or concentration optical elements.

BACKGROUND

The use, focusing and distribution of light can be important and even critical in some applications. Many systems employ one or more lenses to achieve a desired light distribution and/or to meet a desired illumination.

Further, the design typically varies depending on a type of light source employed. For example, light emitted from automobile headlamps desirably meet predefined light prescriptions. Generating light beams that meet the prescription is in part dependent on the type of light source employed.

SUMMARY OF THE INVENTION

Herein are disclosed new devices, and a new design method, that expand on that disclosed in aforementioned U.S. Provisional and Utility Patent Applications, both titled "Three-Dimensional Simultaneous Multiple-Surface Method and Free-form Illumination-Optics Designed Therefrom", by the Inventors. The Simultaneous Multiple Surface Method in 3D, or 3D SMS method, generates two surfaces that couple perfectly two wavefronts of the source with two wavefront of the target, and partially couple a third pair of wavefronts.

Some embodiments are based on the design of free-form optical surfaces that control the light beam by one or more of three methods: etendue rotation, etendue-squeezing, and/or Kohler integration. These three methods of light control, along with the degree of freedom provided by the use of free-form optics, open a novel range of capabilities and devices, unattainable with current optics, in the fields of at least headlamps, condensers, and/or LED color mixing.

In addition, embodiments are also given for the case where the lenticulations have rotational symmetry. In this case the Kohler integration is carried out only in the radial direction.

Some embodiments provide an illumination optical system. The optical system can include a first surface and a second surface. Each of the first and second surfaces can further comprises a multiplicity of corresponding Cartesian-oval lenticulations such that each lenticulation of the first surface focuses a source upon a corresponding lenticulation of the second surface and each lenticulation of the second surface focuses a target upon a corresponding lenticulation of the first surface.

Further, some embodiments provide for a refraction, reflection, internal reflection and refraction (RXIR) integrator headlamp lens. The lens can comprises a non-circular cross-section and three optically active free-form surfaces. The three surfaces comprising an entry surface, an upper internally reflecting surface, and a lower reflecting surface, said entry surface comprising zones of two-directional free-form lenticulations and zones of one-directional lenticulations, said lower reflecting surface comprising zones of two-directional free-form lenticulations and zones of one-directional lenticulations acting in concert with said lenticulations of said entry surface.

Some embodiments provide a rotationally symmetric optical system receiving light from a source and sending it to a target. The system can include five optical surfaces, which are ordered by a light trip from a source toward a target. The five optical surfaces can include a first refractive surface, a second refractive surface, a primary mirror surface, a secondary mirror surface, and a refractive dome.

Still further embodiments provide for an optical system. The system can include a refractive, reflective and internally reflective (RXI) concentrator comprising an upper cover comprising a flat upper surface receiving light from a source and a lenticulated lower surface, a lower RXI concentrator lens, a lower-index gap-filling material between the lenticulated lower surface and the lower RXI concentrator lens, and a refractive dome above a target, said RXI lens comprising an upper lenticulated surface matching said lenticulated lower surface of said upper cover and a correspondingly lenticulated primary mirror reflecting said received light onto said upper lenticulated surface for total internal reflection by said gap-filler material onto said dome and onto the target.

Additional embodiments include a rotational symmetric optical system receiving light from a source and sending it to a target. The system comprises four optical surfaces, which are ordered by a light trip from the source towards the target, wherein the four optical surfaces comprise a primary mirror, a first refractive surface, a secondary mirror, and a refractive dome above the target. The first refractive surface defines a change of material and refractive index and where two of the four surfaces have coordinated lenticulations forming a Kohler radial integrator with the source and the target.

Some embodiments include a rotational symmetric optical system receiving light from a source and sending it to a target. These systems can include four optical surfaces, which are ordered by the light trip from the source towards the target, comprising first and the second refractive surfaces, a mirror, and a refractive dome above the target. The first and second refractive surfaces define a change of material and refractive index and where two of the four surfaces have coordinated lenticulations forming a Kohler radial integrator with the source and the target.

Further embodiments include a rotational symmetric optical system receiving light from a source and sending it to a target. These systems comprise four optical surfaces, which are ordered by the light path from the source towards the target, such that the four optical surfaces comprise a first flat refractive surface, and second, third and fourth refractive surfaces. The first flat refractive surface and the second, third and fourth refractive surfaces define changes of material and refractive index, and where two of the four surfaces have coordinated lenticulations forming a Kohler radial integrator with the source and the target.

Other embodiments provide for a refractive, reflective, internal reflective and refractive (RXIR) concentrating lens surrounding a central target. These lenses comprise an exit surface and a reflecting surface, both the exit surface and the reflecting surface having circumferential lenticulations. The lenticulations providing radial Kohler integration of an illumination of said target.

Some embodiments include a refractive, reflective, internal reflective and refractive (RXIR) concentrating lens surrounding a central target. The lens can include an exit surface comprising circumferential lenticulations and a reflecting surface comprising hexagonal lenticulations. The lenticulations of the exit surface and said lectuculations of said reflecting surface providing two-dimensional Kohler integration of an illumination of said target.

Additionally or alternatively, some embodiments provide for an etendue-squeezing lens that can include an input surface and an output surface. The input and output surfaces are tessellated with differently tilted lenslets.

Still other embodiments provide for a condenser system that comprises a first lens and a second lens. Each of the first and second lens comprises an input surface and an output surface, said first lens comprising a flat input surface, said second lens comprising a paraboloidal output surface, said flat input surface of the first lens and the paraboloidal output surface of the second lens are tessellated with differently tilted pie-shaped sectored lenslets, said sectored lenslets providing, coma-correcting meridional etendue squeezing.

Some embodiments include a reflective condenser system for an arc lamp. The system can comprise a front lenticulated mirror and a rear lenticulated mirror. The front and rear lenticulated mirrors are sectored to provide meridional etendue squeezing.

Additional embodiments provide for a bilaterally symmetric condenser system for an arc lamp that comprises two etendue-rotating primary mirrors, two totally internally reflecting secondary mirrors, and a homogenizer system receiving condensed light. The mirrors being laterally truncated linear sweeps of coordinated lenticular profiles, and said homogenizer system comprising a triangular prism at an entry.

Some embodiments provide for an etendue-rotating illumination lens that comprise a lower parabolic reflector with an axially oriented cylindrical light source at its focus, and an upper etendue-rotating lenticulated cover, said cover having lenticulations whose slope discontinuity curves when projected on an aperture plane of the parabolic reflector form confocal parabolic curves.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features, and advantages of the present invention will be more apparent from the following more particular description thereof, presented in conjunction with the following drawings wherein:

FIGS. 1A, 1B, & 1C depict the operation of a parabolic condenser or an automotive free-form reflector.

FIG. 2A shows an intensity prescription.

FIG. 2B shows how a single reflector forms its far-field pattern.

FIG. 2C shows how 3D SMS optics and some present embodiments form a far-field pattern.

FIG. 8 is a perspective view of the two input and output wavefronts of an RXIR lens.

FIG. 38C shows three alternative toroidal configurations of the lens of FIG. 38A.

FIG. 39A shows tessellation by etendue-squeezed output beams.

FIG. 46B shows a perspective cutaway view of the condenser of FIG. 46A, and a plan drawing of the lenticulations pattern.

FIG. 47 and FIG. 48 show a canonical input wavefront and definitive ray-cones.

Figure 3:
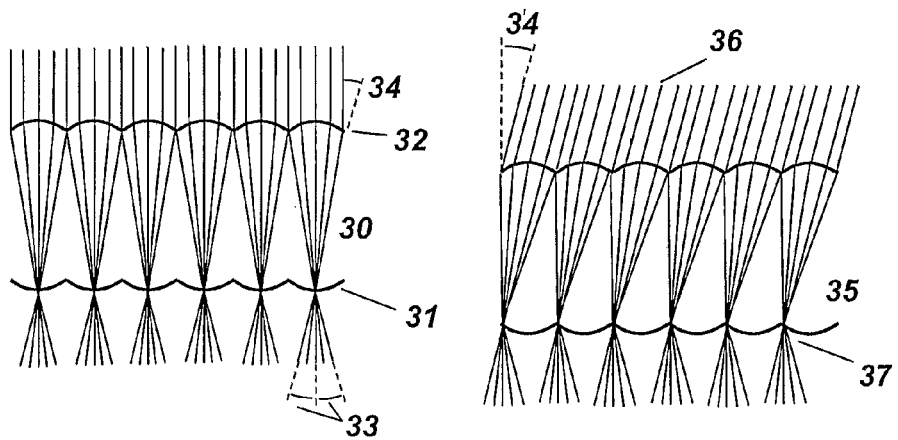
FIG. 3 shows the operation of a lenslet array.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

A better understanding of the features and advantages of the present invention will be obtained by reference to the following detailed description of the invention and accompanying drawings, which set forth illustrative embodiments in which the principles of the invention are utilized.

Some present embodiments provide illumination and/or concentration optical elements, and some of these optical elements can comprise and/or be employed as a condenser for multimedia projectors, to an LED automotive headlamp, and to an RGB LED color mixer. Further, some embodiments are based on the design of optical surfaces which control the light beam by three methods: etendue rotation, etendue-squeezing and Kohler integration. These three methods of light control, along with the degree of freedom provided by the use of free-form optics, opens a novel range of capabilities, unattainable with the state of the art optics in the fields of headlamps, condensers and color mixers.

The concept of projection of the source images in the target will be used in the description of the disclosed embodiments. This concept is known in the headlamp and condenser design framework. Initially, consider the intensity distribution on the far-field target, or the illuminance distribution on the finite-distance target, produced by an infinitesimal area dA around a given point of the exit aperture (i.e., as that produced by a pin-hole camera). This is usually referred to as the source image for that point of the exit aperture. The integral across the exit aperture of these elemental source images gives the far-field intensity pattern. In general, the source might not be directly imaged, as when shields or Kohler integrators are used.

The control of the shape, orientation, and position of the projected image of the source may become critical for achieving both high efficiency, into the prescribed intensity/irradiance pattern, and insensitivity to source movements. FIG. 1A shows the profile of reflector 10, designed to collimate light from axially oriented filament 11. In condenser applications, however, the surface geometry of reflector 10 will not be such a paraboloid of revolution, but an ellipsoid of revolution around the lamp arc axis, with one focus at the lamp arc center and the other on the target. In automotive applications, the surface will be free-form (typically defined by a b-spline surface) or a faceted reflector, but the following description applies for all three cases (paraboloid, free-form, or faceted). Source-image 12 is small because it is formed farther from source 11 than is source-image 13, which has larger angular subtense α. FIG. 1B is an on-axis view of reflector 10 and source 11, also showing circle 14 that is issuing source-images 14 and 15. FIG. 1C is a perspective view of same, also showing how source-images 14 and 15 have angular extent α but at differing orientations. Therefore, the projected images have variable size and are rotated with respect to each other. In the automotive case, being free-form, reflector 10 is not rotationally symmetric, so that the center of source images can be directionally shifted from the location they would have if reflector 10 was rotationally symmetric, as in the condenser application. Typically, what any single free-form reflector cannot do, however, is control at the same time the size and the orientation of those source-images. For instance, it is possible to design a single free-form reflector such that all the source-image centers are projected towards the same direction but then there are no more degrees of freedom available and one cannot control anything else (the size of the images, for instance).

The 3D SMS optical design method, disclosed in U.S. Utility application Ser. No. 10/901,919 filed Jul. 28, 2004 titled "Three-Dimensional Simultaneous Multiple-Surface Method and Free-form Illumination-Optics Designed Therefrom" and the U.S. Provisional Patent Application of the same name 60/490/769 filed Jul. 28, 2003 by the Inventors, both of which are incorporated herein by reference, provided the capability of controlling the size, position and rotation of source projected images. This method generates two surfaces that couple perfectly two wavefronts of the source with two wavefronts onto the target, and partially couple a third wavefront pair. Overall there are six wavefronts prescribed.

FIG. 2A depicts an example of far-field intensity prescription 20 for automotive applications, with vertical axis V and horizontal axis H, high-intensity contour 21, medium intensity contour 22, and low-intensity contour 23. A complete intensity cutoff lies along horizontal axis H.

FIG. 2B shows the far-field intensity pattern 24 of reflector 10 of FIG. 1 when designed for automotive applications. Small source-images 25 correspond to source-image 12 of FIG. 1A, coming from the periphery of reflector 10. Large source-images 26, of angular extent α, correspond to source-images 15 and 16 of FIG. 1C. These source-images of the cylindrical filament will rotate in the far field, depending on what point of circle 14 emits them. FIG. 2C shows far-field pattern 27 as is shown in the U.S. Utility application Ser. No. 10/901,919 (publication no. 2005/0086032), incorporated herein by reference, and of at least some present embodiments, comprised of non- rotated source-images 28 and 29, leading to most of the source's light helping to meet prescription 20.

Herein the term "etendue rotation" will refer to that use of the 3D SMS method to control rotation (and shape) of projected source images. The reason for this name can be illustrated in the example of FIG. 1A. The points of the reflector in that vertical cross section project the images vertically due to the reflector symmetry. According to the etendue-conservation theorem, the average value of vertical size of projected source images in the plane is not arbitrary, but can be calculated by equating the 2D etendue of the output bundle with that of the source in that plane (which could be referred to as 2D vertical etendues). Using two free-form surfaces, however, as well as dispensing with the rotational symmetry of the reflector, the 3D SMS method enables the ray fans in FIG. 1A to be emitted entirely in horizontal planes (instead of in a vertical plane as FIG. 1A). Therefore, the 3D SMS designs have rotated that vertical etendue, transforming it into a horizontal etendue, and in this sense it is performing an etendue rotation.

Some etendue rotating devices are disclosed in aforementioned U.S. Utility application Ser. No. 10/910,919 by the present inventors. FIGS. 18 to 21 of said application show devices that contain several free-form surfaces, two of which are designed with the 3D SMS method. This device was designed as an etendue rotator, to prevent the rotation of the source projected images that has already been explained and represented in FIGS. 2A to 2C.

In some present embodiments, new etendue rotating devices are disclosed. Additionally, the some embodiments improve that described in U.S. Utility application Ser. No. 10/901,919, with a new ability to greatly improve the gradient of illumination cutoffs, in spite of the considerable variation between individual LEDs in their illuminance distribution, and in spite of positioning inaccuracies, which can be more than 10% of the width of the source image. This control of source-image shape and orientation, combined with the abovementioned two additional beam control methods (etendue squeezing and Kohler integration), gives unique capabilities to some present embodiments.

In the design of low-beam automotive lamps, one of the most difficult objectives is a sharp cut-off in the intensity pattern, which should be independent of the source position tolerances and luminance inhomogeneities.

Some systems in this field can be classified into two groups: one group using light shields (see, for instance, U.S. Pat. No. 4,677,532 by Peitz et al., U.S. Pat. No. 6,099,157 by Waescher, U.S. Pat. No. 4,814,950 by Nakata, U.S. Pat. No. 4,922,386 by Bockeler et al., all incorporated herein by reference), and another group using optics for which the product of the exit area times the source luminance is large (see, for instance, U.S. Pat. No. 6,007,224 by Jianzhong et al., incorporated herein by reference, as shown in FIG. 1 therein).

In the first group of patents, the shield edge is imaged onto the output intensity pattern to produce the desired cut-off. The resultant light-blockage, however, reduces optical efficiency. Although optical efficiency is not a big issue for halogen and high-intensity discharge lamps, due to their respective low cost and high flux, it is typically very important for LEDs, which currently are far more expensive per lumen than halogen lamps, and have far less flux than high-intensity discharge lamps. Some present embodiments offers both the efficiency and the beam control that LEDs need to succeed in automotive headlights.

In the second group of above listed patents, the source image, instead of the shield image, is projected on the target. The high luminance-exit area product enables the source-image to be projected from different points of the exit aperture, with a small size on average. Since the sensitivity to source displacement and to the source's luminance inhomogeneities is proportional to the projected source-image size, attaining insensitivity to these real-world failings means that the cut-off line is produced by only projecting the small images for angles close to the cut-off line. White LED'S, however, have much lower luminance (e.g., at least 4 times less) than halogen and high-intensity discharge lamps. This is especially true of domed white LED chips, or those with larger reflector cups holding the phosphor. In both cases, the effective source size is enlarged and thus the average luminance is lower. Therefore, using this strategy to create the cut-off line with LED's would employ an exit aperture that is significantly larger than halogen or high-intensity discharge head lamps, which may be considered undesirable from the commercial point of view.

The SMS free-form optics described U.S. in U.S. Utility application Ser. No. 10/901,919, when applied to automotive headlamp designs, can be considered to be in the above second group of solutions (i.e., the source-images are projected instead of a shield image). Its ability to control the source-image orientations and sizes enables these optics to achieve a much lower luminance-area product than many other designs in this second group. Nevertheless, the aperture-area of these designs, when using the luminance of present commercial LED's, may still be excessive when guaranteeing the cut-off, taking into account the position tolerances of multiple LED's in mass production, along with their luminance inhomogeneities.

Some present embodiment, using the aforementioned concepts of Kohler integration and etendue-squeezing, can achieve smaller luminance-area products than the second group of head lamp designs, but without using a shield as do those of the first group. Some embodiments attempt to guarantee robustness of the cut-off against position tolerances and luminance inhomogeneities of the light source.

Kohler integration (also known as Kohler-type illumination) is based on the use of two lenticular optical surfaces arranged such that each cell of the entry surface images the source on the exit surface, while the exit surface images the entry surface onto the target. Since the source-image is not projected onto the target, the source misplacement and its luminance inhomogeneities do not affect the target illumination. On the other hand, since no shield is used, the efficiency can be high.

One example of the embodiments formed by free-form integrator optics is based upon the RXIR lens, as disclosed in U.S. Pat. No. 6,639,733 by Miñano et al., U.S. Pat. No. 6,896,381 by Benitez et al. and U.S. Utility application Ser. Nos. 10/880,386 and 10/901,919 all by the present inventors, and incorporated herein by reference. It offers a novel approach to headlamp design, one that will solve these problems and produce an effective and practical LED headlamp that single-handedly meets the complexities of real-world specifications, with unprecedented compactness. It is shown to provide explanatory context for the Figures disclosing the methodology of some present embodiments.

The application of etendue-squeezing to headlamp design is based on two lenticular optical surfaces arranged such that each cell simultaneously increases the vertical collimation and decreases (by the same factor) the horizontal collimation of the light beam, without modifying the overall spatial extent of the beam. This vertical-horizontal exchange of collimation strengths causes the source-images to be projected onto the target as compressed in the vertical dimension and expanded in the horizontal dimension, compared to the optics without such etendue-squeezing capability. This has value because the specified cutoff-gradient runs vertically. This horizontal size increase of the source-image projection does not affect the cut-off line in low-beam head lamps, but the vertical size reduction makes it more tolerant to the source misplacements and inhomogeneities, enabling a considerable reduction of overall aperture area.

As employed for example in automotive headlamps, a configuration of etendue squeezing was proposed also by the present inventors previously, in the U.S. Provisional Patent Application 60/445,059 filed Feb. 4, 2003 and U.S. Utility application Ser. No. 10/772,028 filed Feb. 3, 2004 and Ser. No. 11/040,506 filed Jan. 21, 2005 by Minano et al., all incorporated herein by reference, disclosing an optical system for an LED head lamp, comprising a spherical or elliptical cavity to create a virtual LED side-by-side with the real LED. Locating the virtual LED side by side next to the real one can be theoretically considered as a particular case of etendue squeezing, since the solid angle of emission is reduced by a factor of two in exchange for a doubled spatial size of the effective source.

Regarding another preferred application, as condenser optics, the objective can be to optimize the flux transfer between a discharge lamp (typically metal halide or Ultra High Pressure mercury) and a target at a finite distance (which may be the rectangular entry aperture of an integrating prism) or located at infinity (which may be the input field of a conventional Kohler integrator lenslet array).

In contrast to the headlamps, Kohler integration is widely used in condenser optics (U.S. Pat. No. 2,186,123 by Rantsch et. al., U.S. Pat. No. 3,296,923 by Miles, U.S. Pat. No. 4,769, 750 by Matsumoto et al., U.S. Pat. No. 5,098,184 by Van den Brandt et al., U.S. Pat. No. 4,497,013 by Masakatu, U.S. Pat. No. 5,786,939 by Watanabe, U.S. Pat. No. 3,302,016 by Larraburu, JP 7174974 by Tadaaki, U.S. Pat. No. 5,662,401 by Shimizu et al.). Kohler integration has been widely used as homogenizers for condenser systems, in the form of lenslet arrays in projection displays. It has been used separately, however, as a second stage of conventional parabolic or elliptical condensers.

Some Kohler integrators, however, use lenslets with rotationally symmetric optical surfaces (2-dimensional integration) or cylindrical optical surfaces (1-dimensional integration), while some present embodiments using Kohler integration comprise free-form surfaces. In instances, some embodiments comprise two free-form optical surfaces that produce the combined functions of the condenser mirrors and the integrator lenslet arrays.

The ideal condenser is usually defined as that in which the exit aperture is round (to fit the f/number of the posterior imaging optics) and in which the contours of all projected images match the target aperture contour (the etendue conservation theorem indicates that the area of such a target is not arbitrary, but is given by the equality between target and source etendues).

Most condenser designs are based on rotationally symmetric elliptic or parabolic reflectors, on the first focus of which is located the source arc, aligned along the optical axis, with the second focus located at the target or at infinity, respectively. These conventional condensers, however, are far from ideal because their projected arc-images have the following three characteristics: (1) the projected sizes vary, both in the meridian and sagittal dimensions, from point to point on the condenser exit surface; (2) projected meridian size is 2-4 times larger than the sagittal size; and (3) the images rotate due to the rotational symmetry of the mirror and the arc. Therefore, the arc-image contours can neither match circular targets (as in the case of a fiber optic illumination for the Texas Instruments color recapture system, as disclosed in U.S. Pat. No. 6,771,325 by Dewald) nor rectangular targets (as in rectangular 4:3 or 16:9 integrating prisms for projection TV). In this last case, the mismatch is especially noticeable because the rotational symmetry of the arc images causes darkening of the corners of a rectangular target.

U.S. Pat. No. 6,623,145 by Ishihara discloses an improvement of the reflector profile of conventional condensers for the correction of the distortion produced by the refractions on the lamp bulb. This design, however, also suffers from the above-mentioned three negative characteristics of conventional condensers regarding the projected arc-images.

Two other patents, JP 7174974 by Tadaaki and U.S. Pat. No. 5,966,250 by Shimizu, disclose a modification of the reflector profile and the addition of a rotational aspheric lens at the exit to correct not only the envelope's distortion, but also the coma of the condenser, so that the arc images have constant meridian length at the target plane. The arc images, however, still rotate in the target plane, as in the case of conventional condensers. The sagittal image-width is variable and uncontrolled.

Other patents such as U.S. Pat. No. 6,356,700 by Stroebl and U.S. Pat. No. 4,305,099 by True et al., as well as the paper by H. Moench et al., "Higher Output, More Compact UHP Lamp Systems", SID conference 2002, disclose the reduction of the solid angle collected by the elliptical or parabolic reflector and the use of a substantially spherical mirror cavity to send the remaining light rays back to the arc region. This mirror cavity has the purpose of creating a virtual image of the arc (less bright, due to the transmission losses of the rays crossing the bulb). If the virtual image is superimposed on the real arc (as done by U.S. Pat. No. 6,356,700 by Stroebl and in the paper by Moench et al.), the mirror cavity has reduced the arc etendue by about a factor of 2. Since the plasma is partially absorbent, however, (60-70% transmissive in the best cases) additional losses accrue, and the resulting effective arc indeed has half the etendue, but not twice the luminance (about 1.5 is claimed). If the virtual image is set side-by-side with the real arc (as in U.S. Pat. No. 4,305,099 by True et al.), the absorption losses in the bulb gases are indeed lower, but neither is the etendue reduced nor the luminance increased. A saving grace, however, is that the envelope of the two arcs (real and virtual) constitutes an apparent source that is less elongated that arc alone. This apparently wider source will better match circular apertures.

The etendue-rotation capability of the 3D SMS method confers control of the image rotation to maximize the collection efficiency into rectangular apertures, especially when the aspect ratio is far from one (as with the 16:9 format of HDTV). Several embodiments of the present invention are etendue-rotators and are of interest in condenser applications. The aforementioned U.S. Pat. No. 6,356,700 by Stroebl, apart from the use of the mirror cavity to increase the arc luminance, discloses the orientation of the arc lamp as normal to the optical axis of the ellipsoid, which reduces the arc image rotations substantially and leads to an illuminance pattern on the target that is approximately elliptical, better matching 16:9 apertures. Such matching, however, is still far from perfect, since in contrast to the etendue rotators of some present embodiments, the projected arc-image size still varies across the exit aperture. Also, the length-to-width ratio of the arc-image is uncontrolled.

U.S. Pat. No. 6,672,740 by Li also suggested using the concept of a mirror cavity, with the virtual arc also set side-by-side to the real arc. The apparent source of the envelope of the two arcs (real and virtual) in this approach is collimated by a parabolic mirror and then is concentrated again by a identical, symmetric parabolic mirror, which creates a 1:1 magnified image of the apparent source. In U.S. Pat. No. 6,634,759 by Li the parabolic mirrors are replaced by elliptical mirrors, but the overarching principle is the same.

Locating the virtual arc side-by-side with the real arc can be theoretically considered a particular case of etendue squeezing, since the solid angle of emission is reduced by a factor of two in exchange for doubling the spatial size of the effective source.

Some embodiments of the present invention, which have application to condensers, produce an etendue squeeze.

The configuration of this etendue squeezing, however, is totally different from the aforementioned, and no cavity is used to send the light rays close to the arc volume. This etendue squeeze will be used to reduce by a factor k the meridional size of the arc's projected image on the target, in exchange for increasing the sagittal size of the arc's projected image by the same factor k. Since conventional condensers produce images with meridian size 2-4 times larger than the sagittal size, k values in the range of 1.5 to 2 will make the projected images of the arc approximately round, which matches circular targets. Moreover, when the former etendue squeezers are applied to sources that present a large vertical etendue and a small horizontal etendue (i.e., long filaments or arcs) they are competitive with that of the aforementioned etendue rotators.

U.S. Pat. No. 5,662,401 by Shimizu et al. discloses integrator arrays that produce an effect equivalent to etendue squeezing. For instance, in FIG. 2 of said patent the contour of the input integrator lens has a 4:1 aspect ratio, while the exit integrator lenses are 2 by 2 (thus the area is preserved). Since the integrator lens pairs image mutually, the angular distribution of the input and output bundles are changed from 2 by 2 to 1 by 4. An important limitation of this approach is that its lens arrays are essentially flat, but the lens pairs are assigned in such a way that they would be decentered. This will produce light losses by blocking the entry lens array and also will reduce the illuminated area of the exit lens array.

Here we disclose a special tessellation of the lens unit in an array that, if applied to the configuration disclosed in FIG. 2 of said patent U.S. Pat. No. 5,662,401, makes all the lens pairs centered, thus minimizing light blocking at the entry and maximizing the illuminated area at the array exit.

Additionally, some embodiments with etendue squeezing in the present invention are not integrator elements but beam expanders in one dimension (the one in which the angular extension of the bundle needs to be reduced) and beam compressors in the other direction (the one in which the angular extension of the bundle may be increased). This difference is advantageous at least in some implementations because the size D of the lenticular units of integrator arrays is proportional to the separation S between lenses and to the arc length L, while the size of the entry and output surfaces in two-surface beam expanders/compressors does not show such dependence. Therefore, when the arc length L is small (as occurs in high-brightness projectors), either the number of lens units is very high (D small) or the lens arrays are either long (S large). Both cases have drawbacks: the first case is more difficult to manufacture while the second case does not allow for compact projectors. Etendue squeezing with beam expanders/compressors can have very few units (two at the entry and two at the exit, is the minimum) with substantially no limitation of compactness.

Finally, the Kohler integration devices in some present embodiments have application in the field of LED color mixing, or homogenization of non-homogeneous LED's in general illumination. This homogenization is excellent with the proposed two-dimensional free-form integrators. In one-dimensional integrators, if the LEDs are aligned in the direction of the integration, the homogenization is also excellent. A particular case of practical interest appears when the lenticulations have rotational symmetry, in which the Kohler integration is one-directionally done in the radial direction.

Some embodiments described herein are based on the design of free-form optical surfaces comprising optical elements that control the light beam by either of three methods: Kohler integration, etendue squeezing and etendue rotation. The design procedures and some embodiments of the above methods are described below in three sections (1. Kohler; 2. Etendue-squeeze; 3. Etendue rotators). Finally, Section 4 will describe two algorithms referred to in Section 1.

1. Kohler Integration Optics

For an introductory explanation, FIG. 3 shows the cross-section of an elemental integrator 30 comprising front lenslet array 31 and an identical but oppositely oriented rear array 32, separated by a distance equal to their focal length. Assuming that the aberrations are weak, all rays impinging on the array 32 with half angle 34 from the vertical direction are ideally coupled with all the rays exiting the array 31 within a half angle 33, which equals angle 34. This angle 34 (and 33) is given by the half-angle size of a far light source (not shown).

FIG. 3 also shows as 35 the same integrator 30 but with a tilted impinging parallel ray fan. The modification of the incident angle of the parallel ray fan 36 from normal incidence up to angle 34 does not affect the far field of the exit rays. Only the emission points 37 are shifted.

Thus an optical integrator has the property of producing an intensity pattern that can be quite insensitive to lateral source-position errors of a point source (e.g., a distant one that produces the parallel rays in FIG. 3) or more generally to extended sources within the angular acceptance (in FIG. 3, any ray bundle with non-zero angular extent inside the maximum acceptance angle 34).

For an extended source containing the rays comprised between the positive and negative angle 34, the integrator 30 neither collimates nor concentrates light, since the beam at the output has the same angular extension. Typically such an integrator is used with separate collimating or concentrating optics. In some present embodiments, the lenslets take novel shapes in order for the integrator to also be a collimator or a concentrator.

Figure 4:
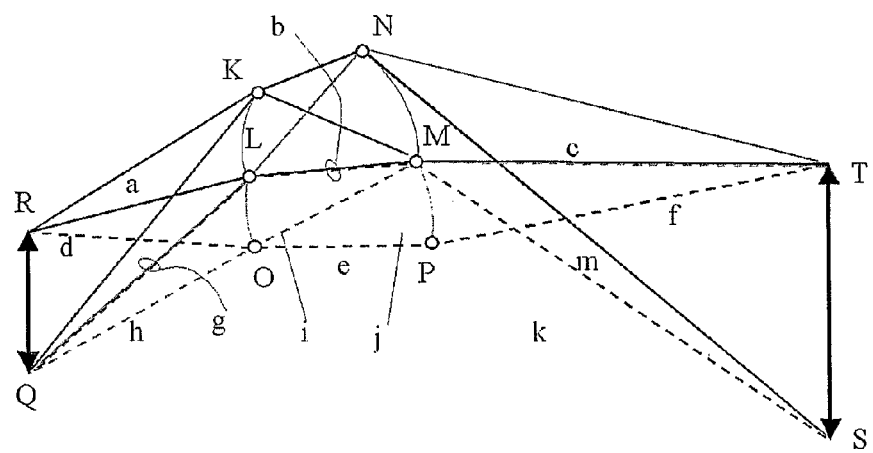
FIG. 4 shows the method of constructing a free-form Kohler integrator lenslet profile.

FIG. 4 is a diagram showing the calculation of such a lenslet shape in two dimensions. Object RQ and image ST are given. Assume that initial lenslet segment KLMN has been accordingly set up, so that the ray paths a, b, c, g, and m are known. The lens-profile segments shown are Cartesian Ovals, a type of curve defined as the unique surface passing through a prescribed point that transforms one wavefront into another. Therefore, with the single surface MP it is not possible to obtain a sharp cutoff at both T and S as images of points O and L, respectively. In many applications such as automotive headlights, sharp focusing is only needed at one point, call it T, so that the Cartesian oval PM is designed to focus O on T, to give the exit lens shape. Analogously, Cartesian oval OL can be calculated, for instance, to focus either R on P to give the entry lens.

Figure 5:
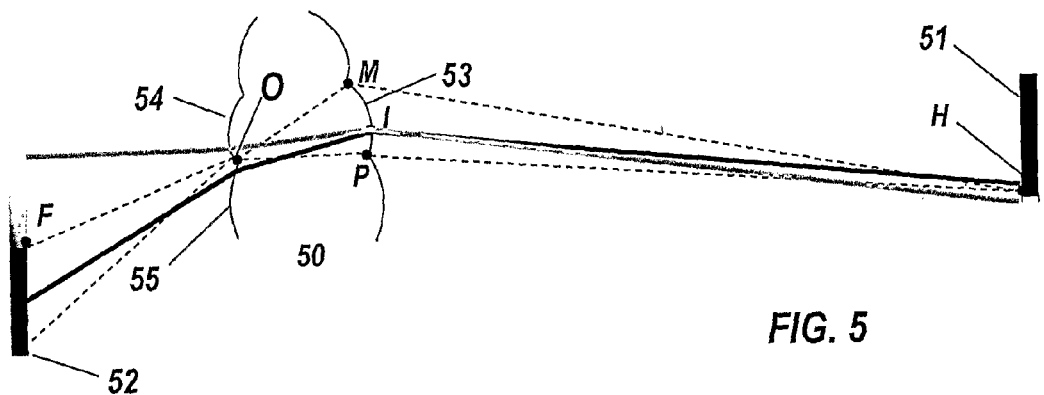
FIG. 5 shows how the Kohler integrator lenslet array generates a sharp illumination edge in two dimensions.

In order to illustrate in more detail how the design in FIG. 4 works, FIG. 5 shows how lenslet array 50 produces a sharp gradient in image 51 of source 52, which has no such gradient. Image 51 is shown at a finite distance but could equally well be at infinity. The problem is solved by some present embodiments because source 52 has a weak luminance gradient running from brightest top portion to dimmer end-point F. Directly forming image 51 from source 52 with conventional optics will give a similarly weak gradient around image-edge point H, where instead a sharp boundary is required. In the lenslet array case of FIG. 5, the points just above H will be illuminated from lens 53 by rays impinging just below point O on lens 55. The slope-discontinuity at O guarantees that for any point I between P and M, the rays will come from points of source 52 below F, which are dark ones, given the proper selection of point F. On the other hand, the points just below H will be illuminated from lens 53 by rays impinging just above point O on lens 54. Again, the slope-discontinuity at O guarantees that for any point I between P and M, the rays will come from points of source 52 above F, which are brighter than average.

Point F can be considered as the lower edge of a virtually enlarged source. In general, the selection of the lowest and highest point of this virtual source are done not only to prevent a weak image-gradient but also to allow for source-position tolerances. The integrator design shown will guarantee that if the source moves inside the integrator the illuminance at target will remain largely unchanged.

FIG. 4 and FIG. 5 depict rays in a plane, acted on by profiles in that same plane. Some present embodiments, in general, calculate entire surfaces, but such two-dimensional profiles typically can make cylindrical or rotational symmetric surfaces. These are but a particular case of the present embodiments, which in general generates free-form surfaces, comprised of free-form lenticular elements. Adjacent lenticular elements will show slope discontinuities at their edge curves, which means that the surface-normal vectors of adjacent lenticular elements will have an angular difference at their curve of mutual intersection occasionally, there may be not only an angular difference but a step between the surfaces, usually small, which defines an inactive face, as also occurs in a conventional Fresnel lens.

The 3D design method disclosed as a part of some present embodiments comprise several steps. In the first, given a source and target, the type of surfaces (refractive or reflective) are defined.

Figure 6A:
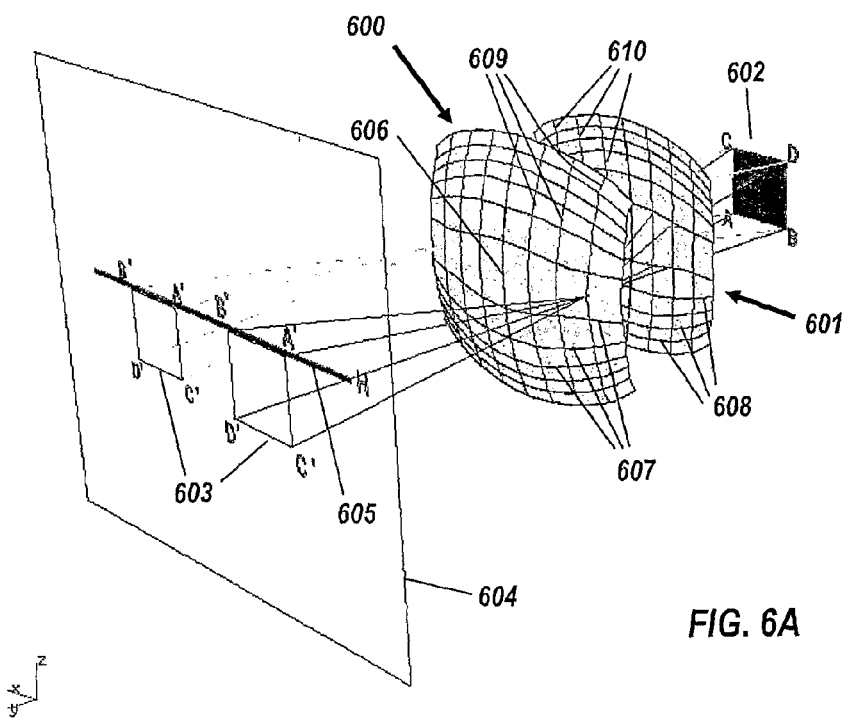
FIG. 6A shows the 3D SMS initial design used as input to the Kohler integrator free-form lens design method.

In the second step, two free-form surfaces are calculated by the 3D SMS method disclosed in U.S. Utility application Ser. No. 10/901,919 by the present inventors. FIG. 6A shows an example of a design for two refractive surfaces.

A person skilled in the art could clearly adapt that explanation to other pairs of surface-types (refractive-reflective, reflective-refractive, or reflective-reflective). These free-form surfaces 600 and 601 may not be part of the final design, but they will help design the free-form integrator surfaces. In particular, the edges of the lenticular surfaces (the equivalent to points K, L, M, N, O, and P in FIG. 4) will be lines lying on these surfaces, as indicated below.

The 3D SMS method makes use of three pairs of two-parameter orthotomic bundles of rays (hereinafter, a 2-bundle, where the term orthotomic means that the rays are perpendicular to a wavefront). One 2-bundle of each pair is defined at the source (input 2-bundles) and other 2-bundle is defined at the target (output 2-bundles). In FIG. 6A, the three input 2-bundles are the rays emitted by three corners A, B, C of LED chip 602, while the output 2-bundles will define the inverted three corners A', B' and C' of the images 603 of the LED chip, as projected to the target plane 604. The 3D SMS method, as disclosed in U.S. Utility application Ser. No. 10/901,919, begins by generating a first curve as 606, called the seed rib, on one of the free-form surfaces (on 600 of FIG. 6A) with the proviso that the bundle pairs A-A' and C-C' are coupled along the seed rib. Departing from the seed rib, lines 607 and 608, called SMS spines, are calculated with the proviso that the bundle pair A-A' is coupled to the pair B-B'. The design process induces a specific parameterization of the spines, and the locus of points of different spines with the same parameter value defines SMS ribs 609 on surface 600 (in particular, the seed rib) and SMS ribs 610 on surface 601.

The SMS ribs and SMS spines constitute a mesh on free-form surfaces 600 and 601. Finally, the skinning process of the 3D SMS method generates the intermediate points within the mesh, making it into a smooth surface.

Since at least one of the objectives is to provide insensitivity to LED luminance variations and positioning variations, we should select the three input 2-bundles as not being generated from the LED corners, but from the corners A, B, and C of an enlarged zone encompassing the actual chip. The trajectory of the rays emitted by any other point of the chip (such as the fourth corner, D) can be well approximated from the knowledge of the trajectories of rays from A, B, and C.

The third step is to select the type of integration process and the calculation of the edge lines of the lenticular elements. The choice of integrators comes from the fact that in three-dimensions, two types of Kohler integration are possible: one-directional integration, in which the integration is provided for just a single preferred direction on the chip (perpendicular to sides AB and CD or perpendicular to sides AC and BD), and bidirectional integration, in which the integration is performed for both the directions at the same time.

The fourth and last step will be the calculation of the lenticular surfaces that approximately lie on the calculated edge lines.

In the next sections, 1.1 and 1.2, one-directional integration and two-directional integrators are disclosed. In section 1.3, the design process for an example embodiment, the RXIR free-form integrator, is fully disclosed.

1.1 One-directional Kohler Integration.

Figure 6B:
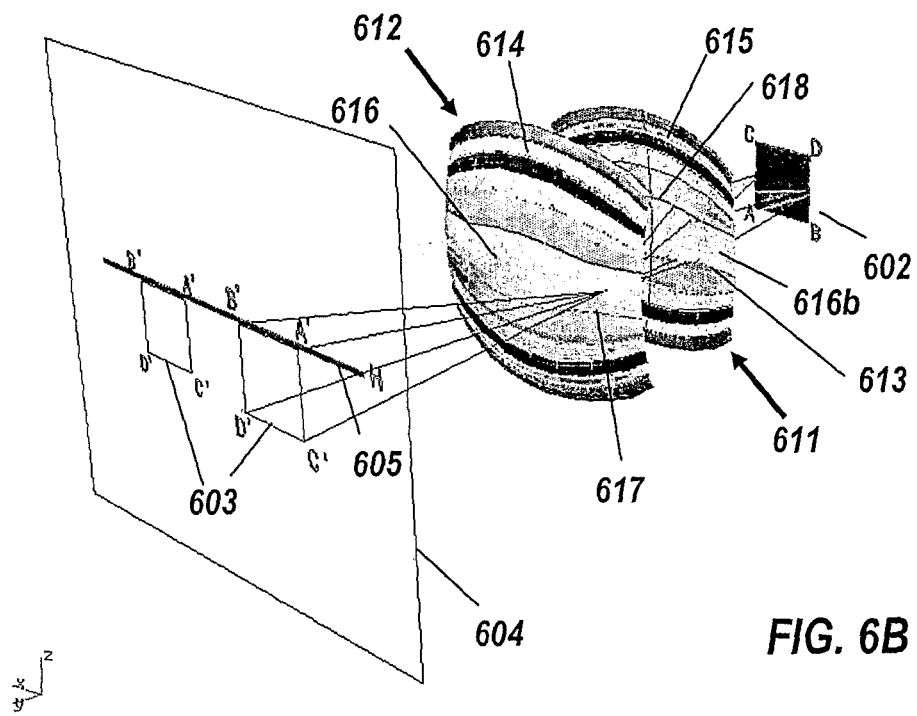
FIG. 6B shows a 1-directional Kohler integrator free-form lens design.

FIG. 6B shows two surfaces 611 and 612 of a one-directional Kohler free-form integrator lens. These surfaces are formed by pairs of free-form lenticular elements (as 614 and 615), whose edge-lines are SMS spines such as 607 and 608 of the initial 3D SMS device of FIG. 6A. The selection of the SMS spines that will perform as edge-lines is explained later in section 1.3. The edge-lines constitute one family of spaced lines that do not cross one another. These lines are analogous to the straight lines obtained as edges of the usual cylindrical lenslets, when a translation is applied to the profile of FIG. 4.

The one-directional integration only provides insensitivity to LED variations along the integrated dimension of the enlarged chip (then the other dimension does not need to be enlarged).

All rays that can illuminate the target 604 from the free-form surface 612 form a 4-parameter bundle, (a,b,c,d). That is, for instance, a ray can come from any spatial location (a,b) on its exit aperture, and take any pair (c,d) of direction cosines. As in the two-dimensional case, the sharp cut-off will only be guaranteed by design at one side of projected chip images (which is equivalent to the guarantee of sharp cut-off at point T but not in S in FIG. 4, or at point H of FIG. 5). The analogue of the point H of FIG. 5 for one-directional integration will be given by the line 605, labeled also as H, defining the sharp edge of a high-illumination patch. This line defines a 3-parameter bundle (3-bundle, below). Without loss of generality, consider the case in which the target plane is the far-field and the coordinate system can be aligned with line H, so the target plane is d=0, that is, the H rays are of the form(a,b,c,0), where d<0 in the illuminated zone, and d>0 is in the dark zone. Some present embodiments make it possible to essentially keep the illumination edge on H despite a given amount of uncontrolled source-misalignment, or, for that matter, a given degree of source-luminance inhomogeneity.

Designing for the complete 3-parameter ray bundle d=0 is too complex, and typically cannot be done with the available degrees of freedom. Instead, we use one particular 2-parameter bundle contained in the bundle d=0, rather than its entirety.

As already mentioned, the initial 3-D SMS method will produce two free-form surfaces that couple exactly a given pair A, B of input 2-bundles of rays from the source to the desired pair A', B' of exit 2-bundles, and couple approximately a third bundle C with C'. As an example, the A, B, C 2-bundles are again the rays emitted by three of the four corners A, B, C, and D of the LED chip 602.

FIG. 6B shows the case in which the one-directional integration is to be done to make the system insensitive to chip luminance variations and position errors perpendicular to sides AB and CD, and that the sharp cut-off line H is set. FIG. 6A shows that for this purpose the exit 2-bundels A' and B' must be selected on the H line, that is, A' and B' must be contained in the 3-bundle d=0. One of these two bundles, say A', is the one that will be selected for the construction of the lenticular free-form elements in surface 612. Since only the 2-bundle A' is used in the design instead of the whole 3-bundle d=0, the sharp cut-off will only be guaranteed around A'. This means that, for instance, if the A' bundle is set as parallel rays (that is, the point A' is fixed in the line H of the far-field), the design procedure will guarantee a sharp cut off around A' but not along the whole H line. This is sufficient for automotive headlamps, since the gradient at the cut-off line need to be maintained only straight ahead, around just the central point of line H.

In FIG. 6B, the calculation of the free-form surface element 616 is done with the following two conditions: (1) it must contain one of its edge lines, for instance 617; (2) the rays of bundle A', if traced backwards, must come from the edge curve 613 on surface 611. (Note that 617 and 613 are already known from the 3D SMS initial design.) The focusing of the slope discontinuity at 613 (as occurred in FIG. 5 in two dimensions) is the reason why the sharp cut-off is defined near A'. This calculation is analogous to the calculation of the Cartesian oval PM of FIG. 4 that focused O on T in two-dimensions (O is analogous to 613 and T to A').

When a 2-bundle at the target that is different from A' is traced back, the lenticular free-form surface 616 will not focus it perfectly on a curve of surface 611. This is analogous to the aberrations that would appear in two-dimensions in FIG. 4, when point S is traced back through Cartesian oval PM, which will not focus perfectly on L. In this three-dimensional case, however, we have more bundles to trace back: as B', C' and D'. Regarding B', since it has been chosen to also lie on line H as shown in FIG. 6.A, and the SMS spines are designed with bundles A' and B', the backwards ray trace of B' through 616 will approximately pass through the edge 613 on surface 611, as A' does exactly by design. Regarding C' and D', the selection of the SMS spines as edge lines (described in section 1.3) is done to ensure that when traced backwards through 616, rays of C' and D' will also nearly pass though the opposite edge curve 618.

The design of the free-form surface 616b of FIG. 6B, which is the lenslet coupled to 616, is done in a symmetric way, that is, by applying the following two conditions: (1) it must contain one of its edge lines, for instance 613; (2) the rays of bundle C must pass through the edge curve 617 on surface 612. This design of 616b is not necessary for the sharp definition of line edge H, but will maximize the illuminance on the target (or intensity, if the target is located at infinity) for a given exit-aperture size. This calculation is analogous to the that of the Cartesian oval OL focusing R on P in two-dimensions shown in FIG. 4 (R is analogous to C and P to 617).

The previous construction of the free-form lenticular elements can be considered as a particular case of the generalization of Cartesian oval's definition, into three dimensions. A generalized Cartesian oval surface is defined as one that transforms a given input-wavefront into a given output-wavefront, whether by refraction or reflection. The particular type of generalized Cartesian oval, which we will label as COv(W, $\Gamma_f,\Gamma_c$) to explicitly show its input data, is defined as the surface that contains a particular curve $\Gamma_c$ and focuses a particular 2-bundle of one of its wavefronts W to target $\Gamma_f$. The algorithm to calculate it is disclosed in section 4.1 below.

One skilled in the art of computational lens design could apply the previous description to substantially any other combination of two surface types (refractive, reflective). Another possible modification is the realization of the design with lenticular elements on a lens encapsulating the source, with their corresponding lenticular elements as facets of a Fresnel or total internal reflecting (TIR) lens. FIG. 6D shows the case of TIR lens 635 and solid dielectric lens 636 encapsulating source 641. The 1-dimensional integration is produced by lenticular pairs exemplified by 640-640b and 637-637b, while nearly-vertical facets such as 638 are designed to have flat profiles, fulfilling the draft angle condition so as to guarantee demolding.

1.2 Two-directional Kohler integration.

Figure 6C:
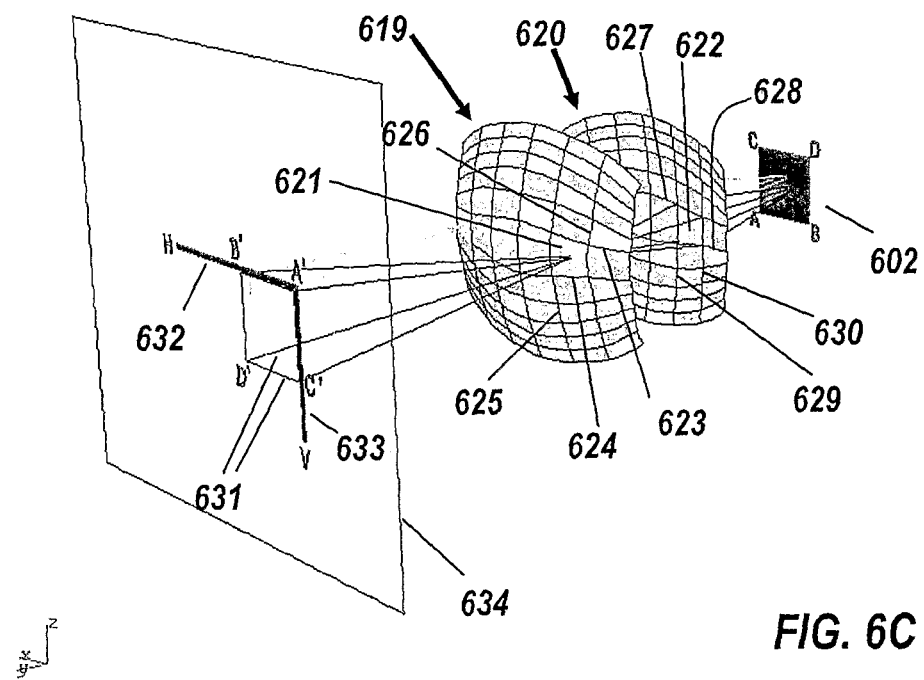
FIG. 6C shows a 2-directional Kohler integrator free-form lens design.
Figure 6D:
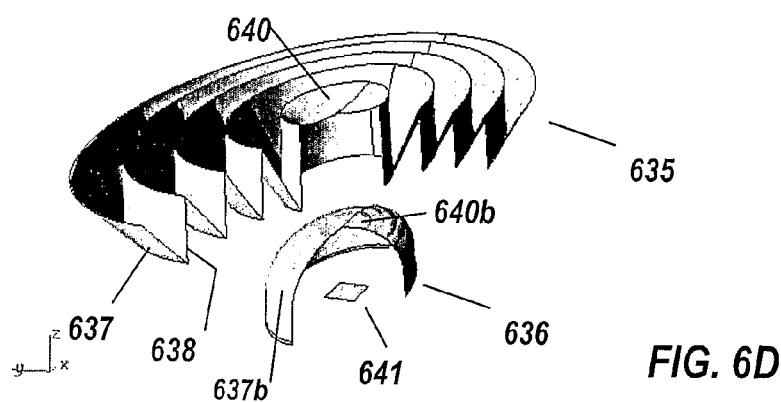
FIG. 6D shows a TIR-R with a 1-directional (radial) Kohler integrator design.

FIG. 6C shows a two-directional Kohler free-form integrator lens. For the initial SMS design of the 2-directional integrator, the output 2-bundles A', B' and C' (not shown in the figures) are different from those chosen for the 1-directional integrator of section 1.1. The difference in the output bundles can be appreciated by comparing the position of the projected enlarged chip images 631 in FIG. 6C with that of 603 in FIG. 6A.

The bidirectional integrator comprises two surfaces 619 and 620, which are formed by pairs of free-form lenticular elements such as 621 and 622, whose edge lines are the curve segments of the mesh of SMS spines and SMS ribs of the initial 3D SMS design. Such an initial 3D SMS device would be similar to that of FIG. 6A.

FIG. 6C shows that lenticular element 621 is bounded by spines 623 and 624, and by ribs 625 and 626, while 622 is bounded by spines 627 and 628, and by ribs 629 and 630. The selection of the SMS spines that will perform as edge lines is explained below in section 1.3. The edge-lines constitute two crossing families of spaced lines on the 3D SMS free-form surfaces, in general not mutually orthogonal. This mesh is analogous to the rectangular-mesh edges of a classical integrator lenslet array.

This bidirectional integration provides insensitivity to LED-to-LED variation in the two dimensions of the chip. This means that the pairs of lenticular elements approximately image one another, as is also done in conventional Kohler integrators.

As in the one-directional case, the surfaces to design only provide one degree of freedom to image perfectly, for instance, a single 2-bundle. For instance, 621 of FIG. 6C can be designed as the Cartesian oval that images sharply on bundle A' the corner of lenticular element 622, defined by the intersection of edge lines 628 and 629. A point on this Cartesian Oval must be specified for its full definition. Such a point can be chosen as any of the corners of 621, defined in the second step when the spines 623 and 624, and ribs 625 and 626 were calculated. For anyone skilled in the art it is obvious that instead of sharply imaging a corner of the lenticular element 622, the global imaging quality could be optimized.

This sharp imaging of a corner, however, is interesting for some automotive applications. If the 2-bundle A' is chosen in the first step as that providing a fixed point on the target 634 (that is, parallel rays for the case of the target at infinity), the A' corner given by the intersection of the H line 632 and the V line 633 will be sharply defined. This corner achieves the sharp definition of the step of low beam pattern, while the highly demanding minimum and maximum illuminance photometric specifications near the step are not sensitive to luminance variations across the LED chip.

The design of the free-form surface 622, which couples to lenslet 621, is done in a symmetric way: for instance, 622 can be designed as the Cartesian oval that sharply images bundle C onto the corner of lenticular element 621, defined by the intersection of edge lines 624 and 626. This design of 622 is not necessary for the sharp definition of the corner A' at the target, but will maximize the illuminance on the target (or intensity, if located at infinity) for a given exit-aperture size.

1.3 The RXIR Free-Form Integrator

Figure 7:
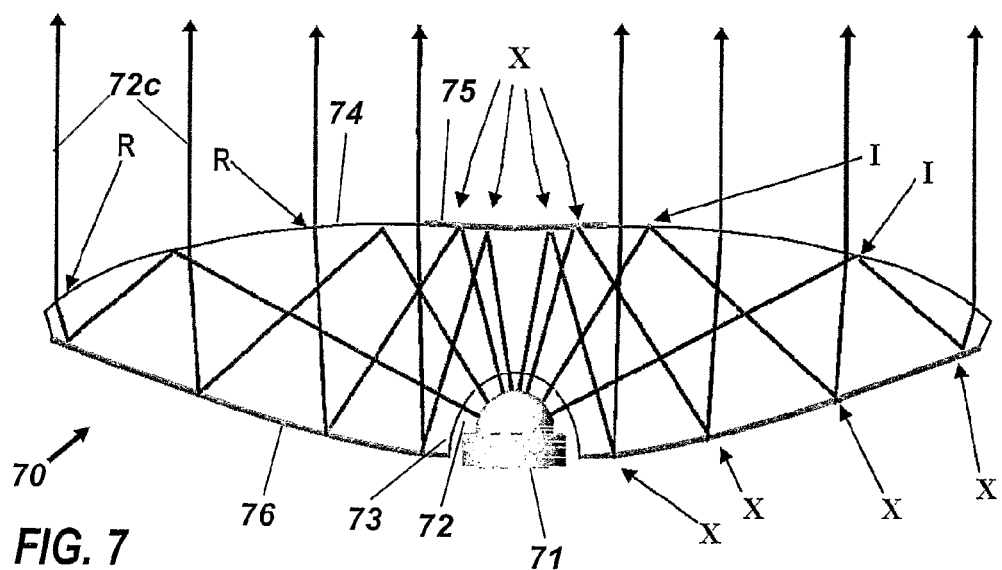
FIG. 7 shows the profile of an RXIR lens.

To set the stage for a detailed explanation of how to generate the preferred embodiments disclosed herein, FIG. 7 shows a cross-section of the RXIR lens 70, disclosed in U.S. Pat. No. 6,639,733 by Minano et al, and in the U.S. Patent-Pending application Ser. No. 10/269,479. The RXIR is centered on LED package 71, which hemispherically emits rays 72 into surrounding entry surface 73. The 'RXIR' designation refers to the actions that LED light undergoes, but in reverse sequence. First is refraction (R) at the entry surface 73. Next there is total internal reflection (I) on the exit-face 74 (a small portion of rays are reflected by the central front surface coating 75). Next is reflection (X) off coated rear surface 76. Then the rays are refracted (R) out uncoated exit-face 74 to become collimated rays 72c.

FIG. 8 is a cutaway view of circularly symmetric RXIR lens 80. showing bell-shaped entry surface 81, front or top exit surface 82, and reflectively coated lower or rear surface 83. LED chip 84 is immersed in hemispheric dome 85, and every point on it is emitting a hemispheric wavefront upwards onto dome 85. Sample-rays 86 of first input wavefront $W_{s1}$ radiate from one corner of chip 84 and exit the lens as wavefront-patch 86e, part of first output wavefront $W_{c1}$. Sample-rays 87 of second input wavefront $W_{s2}$ radiate from an adjacent corner of chip 84, and exit the lens as wavefront-patch 87e. part of second output wavefront $W_{c2}$. Both sets of rays can be seen going upward through dome 85 and input surface 81. thence to totally internally reflect off of front surface 82, move downward to rear-mirror surface 83, and upward to be refracted by front surface 82 into their final wavefront shape.

Figure 9A:
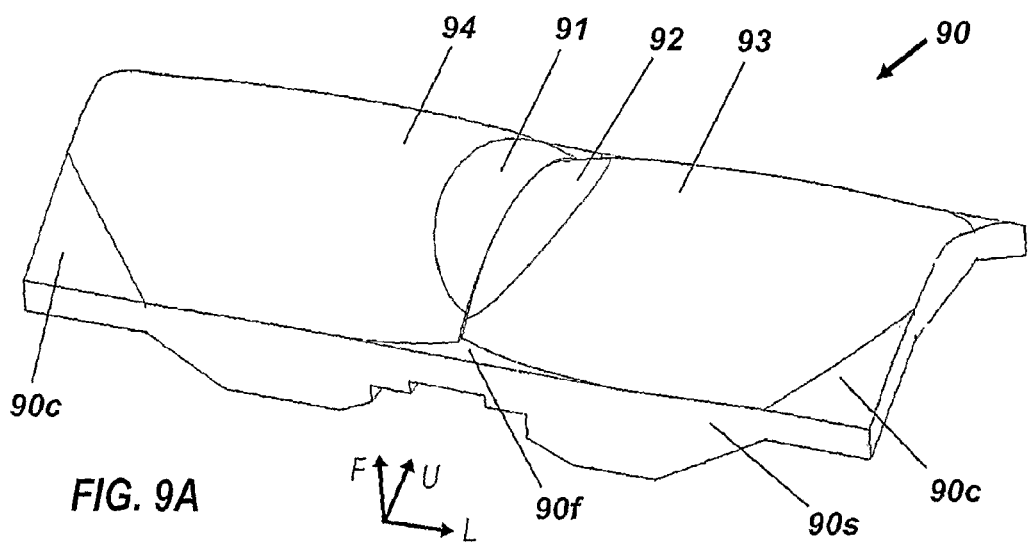
FIG. 9A is a perspective view of the top of a lenticular free-form RXIR lens for an automotive LED headlamp.

A specific example of some embodiments is an LED vehicular headlamp, fulfilling all the low-beam prescriptions of the United States and Europe. FIG. 9A is an external perspective view of free-form RXIR integrator headlamp lens 90, also showing the on-vehicle directions L for left, F for frontward, and U for upward, which will be used in the descriptions of FIG. 9A to FIG. 9F below.

RXIR lens 90 has non-circular entry, reflective, and top surfaces, as well as free-form lenticulations. As described next, device 90 contains both 1-directional and 2-directional lenticular elements. Independently of the inevitable on-chip spatial variation LED luminance and its position tolerances, the 1-directional integrator elements will provide the sharp vertical cut-off gradient and the 2-directional integrator elements will provide sharp vertical and horizontal definition of the hot spot.

Figure 9B:
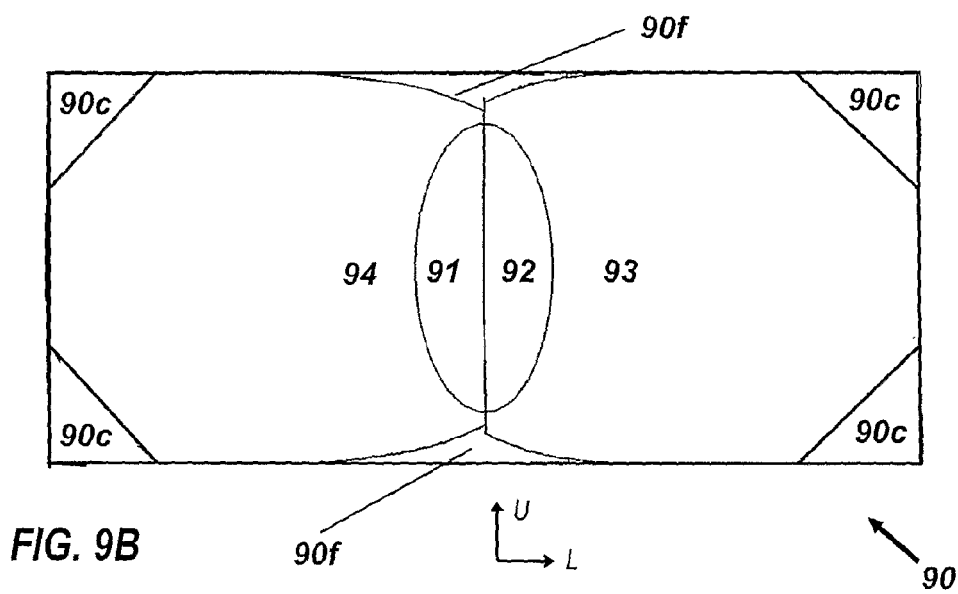
FIG. 9B is a plan view of the lens of FIG. 9A.

FIG. 9B shows the front surface of RXIR lens 90. This surface is analogous to surface 74 in FIG. 7. It comprises mirrors 91 and 92, exit surfaces 93 and 94, and optical inactive flat surfaces 90f and corner flanges 90c. The perspective view in FIG. 9A shows the same surfaces as well as optically inactive side surface 90s.

Figure 9C:
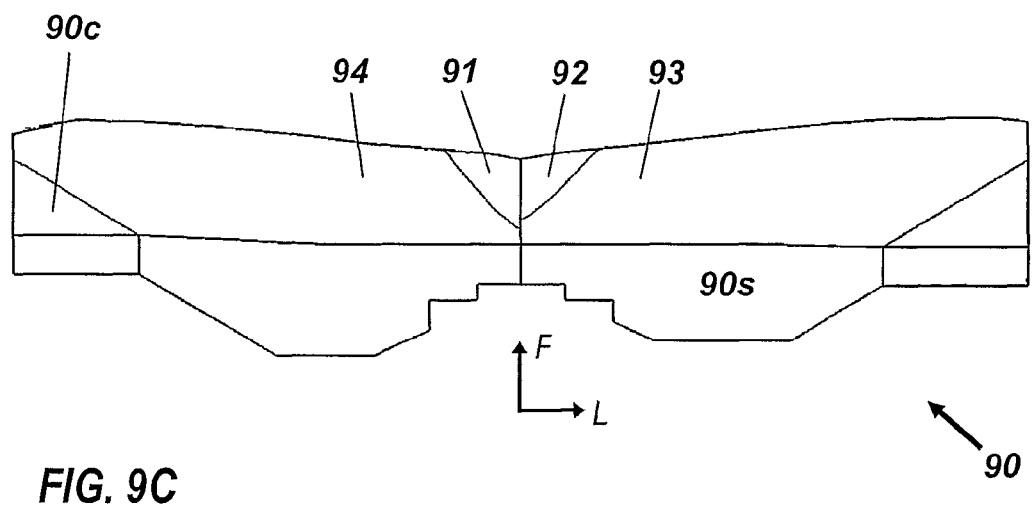
FIG. 9C is a side view of the lens of FIG. 9A.

FIG. 9C is a left view of lens 90 showing all these features.

Figure 9D:
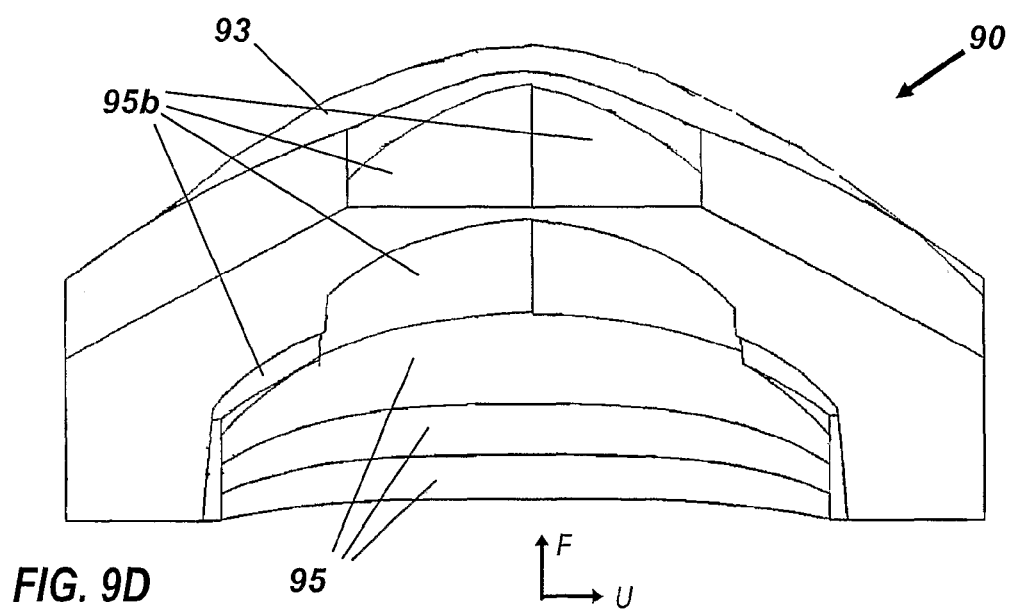
FIG. 9D is an end view of the lens of FIG. 9A.

FIG. 9D is a top view of lens 90, showing part of the front or exit surface 93 and part of the bottom-mirror X surface, in which various free-form lenticular elements 95 and 95b can be seen.

Figure 9E:
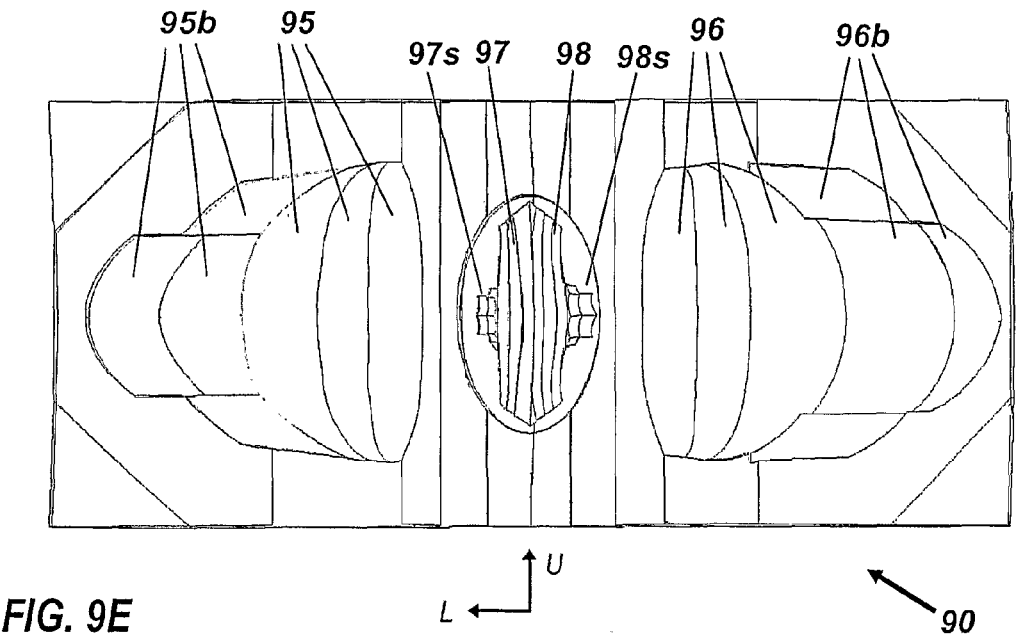
FIG. 9E is a bottom view of the lens of FIG. 9A.

FIG. 9E is a back view of lens 90. Optically active lenticular surfaces 95, 95b, 96 and 96b are mirror coated and belong to surface X of the RXIR, which is analogous to surface 76 of FIG. 7. Also shown are lenticular surfaces 97, 97s, 98, and 98s, which belong to the RXIR entry surface (analogous to surface 73 of FIG. 7).

Figure 9F:
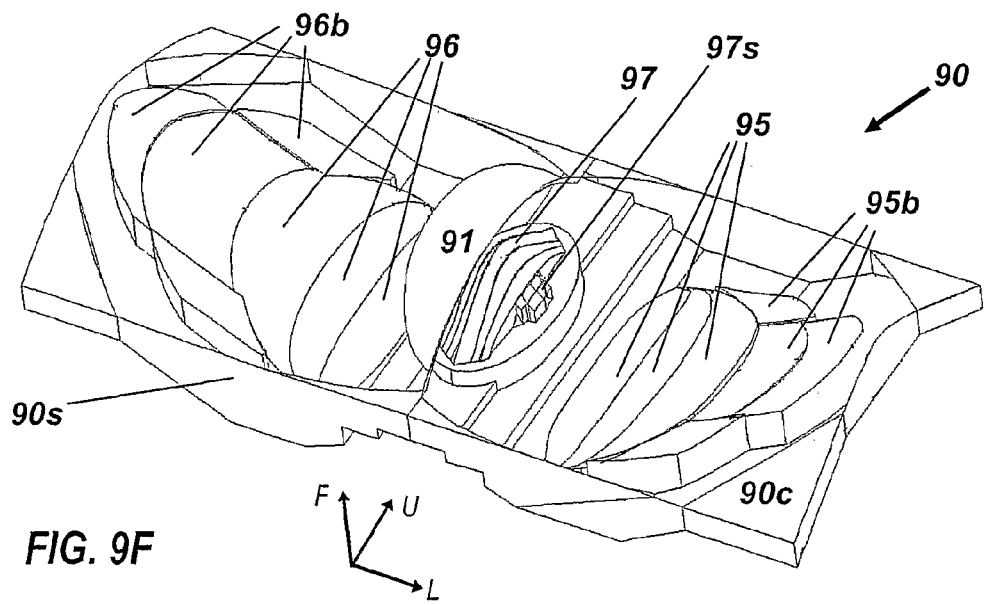
FIG. 9F is a bottom perspective view of the lens of FIG. 9A.

FIG. 9F reprises FIG. 9A, but with front surfaces 92-94 removed, thereby revealing back lenticular reflective surfaces 95, 95b, 96 and 96b and lenticular refractive entry surface 97, 97s, 98 and 98s.

Figure 10:
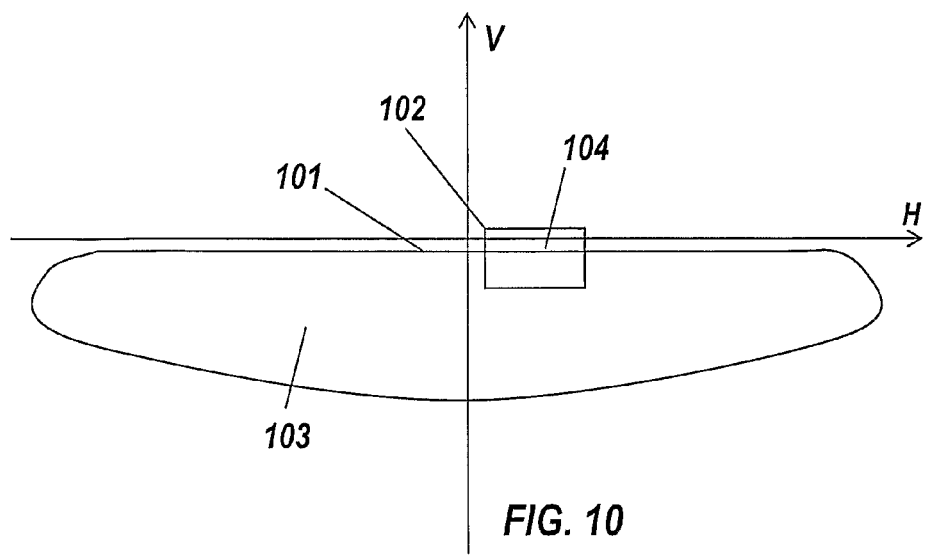
FIG. 10 shows an automotive headlamp prescription.

RXIR 90 can be design so an LED can produce the low beam pattern shown in FIG. 10. A sharp cut-off line 101 and a sharp corner 102 are obtained independently of the inhomogeneities of the LED luminance, and of changes of the LED position within a pre-specified tolerance. The sharp cut-off line 101 and the illumination for area 103 are provided by the lenticular mirror surfaces 95 and 96 and their corresponding entry lens couples 97 and 98, which are 1-directional integrators. On the other hand, the sharp corner 102 and the illumination for hot spot area 104 are provided by the lenticular mirror surfaces 95b and 96b and their corresponding entry lens couples 97s and 98s, which are 2-directional integrators.

Next subsections 1.3.1, 1.3.2, 1.3.3, and 1.3.4 will describe the details of the design method of the RXIR free-form integrator 90.

1.3.1. Initial 3D SMS RXIR Design as Base for the RXIR Free-Form Integrator Design.

Figure 11A:
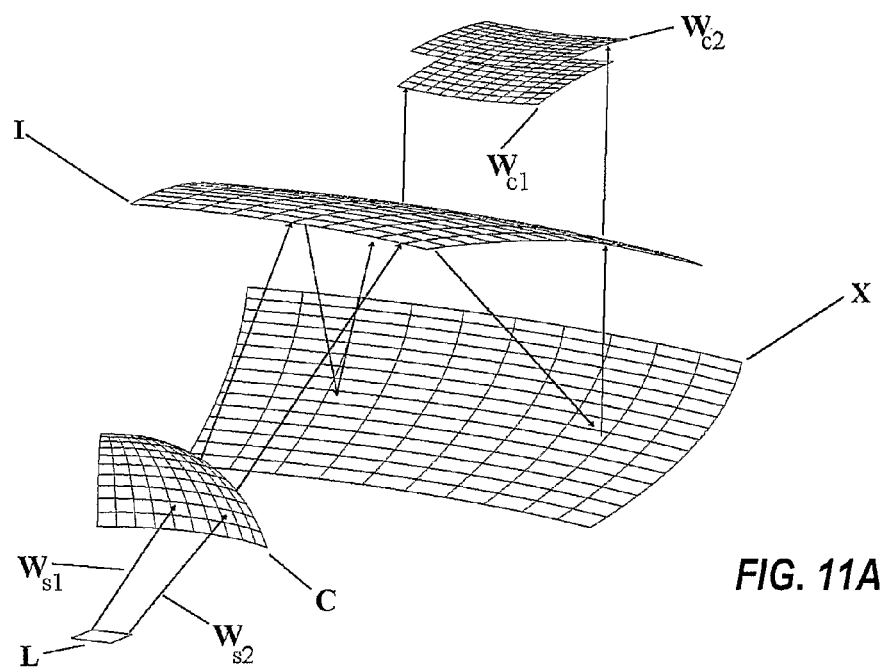
FIG. 11A shows how two input wavefronts couple to two output wavefronts.

FIG. 11A is diagram of a portion of the initial RXIR lens generated by the 3D SMS method. This lens will be used as a basis for the generation of the final Kohler integrator device. In order to simplify the drawings, the dome of the LED has been suppressed. For anyone skilled in the art it is obvious to include it in the design (just the input wavefronts must first be refracted by the LED dome).

For the corners of LED L come arrows $W_{s1}$ and $W_{s2}$. They are edge rays representing the two in-air source wavefronts used to generate the surfaces of the lens. As FIG. 8 shows, however, the actual situation is that such rays first come out of dome 85, in which chip 84 is optically immersed.

Next in FIG. 11A, in-air edge rays $W_{s1}$ and $W_{s2}$ encounter entry surface C, whence they are refractively deflected onto top surface I, by which in turn they are totally internally reflected down to back surface X. The coated reflector on surface X reflects the rays back upwards to I, whereupon they are out-refracted to form the two exit wavefronts $W_{c1}$ and $W_{c2}$.

The 3D SMS RXIR lens can be designed by first prescribing an adequate surface C, holding it constant and generating surfaces I and X simultaneously by the 3D SMS method. This method, as disclosed in U.S. Utility application Ser. No. 10/901,919 by the present inventors, begins by generating SMS spines and SMS ribs, in corresponding segments on the two surfaces X and I. These spines are subsequently linked with the crossing ribs. The resulting mesh is 'skinned' by calculating the intermediate points to give an array of separate surface-patches.

Figure 11B:
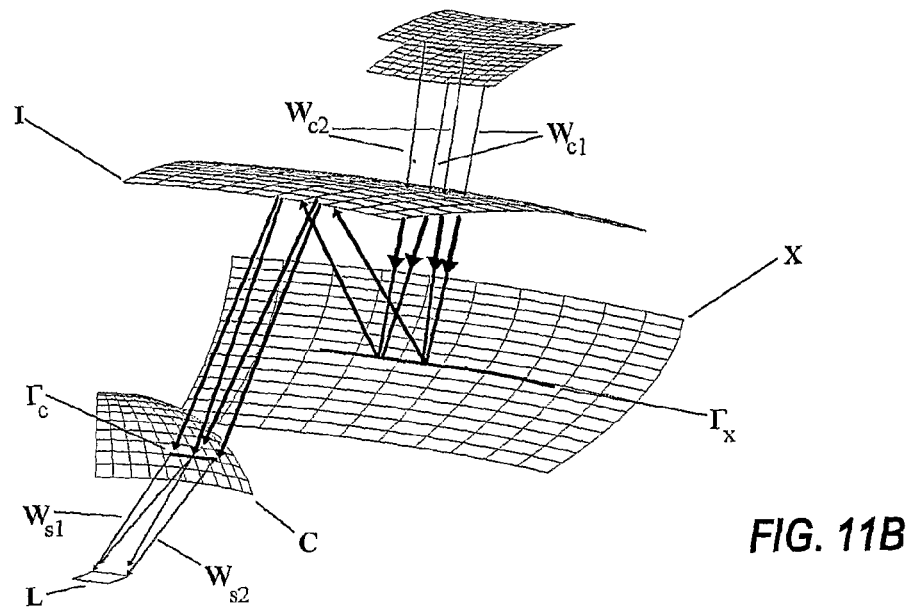
FIG. 11B shows the output wavefronts determine particular spines on the surfaces being generated.

FIG. 11B shows a spine $\Gamma_C$ on C spine $\Gamma_X$ on X being generated. Two rays each of wavefronts $W_{c1}$ and $W_{c2}$ are shown being reverse ray-traced back to two common points on spine $\Gamma_X$. From there the two ray-pairs diverge to meet on surface C and form the segment shown of spine $\Gamma_C$, whence they are refracted to their source-points on adjacent chip near-corners. This cross-stitching effect is how the SMS method generates successive segments of a spine.

Figure 12:
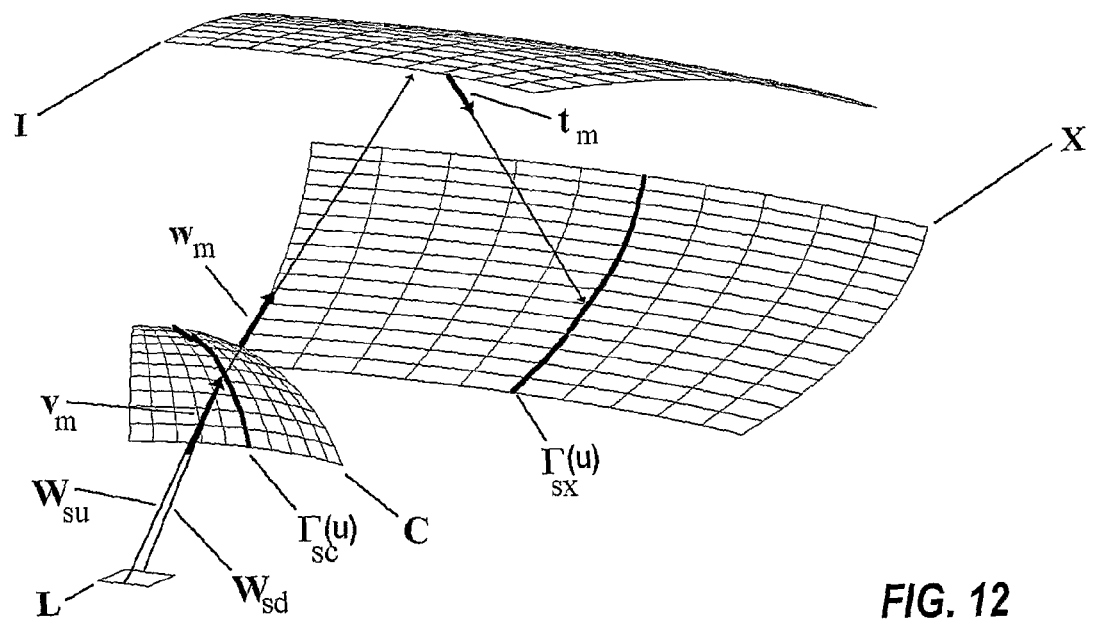
FIG. 12 shows the generation of seed ribs.

The initial seed-rib $\Gamma_{sc}$ on surface C shown in FIG. 12 is calculated in a analogous way, using, for instance, input wavefronts $W_{su}$ and $W_{sd}$ and their corresponding associated exit wavefronts (not shown). Note that in the design of this RXIR four different wavefronts (at the input: $W_{s1}$, $W_{s2}$, $W_{su}$ and $W_{sd}$) are being used, while in the previous description of free-form integrator lens in FIG. 6B and FIG. 6C only three were used (at the input: A, B, and C). This due to the simpler wavefront selection in the lens case for making that first explanation clearer: it corresponds to the shift of $W_{su}$ and $W_{sd}$ along the chip sides until $W_{s2}$ and $W_{sd}$ coincide.

1.3.2. Selection of SMS Ribs and Spines as Edges of the Lenticular Elements in the RXIR Free-Form Integrator.

The RXIR integrator comprises a lenticular modification of the 3D RXIR lens, keeping surface I unchanged while calculating a suitable pair of surface lenticulations of C and X.

For the calculation of the edges of said lenticulations pairs, we will find a one-to-one correspondence between the SMS spines, and also a one-to-one correspondence between the SMS ribs.

For defining the one-to-one correspondence between the SMS spines, FIG. 12 shows the same (as in FIG. 11) surfaces C, I, and X, with seed rib curve $\Gamma_{sC}(u)$ established on C, with explicit dependence on a parameter u. Proceeding off of emitting chip L are wavefronts from opposite mid-edges, namely $W_{su}$ from the upper mid-edge and $W_{sd}$ from the lower mid-edge. The mean unit-vector between them is $v_m$, which is shown ray-traced through C to become unit-vector $w_m$. The ray is reflected off of I to give unit-vector $t_m$, which ray intercepts surface X on curve $\Gamma_{sX}(u)$, with one-to-one correspondence between the two mid-edges according to parameter u.

Figure 13:
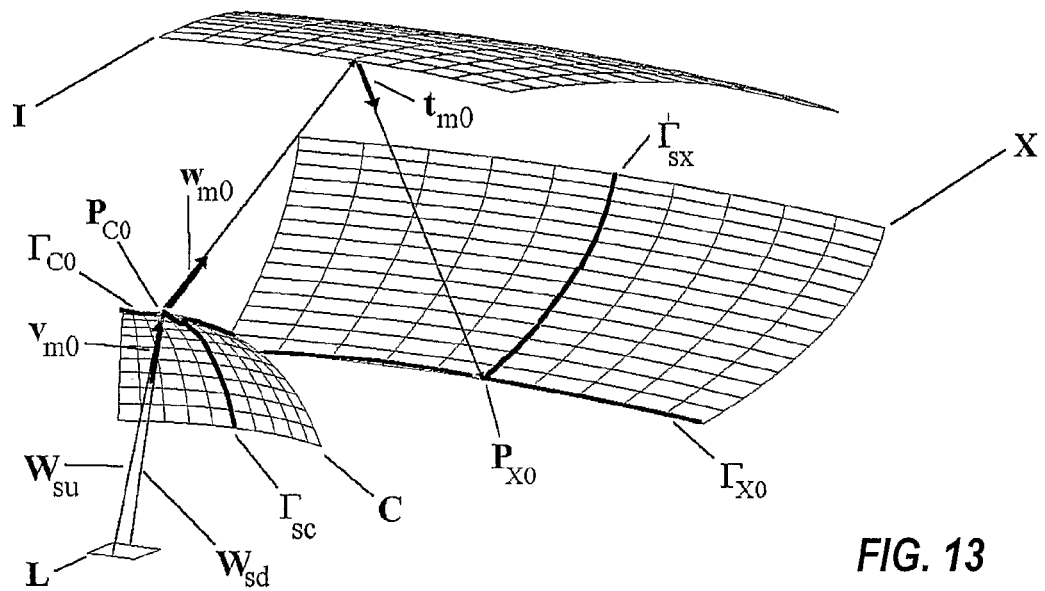
FIG. 13 shows initial spines being generated.

FIG. 13 also shows first point (u=0) $P_{C0}$ at the beginning of seed rib $\Gamma_{sC}$, and corresponding first point $P_{X0}$ on surface X. Using the method shown in FIG. 11B, spines $\Gamma_{c0}$ through $P_{c0}$ and $\Gamma_{X0}$ through $P_{X0}$ are established.

For defining the a one-to-one correspondence between the SMS ribs, the same procedure can be applied replacing the rib $\Gamma_{sC}(u)$ and the wavefronts $W_{su}$ and $W_{sd}$ by the spine $\Gamma_{C0}$, whose parameter v will define the one-to-one correspondence, and the wavefronts from opposite left and right mid-edges (not shown).

Once this one-to-one spine and ribs correspondence is established, the specific spines that will act as edges of the lenticular elements can be calculated.

Let us describe the selection of the specific spines as edge lines. The selection of ribs is completely analogous.

We can freely select the first spine on surface C, for instance, the one of parameter u=0, already labeled as $\Gamma_{C0}$, whose point at the seed rib is $P_{C0}$. The one-by-one correspondence is used to calculate the corresponding first spine on surface X as that with the same parameter value u=0, that is, $\Gamma_{X0}$, whose point at the seed rib is $P_{X0}$.

Figure 14:
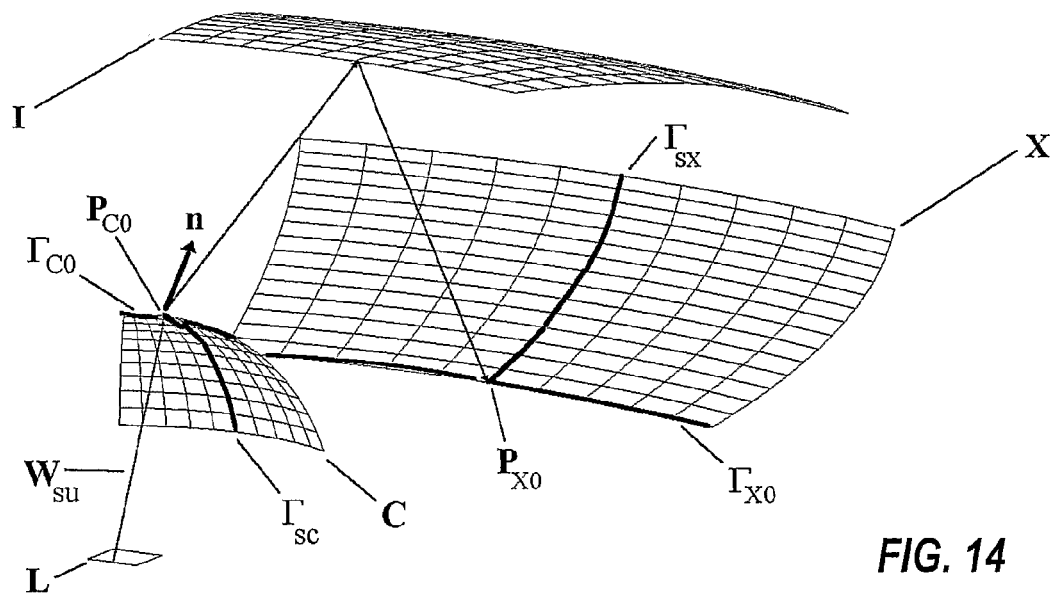
FIG. 14 shows how the normal vector acts.

Next, the surface normal n of the lenticular surface at $P_{C0}$ has to be calculated. FIG. 14 also shows that lenticular surface normal n, which differs from the surface-normal of C at $P_{C0}$, but remaining orthogonal to spine $\Gamma_{C0}$. Such difference is because normal vector n is established to refract upper-edge ray Wise so that it intercepts spine $\Gamma_{X0}$, in contrast to $v_{m0}$ doing so in FIG. 13 refracting on the surface-normal of C at $P_{C0}$.

Figure 15:
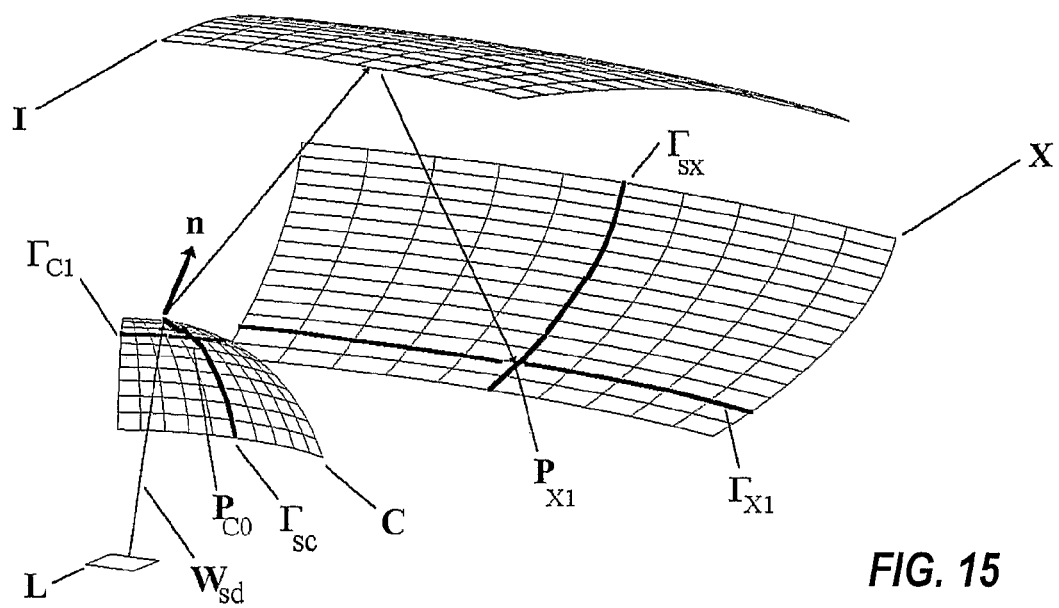
FIG. 15 shows further spines being generated.

FIG. 15 shows the same surface normal n refracting lower-edge ray $W_{sd}$ to point $P_{X1}$ on X. The $u=u_1$ value of point $P_{X1}$ corresponds to point $P_{C1}$ on C, wherefrom both spines $\Gamma_{X1}$ and $\Gamma_{C1}$ established. The first lenticular elements are then located between the spines of parameters $u=0$ and $u=u_1$, that is, between curves $\Gamma_{C0}$ and $\Gamma_{C1}$ on surface C and between curves $\Gamma_{X0}$ and $\Gamma_{X1}$ on surface X.

Applying the same process replacing $\Gamma_{C0}$ by $\Gamma_{C1}$, the parameter $u=u_2$ and its corresponding spines $\Gamma_{X2}$ and $\Gamma_{C2}$ are obtained. The second lenticular elements are then located between the spines of parameters $u=u_1$ and $u=u_2$. This process can be repeated to find the sequence of spine edges.

In case one-directional integration is selected, it can be done with the edges laying on the edge ribs or on the edge spines (depending on the desired direction of integration). If two directional integration is selected, the mesh created by the edge ribs and spines will define the lenticular elements boundaries. Note that the edges will be the same for both the one-directional and two-directional integrator designs, but obviously the free-form surfaces will be different.

1.3.3. Design of the 1-Dimensional Integrator Elements of the Free-Form RXIR Integrator.

Figure 16:
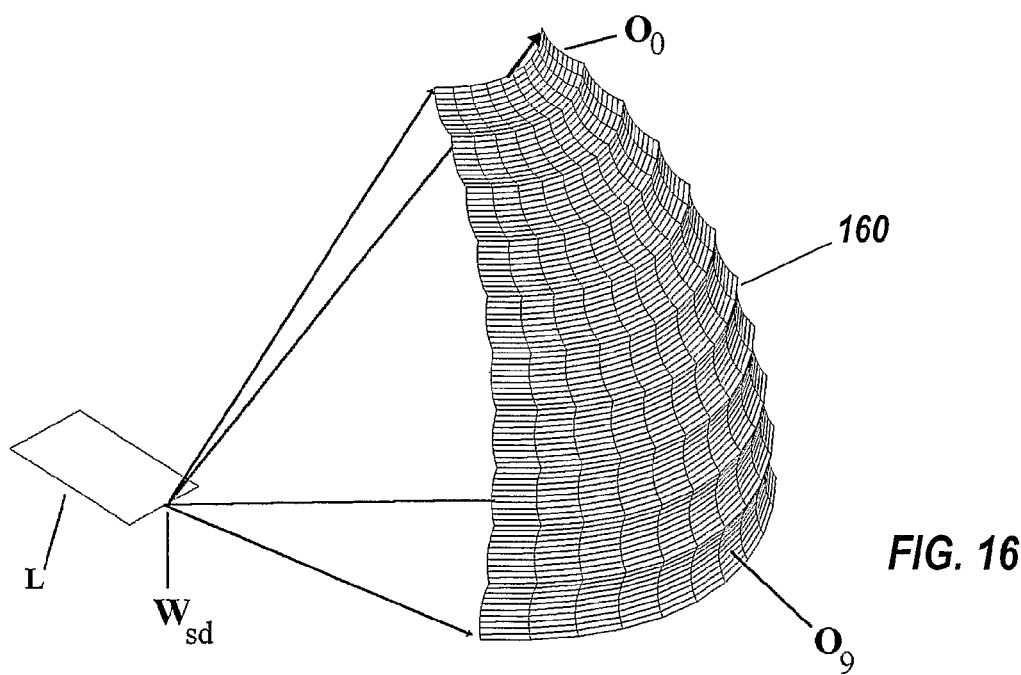
FIG. 16 shows a lenticular input surface.

From a different viewing angle than previously, FIG. 16 schematically shows Cartesian-Oval lenslets $O_0$ through $O_9$ replacing the original entry surface C with lenticulated entry-surface 160. Four rays of source wavefront $W_{cd}$ are shown going to the corners of this new entry-surface, 160. Each lenslet $O_0$ through $O_9$ has its own respective focal curve on target $\Gamma_{X0}$ through $\Gamma_{X9}$.

Figure 17:
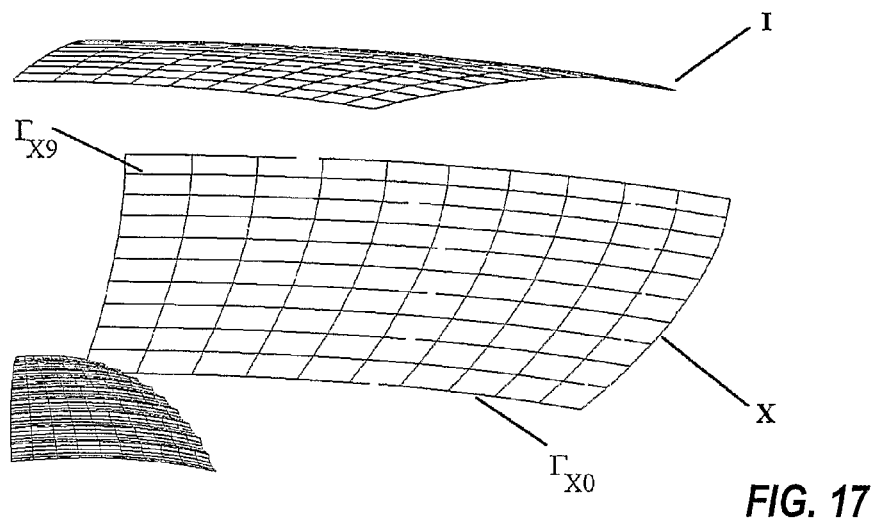
FIG. 17 shows same in relation to RXIR surfaces.

FIG. 17 shows these focal lines on surface X. They are analogous to the sharp illumination edge, P, depicted in FIG. 5.

The construction of the first lenslet on surface C of FIG. 15 is done with the condition that contains curve $\Gamma_{C0}$ and brings wavefront $W_{su}$ to a focus on target $\Gamma_{X1}$. This can be done using a method similar to the $\text{COv}(W, \Gamma_f, \Gamma_c)$ referred to above in section 1.1. The difference come form the existence of the intermediate surface I on which the rays reflect by total internal reflection. We will refer to this modified method as $\text{COv}(W, \Gamma_f, \Gamma_c, I)$, which is explained in section 4.2. This algorithm is applied, for instance, as $\text{COv}(W_{C1}, \Gamma_{C0}, \Gamma_{X0}, I)$, to give a Cartesian Oval on X that will focus wavefront $W_{C1}$, having passed through surface I, onto spine $\Gamma_{C0}$ of lenslet $O_0$ of FIG. 16.

1.3.4. Design of the 2-Dimensional Integrator Elements of the Free-Form RXIR Integrator.

Figure 18A:
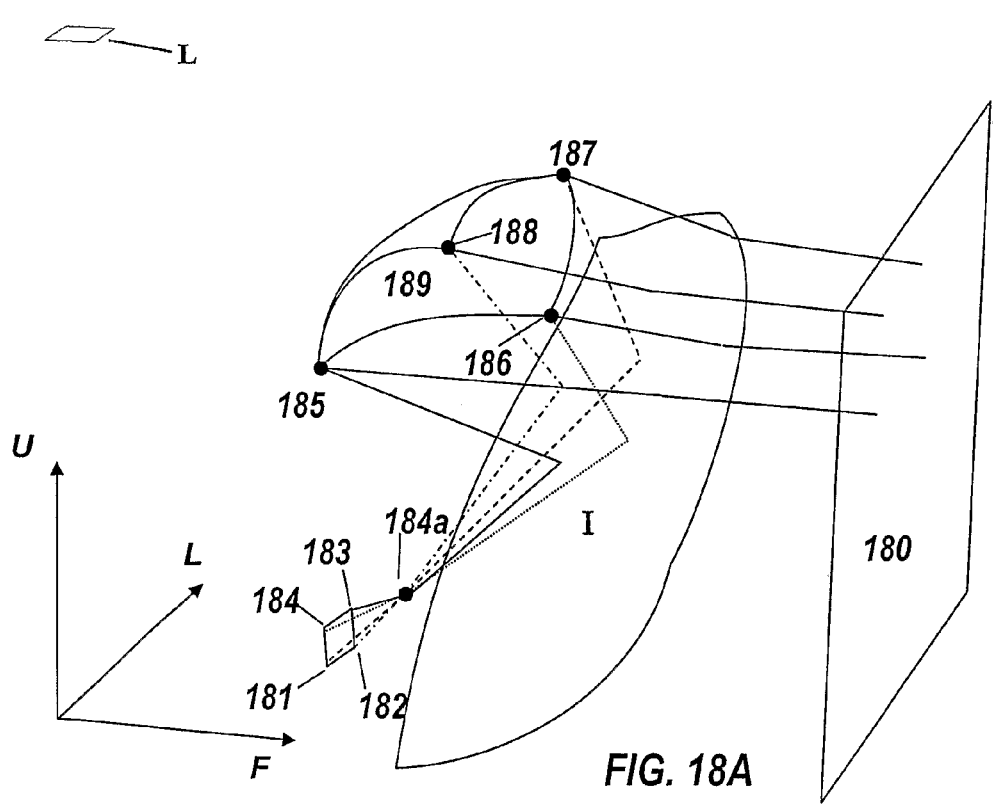
FIG. 18A shows the algorithm for the surface of FIG. 9A-9F.
Figure 18B:
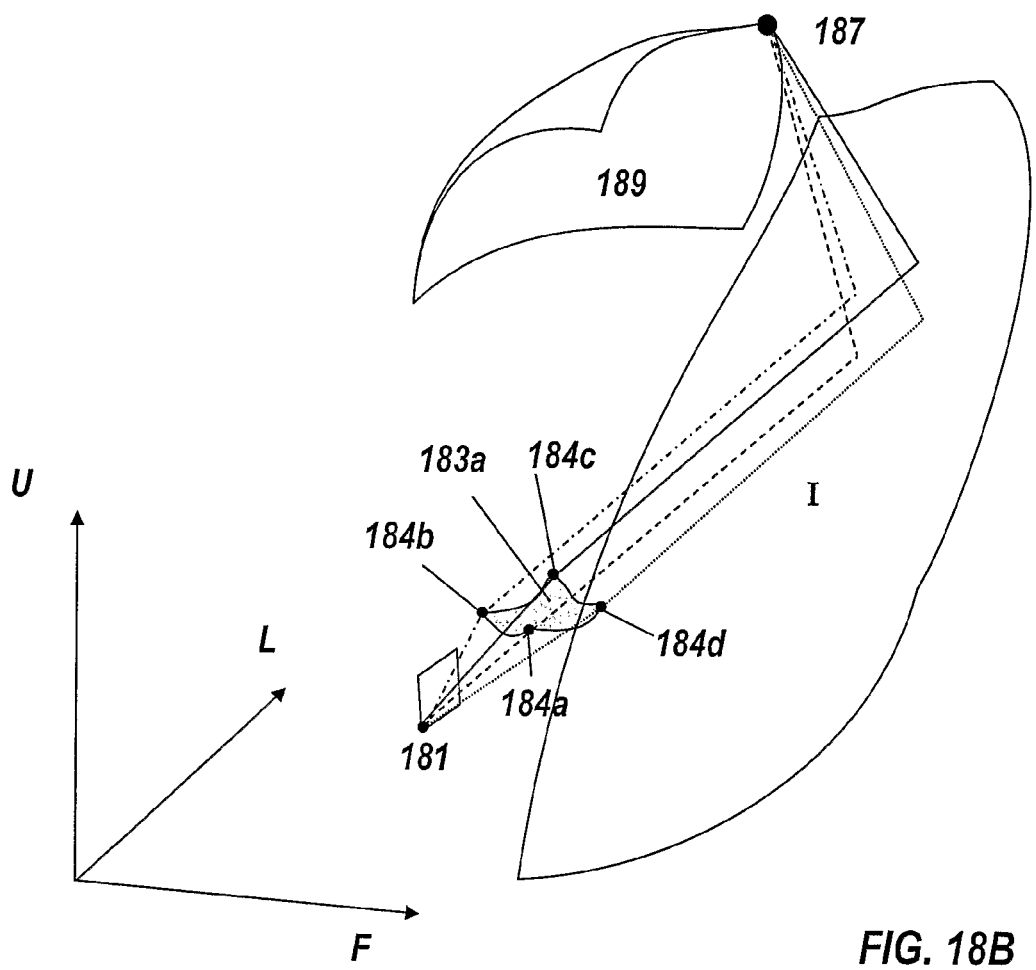
FIG. 18B shows further stages of same.

FIG. 18A and FIG. 18B show from another point of view a schematic drawing of the RXIR device 90 of FIGS. 9A-E. The construction of one pair of 2-directional integrator free-form elements of the RXIR can as described before for the case of the lens in FIG. 6C. Then just two Cartesian ovals are calculated with the conditions that they must contain one of the corners of the spine-rib mesh (already calculated in 1.3.2) and that must focus one edge of the chip/target to their corresponding corner of the spine-rib mesh. An alternative definition of the lenticular elements' corners is via the following steps:

1. Assume that we have selected the source and target wavefronts used for the design as the corners 181 to 184 of the (enlarged) chip and the corners of the hot spot area 104 in FIG. 10. The target wavefront 180 shown is the one corresponding to the point 182 of the hot-spot.

2. Select the points 184a and 185 contained in the lenticular element 183a of the entry surface C and in the lenticular element 189 of the reflector X, respectively.

3. Calculate the normal at point 184a of the surface 183a with the condition that the ray coming from 183 pass through the point 185 of the surface 189 after its reflection at the surface I.

4. Compute, along the ray that link the points 184a and 185, the optical path length between the spherical wavefront centered at 184a and wavefront 180.

5. Calculate the surface 189 as the Cartesian oval that couples the rays from 184a and wavefront 180.

6. Calculate the remaining corners 186, 187 and 188 of surface 189 by intersection of the rays passing through 184a and emitted form the chip corners 181, 182, and 184 with the already calculated Cartesian oval 189.

7. Compute the optical path length between 181 and the spherical wavefront centered at 187 along the ray linking them and passing through 184c (shown in FIG. 18B).

8. Calculate the surface 183a as the Cartesian oval that couples the wavefronts centered at 181 and 187.

9. Calculate the remaining corners 184a, 184b and 184d of surface 183a by intersection of the rays passing through 187 and emitted towards the corners of the hot spot area 104 in FIG. 10 with the already calculated Cartesian oval 189.

1.3.5. Color Mixing/Homogenizer Integrators

The Kohler integration devices in some embodiments have application in the field of LED color mixing or homogenization of non-homogeneous LED's in general illumination.

The free-form integrators with one-directional integrators can achieve excellent color mixing if the LEDs are aligned in the direction of the integration and are similar in the direction perpendicular to the direction of integration. When such alignment is not possible, the color mixing may be still good enough for general illumination application. This is the case of Kohler integrators in which the lenticulations have rotational symmetry. The integration is one-directionally done, in the radial dimension.

Figure 19A:
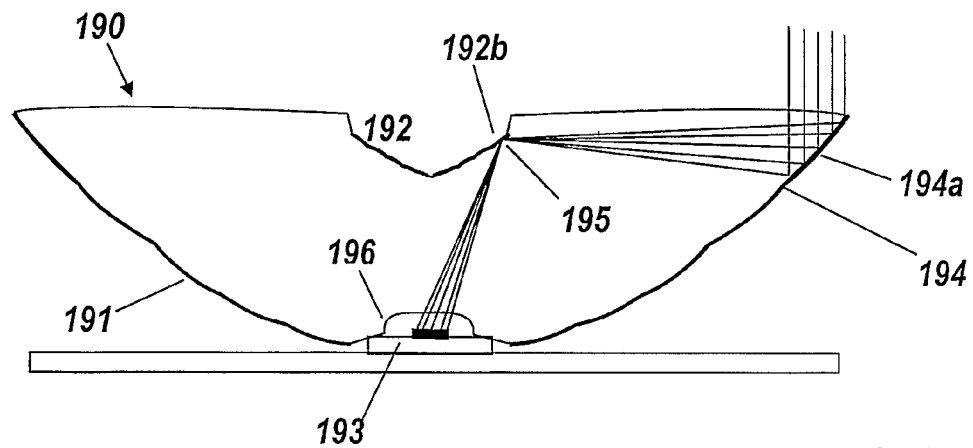
FIG. 19A shows a dielectric-filled XX device with radial Kohler integrator lenticulations on the two mirrors.

FIG. 19A shows the cross section of solid, dielectric two-mirror concentrator 190. It may be used as a device that performs high collimation and radial integration of outgoing light from source 193 that hits mirror 192. For high efficiency, the source 193 cannot be isotropic. If an isotropic source must be used, 193 should be a partially collimated source created from the isotropic collimated initial source. Alternatively, it can be used in the reverse way to integrate the light coming from several distant sources for concentration upon a target at 193.

This reversibility applies to all embodiments in this patent application. The preferred embodiments of FIG. 19 to FIG. 29 are in the concentrating mode, while FIGS. 30-33 are collimators. For any person skilled in the art of illumination optics, accomplishing the reverse operation is obvious.

For the device in FIG. 19A the entrance aperture and the exit aperture 196 can be flat. The segmented central secondary mirror 192 is substantially co-planar with the entrance aperture of the primary mirror 191. The segments on the primary, such as 194a, are essentially parabolic, with the focus at the associated mirror segment (192b) on the secondary and vertical axis. The secondary-mirror segments 192b are essentially elliptical with one focus at the location of the associated primary mirror segment 194a and other at the source 193. There is continuity in profile, but discontinuity in slope, in both secondary and primary at 195, 194.

Figure 19B:
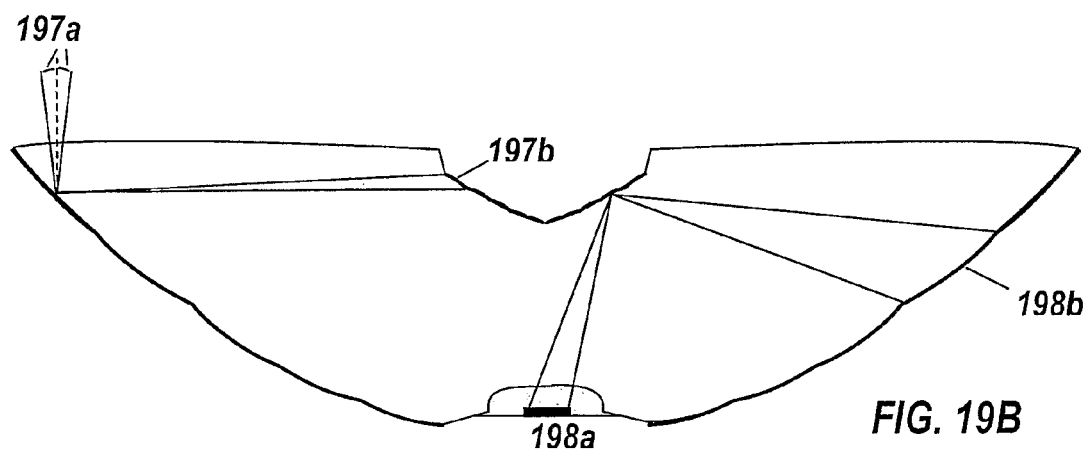
FIG. 19B is a further view of the two-mirror Kohler radial integrator device.

FIG. 19B shows how the edges of a given segment of the secondary mirror 197b are designed so that their images at infinity through 197a the associated primary segment match the design acceptance angle of the concentrator. On the other hand, the edges of a given segment 198b of the primary are designed so that their images on the target through the associated secondary segment match the target size 198a. Since the segments on the primary are uniformly illuminated, the illumination on the target is also uniform in two dimensions.

The mirror segments could be designed to optimize the global performance. For instance, the parabola or ellipses focal position(s), or the parabola's axis, could be consider parametric, so that a multi-parameter optimization program could determine the acceptance angle of the whole system. Alternatively, the parabola's axis could be chosen to coincide with one of the edges of the acceptance angle, with its focus placed at on of the edges of the associated secondary mirror. Also, the ellipses can have their focus coinciding with the edges of the target and of the associated primary mirrors.

Figure 19C:
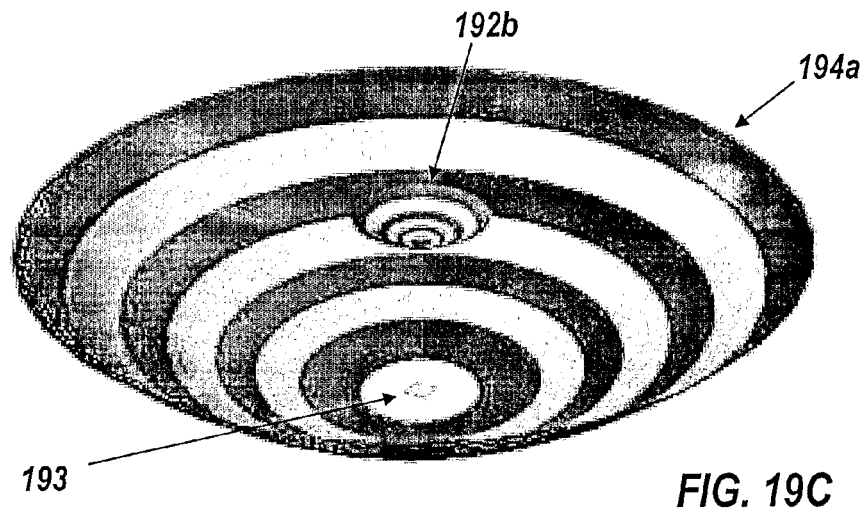
FIG. 19C illustrates a 3D view of the two-mirror Kohler radial integrator device.

The actual three-dimensional device is rotationally symmetric, as shown in FIG. 19C, so the segments of primary and secondary (as 194a and 192b) form rings. Since the Kohler integration is only done in the meridional cross-section, no sagittal mixing is obtained.

Figure 19D:
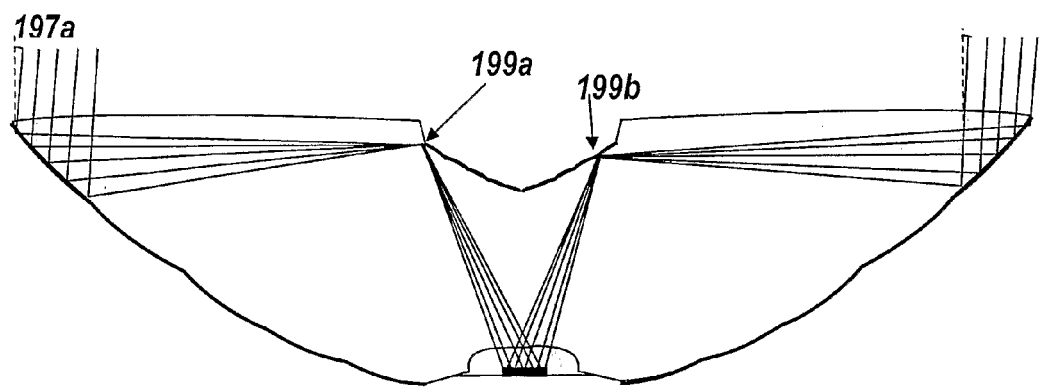
FIG. 19D illustrates the off-axis operation of the two-mirror Kohler radial integrator device.

If the far source is off-center but still within the design acceptance angle, the irradiance thin ring on each segment annulus of the secondary is displaced but it is still inside the segment. In the meridional cross-section, at the limit of the acceptance angle 197a, the source images are thus displaced from the center to edges 199a and 199b as shown in FIG. 19D. The maximum irradiance levels on the secondary and on the target remain unchanged.

For the concentrator as some embodiments disclosed in FIG. 19A to FIG. 19D, there are two refractive surfaces: the entrance aperture 190 and the exit aperture 196. If the entrance aperture surface is not flat, the rays should be traced through that surface in the design. For example, if the segments of the primary are parabolas when the entrance surface is flat, for a non-flat entrance surface, the primary's shape should be calculated to cause the impinging parallel rays, after the refraction on the non-flat entrance aperture surface. to be focused on the associated secondary. This calculation is called a generalized Cartesian Oval, which in general solves the inverse problem of calculating the optical surface (reflective or refractive) that couples the rays normal to two given wavefronts. The same considerations apply to the change of the exit aperture surface from a flat. Hemispherical shape. for instance. could he also prescribed.

Figure 20:
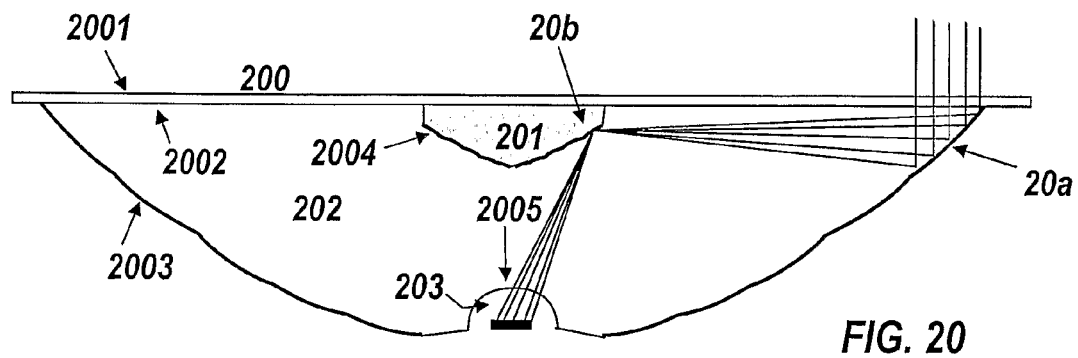
FIG. 20 illustrates a two-mirror Kohler radial integrator device that may be composed by volumes of different refractive indices.

FIG. 20 illustrates a more general two-mirror Kohler radial integrator optical system, comprising volumes 200, 201, 202 and 203, of different refractive indices. If 202 is air and 200 and 201 are of the same dielectric material (so that interface 2002 does not exist), the device in FIG. 20 reduces to that in FIG. 19A. The optical design of the device in FIG. 20 is done in the same way as described for the design of FIG. 19A. Segments 20a, 20b in FIG. 20 correspond to segments 194a, 194b in FIG. 19A.

Another embodiment considers that 202 is air, in which the optical losses due to absorption in that medium are eliminated. In this case, the flat cover 200 prevents dust from accumulating in the system, and protects mirrors from the environment. If medium 203 is also air, the target is not encapsulated, which increases the system optical efficiency by eliminating the Fresnel reflection on the interface 2005. It may be preferable, however, to encapsulate the target with a dielectric dense medium 203, such as silicone rubber. The prescribed surface 2005 of the encapsulating dielectric material will be considered in the design as a prescribed surface through which the rays are traced. Additional surfaces may be included as prescribed in the system, and the application of the same design procedure of some embodiments is straight forward for anyone skill in the art. For example, the encapsulating lens can be made of glass or transparent plastic, and the target coupled to it with a gel or a silicon rubber. In this case, an additional interface (without a specific optical function) will appear.

Instead of designing the two mirrors, any other two surfaces of the five surfaces 2001, 2002, 2003, 2004, and 2005 in FIG. 20 could be designed. Accordingly, nine alternative families of devices are derived, as illustrated in FIG. 21 to FIG. 29. For all these cases, the design is done in four steps:

(1) Three of the five surfaces are prescribed;

(2) The remaining two surfaces are calculated as the 2D profiles that couple two parallel input wavefronts, those defined by the acceptance angle, into the two spherical exit wavefronts centered on the target edges. Alternatively, the target and acceptance angle can be scaled down to converge to zero, and then resulting two surfaces will be aplanatic (i.e., stigmatic and fulfilling the Abbe sine condition). If the calculated surfaces are not manufacturable, a new selection of the three prescribed surfaces in step (1) is made, and step (2) repeated;

(3) Two of the five surfaces are selected;

(4) The two selected surfaces in (3) are recalculated to include the Kohler integrator segments as disclosed above, as ray traced through the prescribed or pre-calculated surfaces of step (1).

Figure 21:
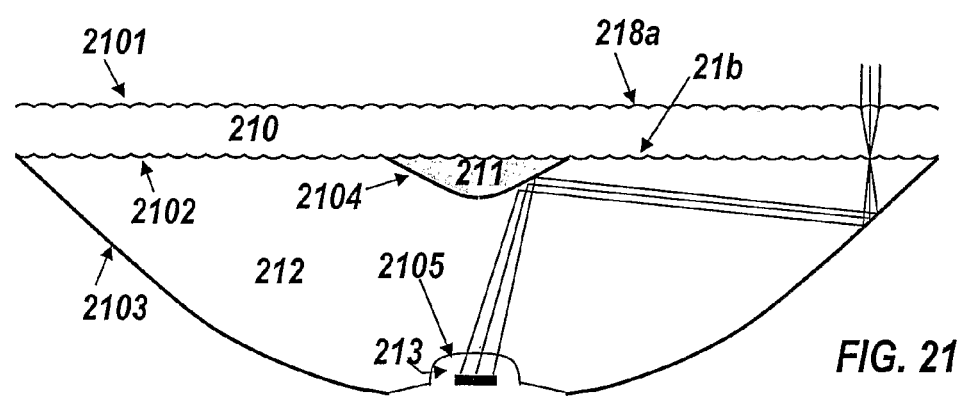
FIG. 21 illustrates a Kohler integrator device that may be comprised of volumes of different refractive indices, and the Kohler homogenization is done between the two surfaces of the front top dielectric cover.

FIG. 21 illustrates a Kohler integrator optical system comprising surfaces 2101, 2102, 2103, 2104, 2105, definine volumes 210, 211, 212 and 213, of different refractive indices. The Kohler homogenization is done between lens seements 218a, 21b of the two surfaces 2101 and 2102 of the front top dielectric cover 210. In some embodiments, the medium 212 is air and the lenses in cover 210 are top-down symmetric. The Kohler homogenization may he only in the radial direction. Alternatively, the Kohler homogenization can be done in both the radial and sagittal directions using with rotational symmetric lens units in the lens array, displaced either in a rectangular or hexagonal pattern. This embodiment would further increase the mixing capability of the lens. These Kohler integrating array lenses, acting alone, are conceptually similar to the ones used after parabolic mirror condensers in prior systems.

Figure 22:
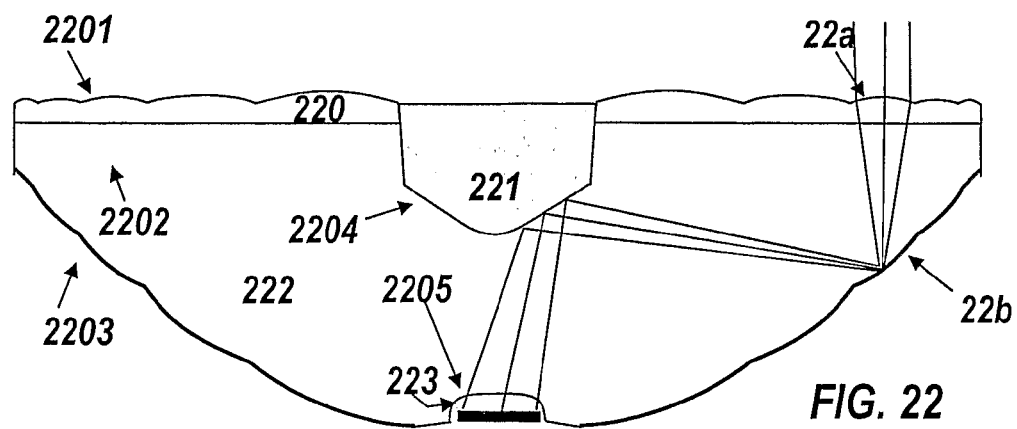
FIG. 22 illustrates a Kohler radial integrator device that may be composed by volumes of different refractive indices and the Kohler radial homogenization is done between the entry surface and the primary mirror.

FIG. 22 illustrates a Kohler radial integrator optical system comprising surfaces 2201, 2202, 2203, 2204, 2205 bounding volumes 220, 221, 222 and 223, of different refractive indices. The Kohler radial homogenization is done between lens segments 22a, 22b on the entry surface 2201 and the primary mirror 2203. In this case, the focal length and pitch of the lens and mirror segment will decrease from the optical axis to the rim, due to the progressively smaller separation of the Kohler integrator-pairs.

Figure 23:
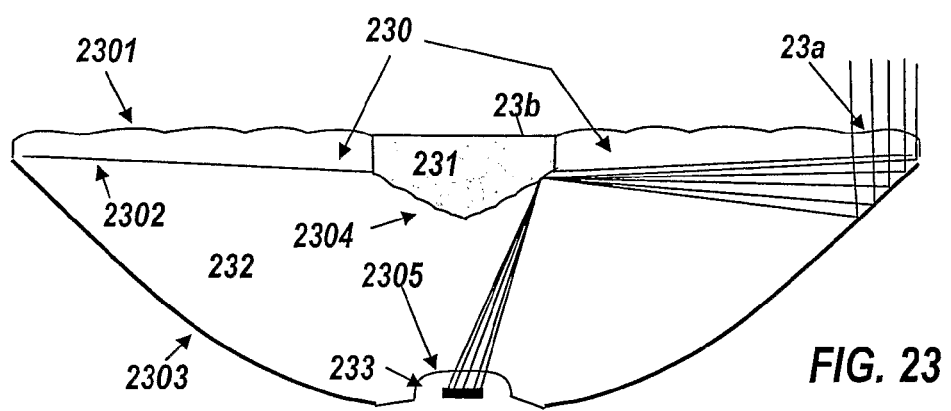
FIG. 23 illustrates a Kohler radial integrator device that can be composed of volumes of different refractive indices and the Kohler radial homogenization is done between the entry surface and the secondary mirror.

FIG. 23 illustrates a Kohler radial integrator optical system comprising surfaces 2301, 2302, 2303, 2304, 2305 bounding volumes 230, 231, 232 and 233, of different refractive indices. The Kohler radial homogenization is done between lens segments 23a, 23b on the entry surface 2301 and the secondary mirror 2304. In some embodiments, material 231 is air and dielectric material materials 230 and 232 are identical (so interface 2302 is missing) . Thus it can be manufactured as a single piece.

Figure 24:
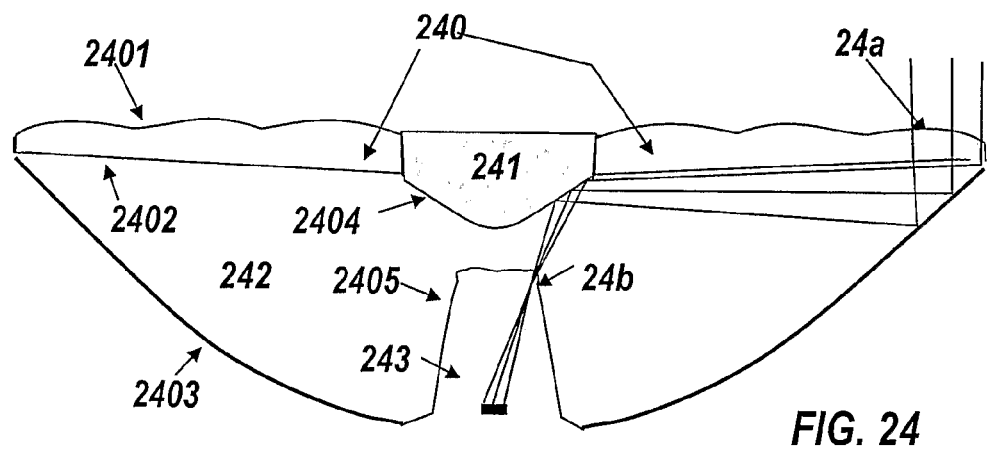
FIG. 24 illustrates a Kohler radial integrator device that may be composed by volumes of different refractive indices, but now the Kohler radial homogenization is done between the entry surface and the exit surface.

FIG. 24 illustrates a Kohler radial integrator optical system comprising surfaces 2401, 2402, 2403, 2404, 2405 bounding volumes 240, 241, 242 and 243, of different refractive indices The Kohler radial homogenization is done between lens segments 24a, 24b on the entry surface 2401 and the exit surface 2405. In some embodiments, the material 242 is air. so that the lens segments of exit surface 2405 are convex. In another embodiment, the material 242 is a dielectric and 243 is air, so that the lens segments 24b of exit surface 2405 are concave.

Figure 25:
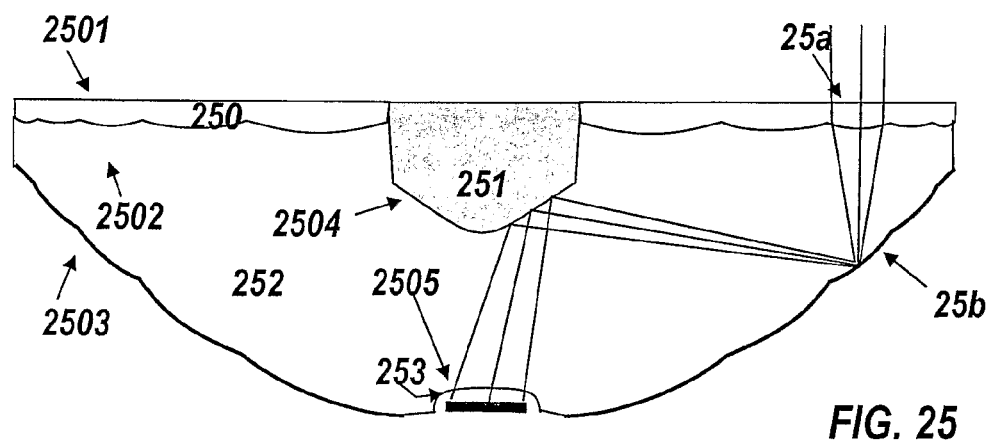
FIG. 25 illustrates a Kohler radial integrator device that could be comprised volumes of different refractive indices, with the Kohler radial homogenization now done between the inner surface of the top cover and the primary mirror.

FIG. 25 illustrates a Kohler radial integrator optical system comprising surfaces 2501, 2502, 2503, 2504, 2505 bounding volumes 250, 251, 252 and 253, of different refractive indices. The Kohler radial homogenization is done between lens segments 25a, 25b on the inner surface 2502 of the top cover and the primary mirror 2503. Also in this case, the focal length and pitch of the lens and mirror segment will decrease from the optical axis to the rim, due to the progressively smaller separation of the Kohler integrator pairs.

Figure 26:
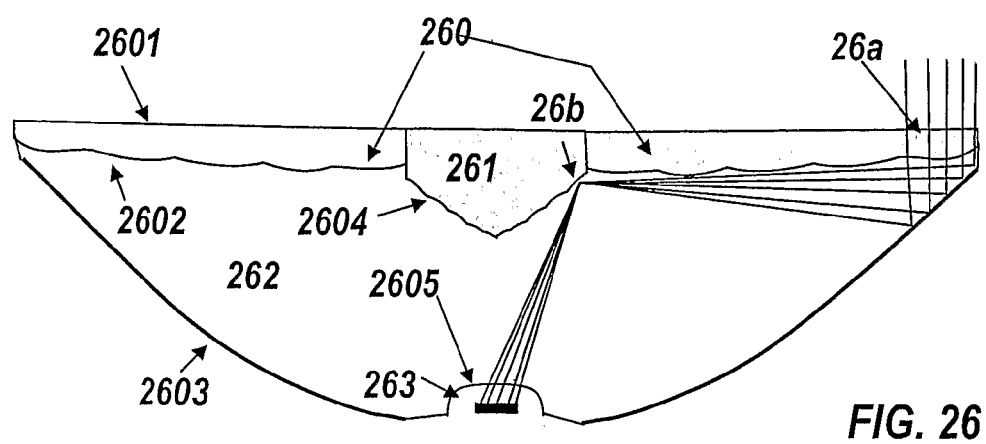
FIG. 26 illustrates a Kohler radial integrator device that could be comprised of volumes of different refractive indices, with the Kohler radial homogenization now done between the inner surface of the top cover and the secondary mirror.

FIG. 26 illustrates a Kohler radial integrator optical system comprising surfaces 2601, 2602, 2603, 2604, 2605 bounding volumes 260, 261, 262 and 263, of different refractive indices. The Kohler radial homogenization is done between lens segments 26a, 26b on the inner surface of the top cover 2602 and the secondary mirror 2604. In some embodiments. material 2601 is air and dielectric material materials 2600 and 2602 are identical (so interface 2302 does not exist). Thus it can be manufactured as a single piece.

Figure 27:
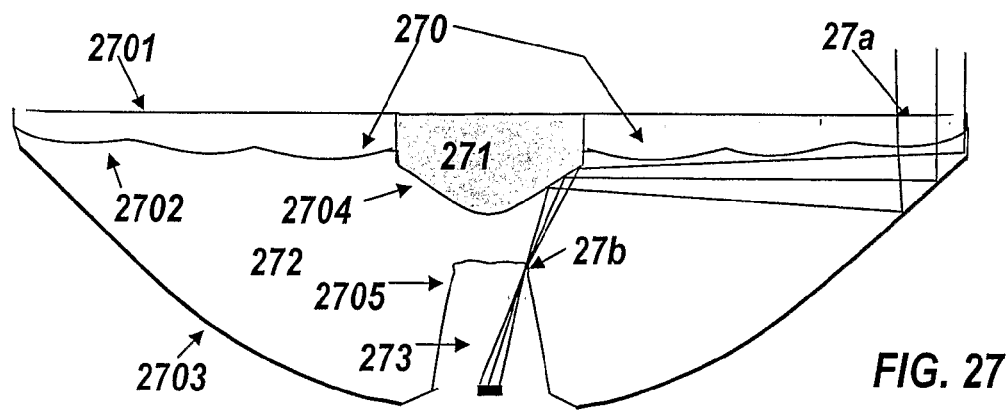
FIG. 27 illustrates a Kohler radial integrator device that could be comprised of volumes of different refractive indices, with the Kohler radial homogenization now done between the inner surface of the top cover and the exit surface.

FIG. 27 illustrates a Kohler radial integrator optical system comprising surfaces 2701, 2702, 2703, 2704, 2705 bounding volumes 270, 271, 272 and 273 of different refractive indices. The Kohler radial homogenization is done between lens segments 27a, 27b on the inner surface of the top cover 2702 and the exit surface 2705. In some embodiments, material 271 is air and dielectric material materials 270 and 272 are identical (so interface 2702 does not exist). Thus it can be manufactured as a single piece. In some embodiments, the material 272 is air, so the lens segments of exit surface 2705 are convex. In another embodiment, the material 272 is a dielectric and 273 is air, so that the lens segments of exit surface 2705 are concave.

Figure 28:
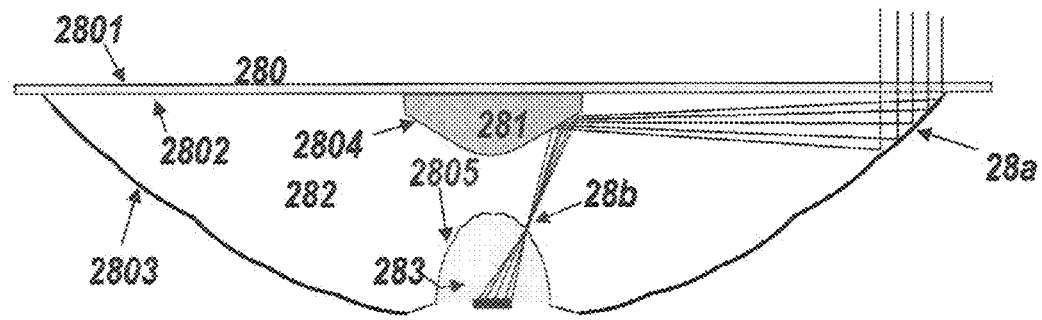
FIG. 28 illustrates a Kohler radial integrator system that could be comprised of volumes of different refractive indices, with the Kohler radial homogenization now done between the primary mirror and the exit surface.

FIG. 28 illustrates a Kohler radial integrator optical system comprising surfaces 2801, 2802, 2803, 2804, 2805 bounding volumes 280, 281, 282 and 283, of different refractive indices. The Kohler radial homogenization is done between lens segments 28a, 28b on the primary mirror 2803 and the exit surface 2805. In some embodiments, the material 282 is air, so that the lens segments of exit surface 2805 are convex. In another embodiment, the material 282 is a dielectric and 283 is air, so that the lens segments of exit surface 2805 are concave.

Figure 29:
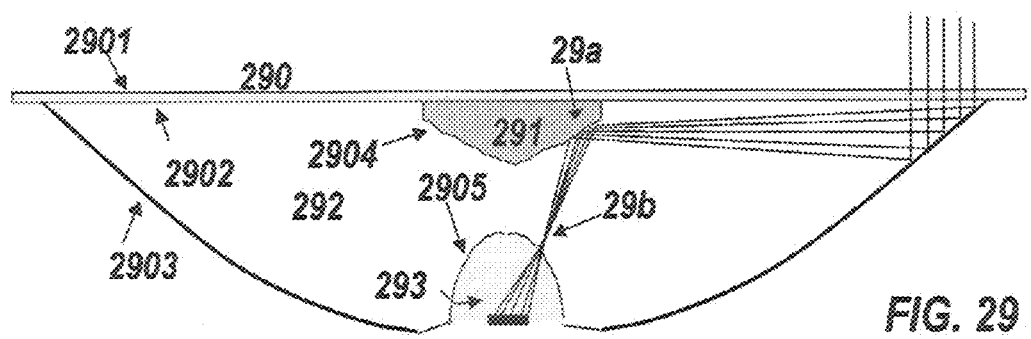
FIG. 29 illustrates a Kohler radial integrator device that could be comprised of volumes of different refractive indices, with the Kohler radial homogenization now done between the secondary mirror and the exit surface.

FIG. 29 illustrates a Kohler radial integrator optical system comprising surfaces 2901, 2902, 2903, 2904, 2905 bounding volumes 290, 291, 292 and 293 of different refractive indices. The Kohler radial homogenization is done between lens segments 29a, 29b on the secondary mirror 2904 and the exit surface 2905. In some embodiments, the material 292 is air, so that the lens segments of exit surface 2905 are convex. In another embodiment, the material 292 is a dielectric and 293 is air, that so the lens segments of exit surface 2905 are concave.

Figure 30:
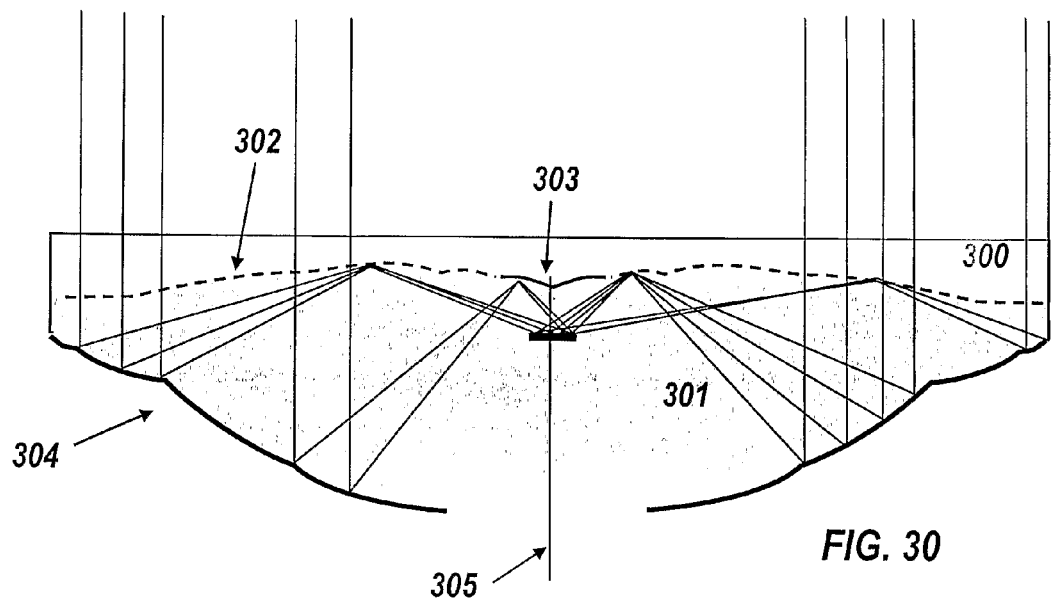
FIG. 30 illustrates a Kohler radial integrator RXI device, in which the R and I surfaces are separate and I is made with a low index material gap.

FIG. 30 illustrates a Kohler radial integrator comprising two dielectric pieces 300 and 301, separated by surface 302, shown as a dotted line. The integration is done by lenticulations in the mirror 304 and in the TIR surface 302. Surface 302 is actually a gap filled with a low-index of refraction material. The total internal reflection is not fulfilled close to the central axis 305, so that the small mirror 303 is needed. Since the low-index gap is thin enough the modification of the ray trajectory through it is negligible, so it is "transparent" for the vertical rays and this design is similar to that of FIG. 19A.

This device achieves isotropic illumination of the target, which is especially valuable at high concentrations (or high collimation efficiency from an isotropic source, in the reverse mode).

Figure 31:
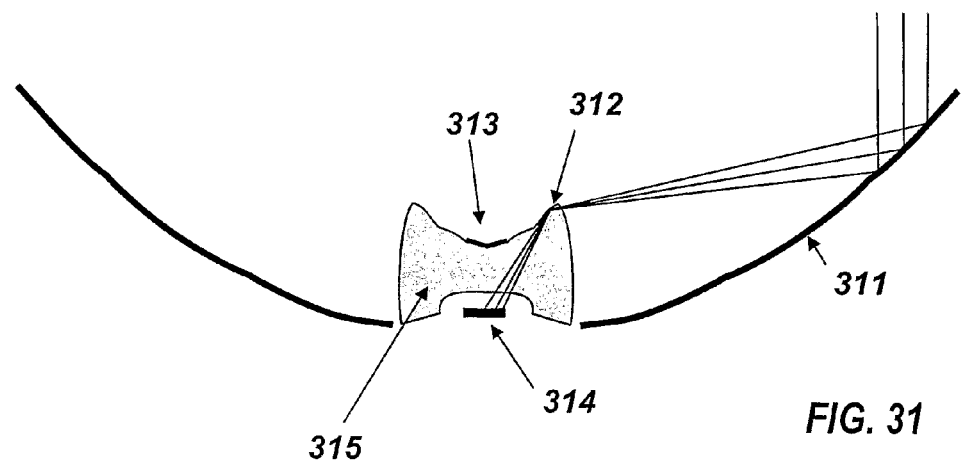
FIG. 31 shows a Kohler radial integrator XRI device in which the integration is done between surfaces X and I.

FIG. 31 shows a Kohler radial integrator XRI device for source 314, in which the integration is done between mirror surface 311 and TIR mirror 312 on dielectric piece 315. Depending on the design parameters, the small central mirror 313 may be also needed if TIR fails.

Figure 32:
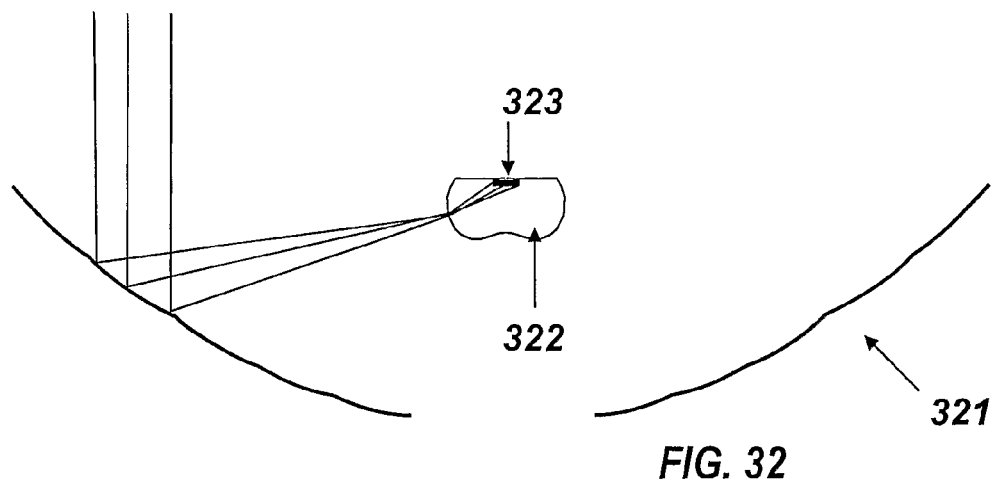
FIG. 32 shows a Kohler radial integrator XR device.

FIG. 32 shows a Kohler radial integrator XR device for source 323, with integrating lenticulations in the mirror 321 and the lens 322. As in the preceding cases a flat cover can be added to the system. This cover introduces 2 plane refracting surfaces. The Kohler radial integration can also be achieved with integrating lenticulations in these two refracting surfaces or in one of these refracting surfaces and the mirror or in one of these refracting surfaces and the lens 322. Additionally, the 2-directional integration method can also be applied to this XR configuration as explained previously, and then a free-form XR with free-form lenticulations would be obtained.

Figure 33:
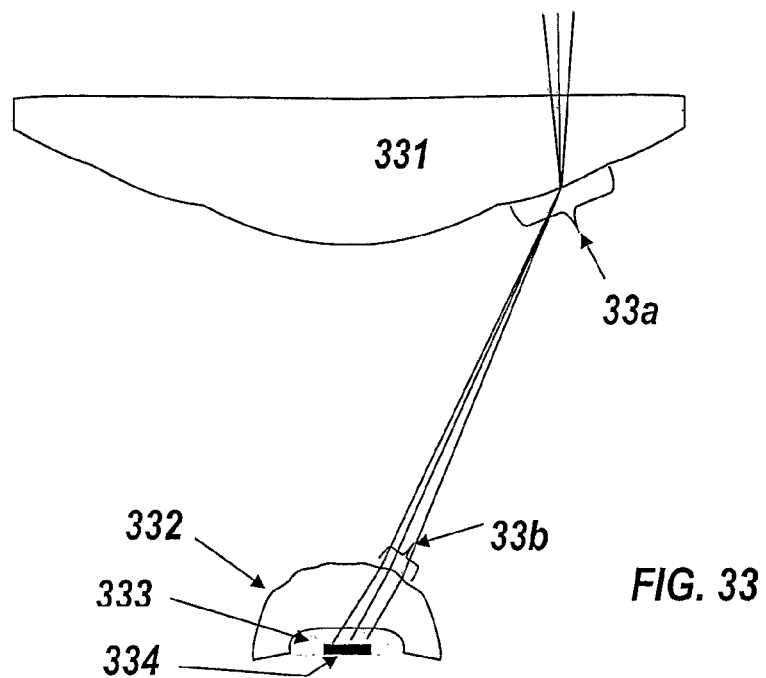
FIG. 33 shows a radial Kohler integrator array lens pair producing concentration on a receiver.

FIG. 33 shows the cross section of a radial integrating dual-lens design. The source 334 may be either encapsulated within a transparent dielectric material (or alternatively, air) 333, to be coupled to lens 332. The top profile of this lens and the bottom profile of lens 331 can have the lenticulations for integration. Lenslet 33b will image the source 334 on to lenslet 33a, while 33a will image 33b on the target.

Figure 34A:
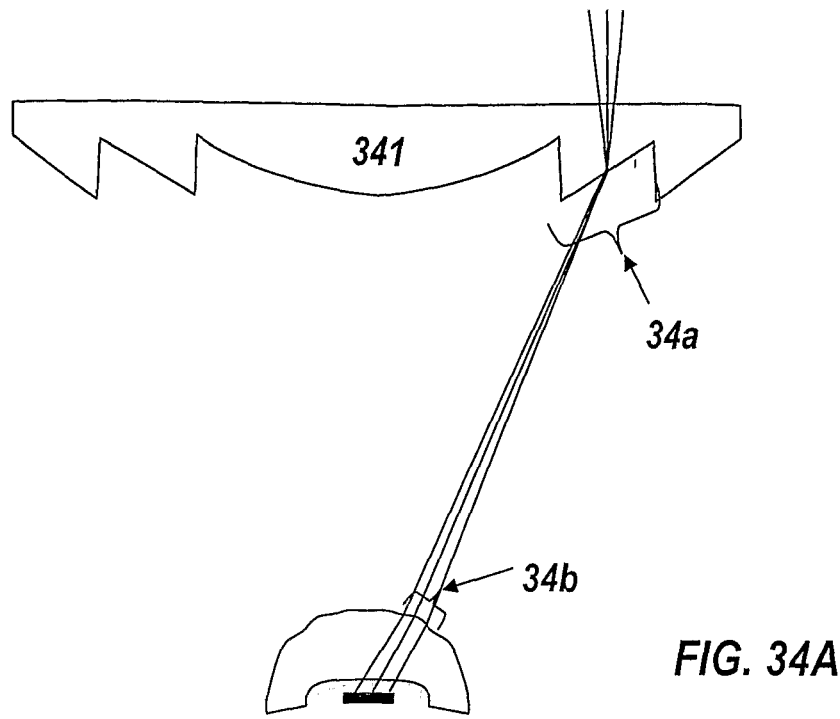
FIG. 34A shows the cross section of another radial Kohler integrator array lens pair producing concentration on a receiver in which each lenticulation on one lens is done as a Fresnel facet.

FIG. 34A shows the cross section of a modification of the previous radial integrating two lens design, in which lens 341 has been implemented as a Fresnel lens, in which each facet corresponds to a lenticulation. Thus, facet 34a and lenticulation 34b are a Kohler integration pair.

Figure 34B:
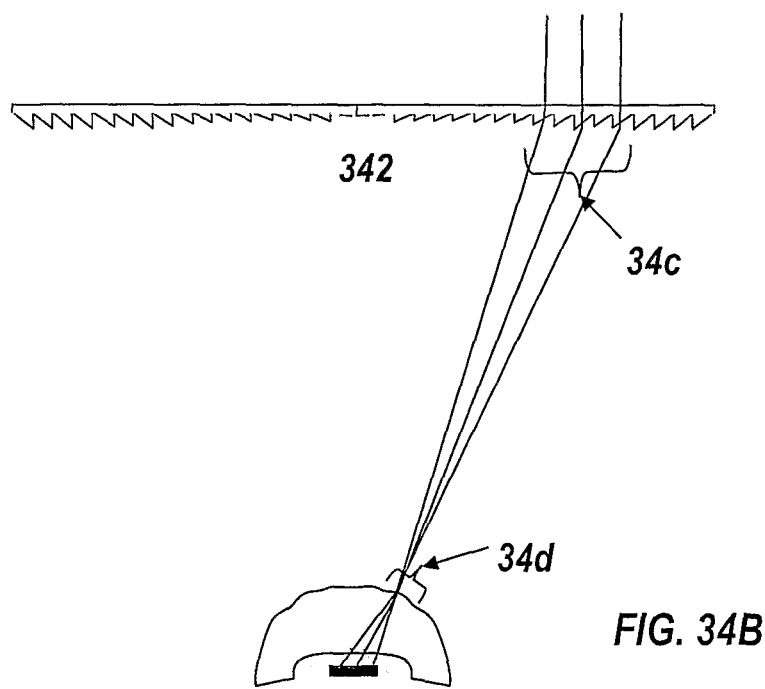
FIG. 34B shows the cross section of another radial Kohler integrator array lens producing concentration on a receiver in which one lens is Fresnel type and each Kohler unit covers more than one facet of the Fresnel lens.

FIG. 34B shows the cross section of another modification of the previous radial integrating two lens, in which the Fresnel lens 342 has very small facets, such that a set of adjacent facets (not just one) constitute the equivalent lenticulation, as with set 34c pairing with segment 34d.

Figure 35:
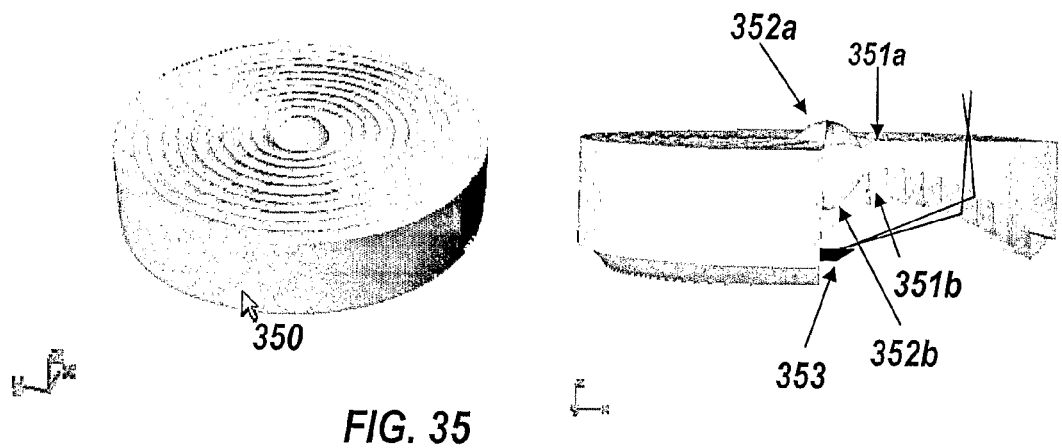
FIG. 35 shows a TIR lens with radial Kohler integration done between lenticulations on the front refractive surface and the TIR facets.

FIG. 35 illustrates another embodiment consisting in a TIR lens 350 for a source 353 with radial integration as lenticulations in the top surface as 351a and the TIR facets as 351b. The central lens is refractive, and also integrates with Kohler pairs 352a and 352b.

Figure 36A:
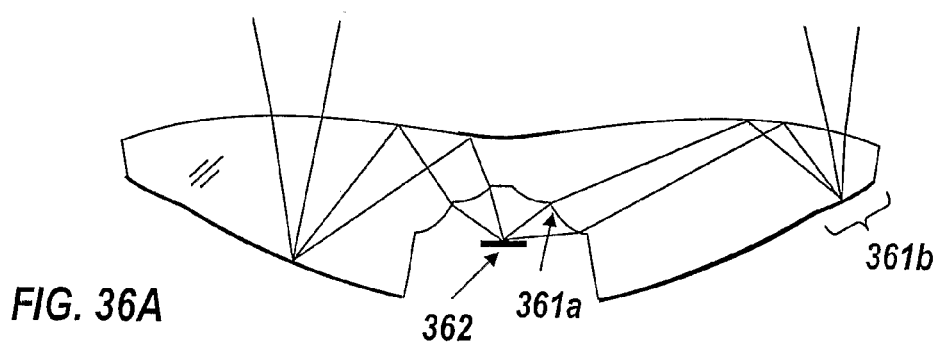
FIG. 36A shows the profile of an RXIR device with radial Kohler integrator lenticulations in the inner refractive surface and the back mirror.
Figure 36B:
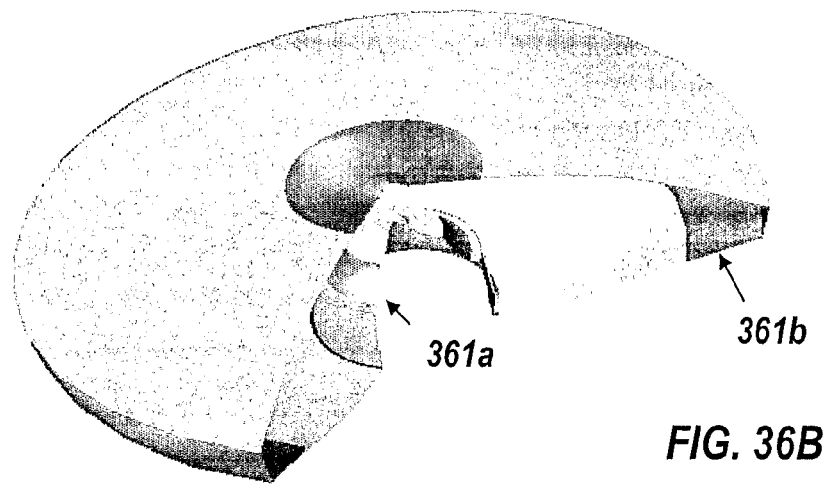
FIG. 36B is a cutaway perspective view of the device of FIG. 36A.

FIG. 36A shows the profile of an RXIR device for source 362 with radial integration performed via lenticulations on the input refractive cavity (as 361a) and the mirror (as 361b). FIG. 36B is a perspective view of same.

Figure 36C:
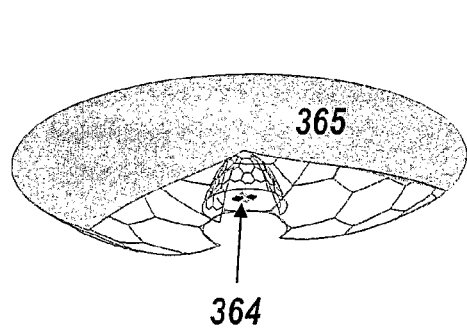
FIG. 36C is a perspective view of a free-form RXIR device with 2-directional Kohler integrator lenticulations on the inner refractive surface and on the back mirror.
Figure 36D:
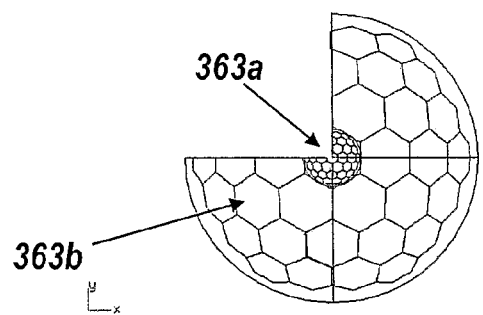
FIG. 36D is a top view of the device of FIG. 36C.

This RXIR is significantly simpler to manufacture than the embodiment introduced for LED headlamps, which comprised widely asymmetric free-form surfaces. For illumination, an intermediate solution is shown in FIG. 36C and FIG. 36D. This is a symmetric RXIR device 365 for the four-LED source 364, with two-directional integration performed via free-form lenticulations on the input refractive cavity (as 363a) and the mirror (as 363b).

2. Etendue-Squeezing Optics

Figure 37A:
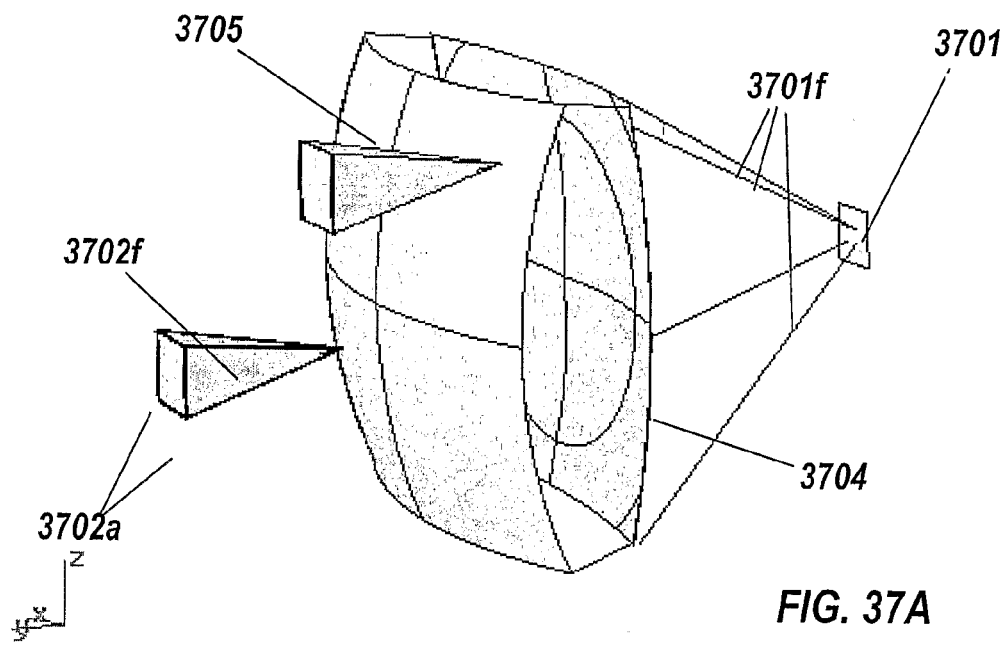
FIG. 37A shows a squared decentered collimating lens.

FIGS. 37A to 37D illustrate a simple example of etendue squeezing. FIG. 37A shows a simple collimating lens collecting light from the squared source 3701, with squared field of view 3701f. This lens is to illuminate a squared distant target with a squared emitted field of view 3702f from the squared exit aperture. The angular extension 3702a of the field of view 3702f can be easily calculated by 2D etendue conservation. The surfaces of such a collimating lens could simply be rotationally symmetric aspheres 3704 and 3705 (with contours truncated to match the input and exit apertures).

Figure 37B:
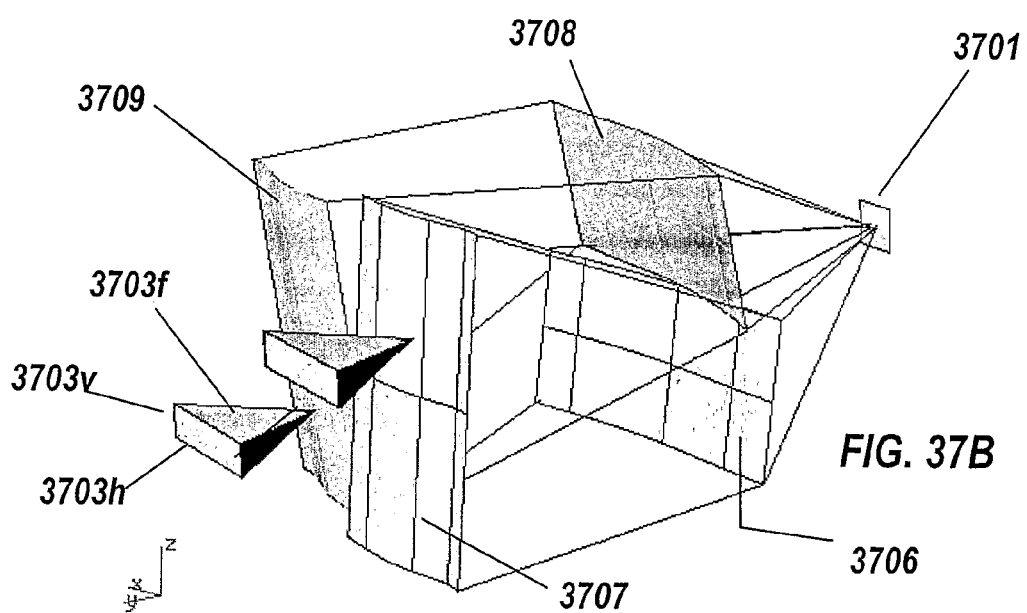
FIG. 37B shows the lens of FIG. 7A with etendue squeezing by two elements.

FIG. 37B shows how an etendue-squeezing free-form lens collects the light from the same squared source 3701 with the same squared input and exit apertures. The input side of the lens has two lenticular elements 3706 and 3708 that join at the horizontal plane. The output side has two lenticular elements 3707 and 3709 that join at the vertical plane.

To calculate the emitted field of view of the lens of FIG. 37B, consider first the lens pair 3706 and 3707. These two surfaces can be designed as conventional off-axis lenses (or with the 3D SMS method) to provide the required collimation. Again, the emission angles 3703*h* and 3703*v* will be given by 2D etendue conservation. Since the vertical extension of 3706 is half that of 3704 but the vertical extensions of 3707 and 3705 are the same, the 2D etendue conservation leads to angular extension 3703*v* being half that of 3702*a*. On the other hand, since the horizontal extension of 3706 is the same as that of 3704 but the horizontal extensions of 3707 is half that of 3705, the 2D etendue conservation leads to angular extension 3703*h* being twice 3702*a*. The same can be deduced for the case of lens pair 3708 and 3709.

Figure 37C:
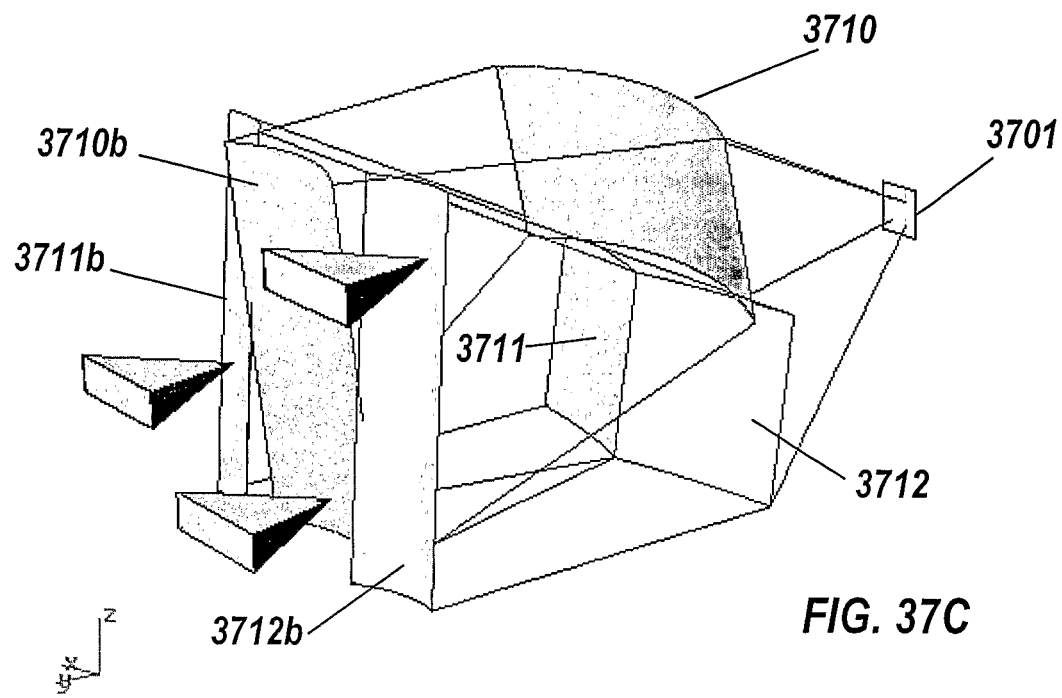
FIG. 37C shows the lens of FIG. 7A with etendue squeezing by three elements.
Figure 37D:
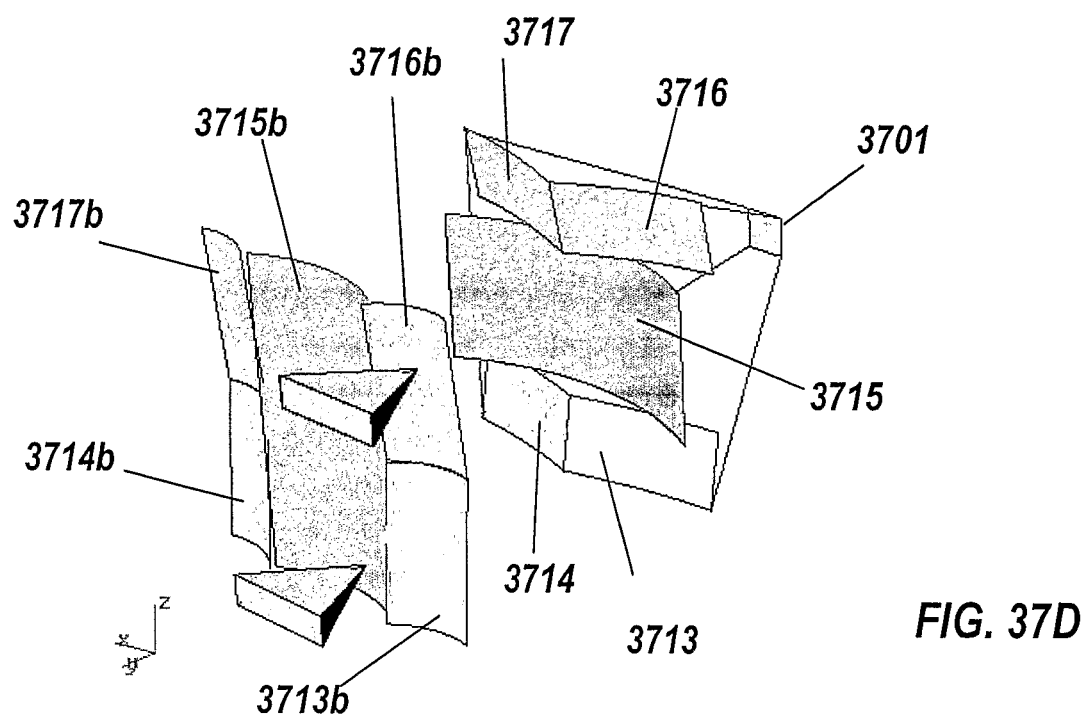
FIG. 37D shows the lens of FIG. 7A with etendue squeezing by five elements.

Therefore, the lens in FIG. 37B produces etendue squeezing by the combination of the two lenticular pairs that produce a beam spatial expansion in the vertical direction and a beam spatial compression in the horizontal direction. Consequently, the emitted field of view 3703*f* is rectangular, with horizontal angular extension 3703*h* twice that of 3702*a* and the vertical angular extension 3703*v* half that of 3702*a*. We will say that this device produces a 2:1 etendue-squeeze factor FIG. 37C shows another example of a 2:1 etendue squeezer using three lenticular-element pairs (3710-3710*b*, 3711-3711*b* and 3712-3712*b*), in which the positions of the lenticular arrangement in FIG. 37B are modified for more symmetry with respect to vertical planes. FIG. 37D shows another example of a 2:1 etendue squeezer, in which the position of the lenticular arrangement of in FIG. 37B are additionally modified to provide higher symmetry as well, with respect to horizontal planes. This device has five lenticular element pairs (from 3713-3713*b* to 3717-3717*b*), with rays not shown for greater clarity.

2.1. Etendue-Squeezing Lenslet Arrays

Figure 38A:
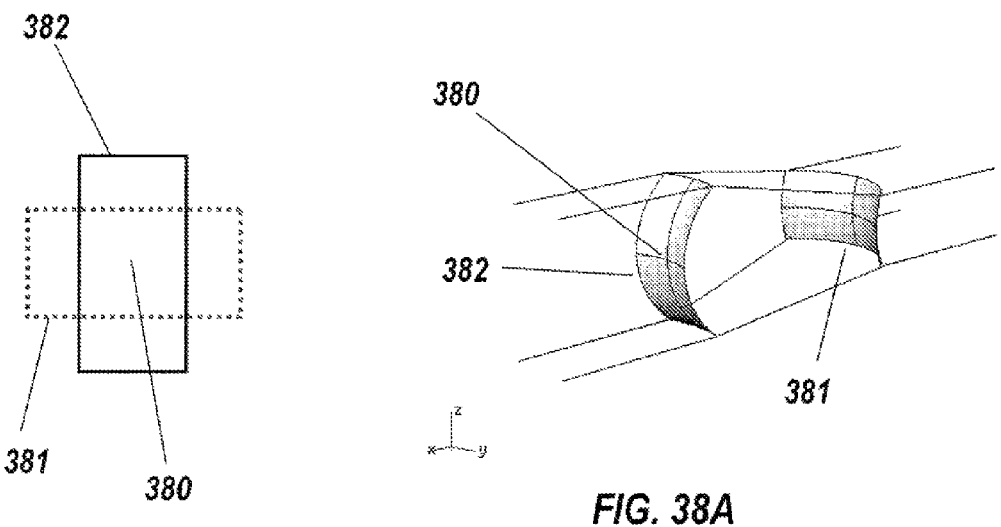
FIG. 38A shows a centered afocal lens.

A perfectly centered lens design, with both vertical and horizontal symmetry, is achieved when not only the target but also the source is placed at infinity. FIG. 38A shows this case for the central lens in FIG. 37D. As shown to the left, the vertical cross section of such a lens is essentially a Galilean afocal 2:1 beam expander, while the horizontal cross section is the same afocal beam expander, but reversed, to be used instead as a beam compressor. Note that this symmetry makes the optical surfaces be normal to the line passing through their central point 380. Thus these lens pairs are called centered, in contrast to the decentered lenses in FIG. 37A.

The 3D surfaces 381 and 382 can be created in the simplest approach as toroidal surfaces, deduced from the spherical paraxial calculation of the 2D afocal systems. For better performance, the 3D SMS method could be used to create suitable free-form surfaces. Note also that the output lens 382 can be the same shape as input lens 381, merely rotated 90°.

Figure 38B:
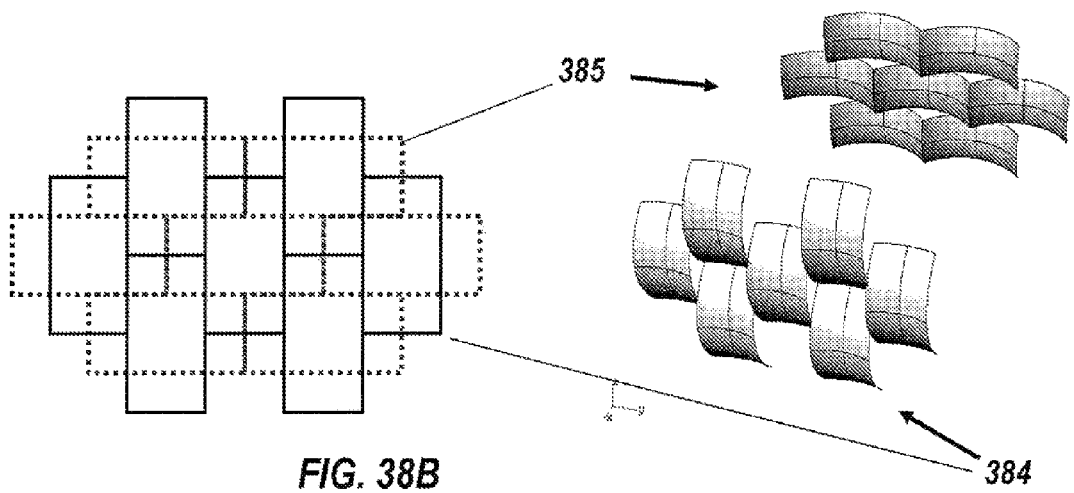
FIG. 38B shows the tessellation of the lens of FIG. 38A in an array.

FIG. 38B shows front and perspective views of the tessellation of the lens unit of FIG. 38A into array 384 and associated array 385.

FIG. 38C shows three afocal designs, alternative to that of FIG. 38A. In FIG. 38A the two cross sections are 2D Galilean afocal designs (vertical expander and horizontal compressor), thus not inverting the far-field 2D) imaging. Keplerian (inverting) designs are also possible, as well as combinations of the two. Thus in the case lens pair 381*b* and 382*b*, the horizontal cross section is inverting but not the vertical one. In the case of lens pair 381*c* and 382*c*. the vertical cross section is inverting but not the horizontal one. while lens pair 381*d* and 382*d* inverts in both directions.

Figure 39B:
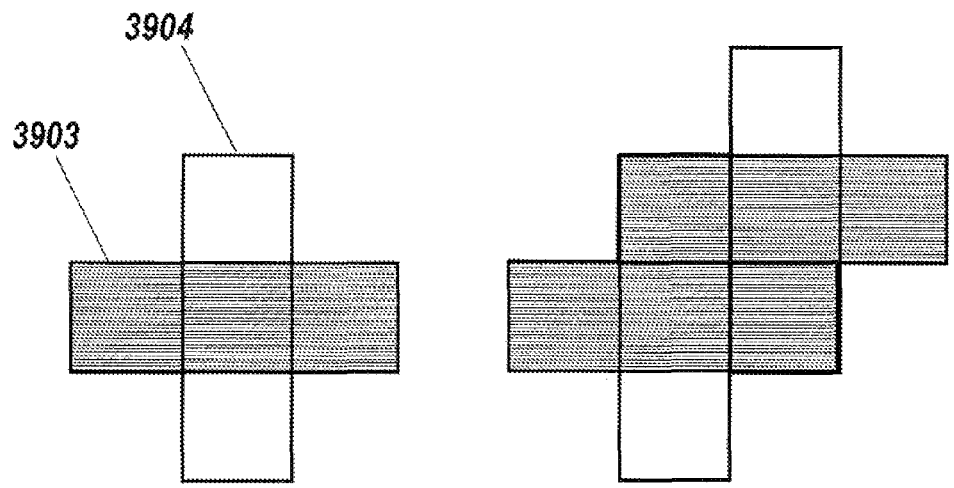
FIG. 39B shows the procedure to build an N:1 centered etendue squeezer.

FIG. 39A shows how further 2:1 tessellations can be obtained, by scaling in the vertical dimension the contours of the tessellation diagram of FIG. 38B (the scale factor can be greater or smaller than one). In FIG. 39A, the scale factor is 2, so that the aspect ratio of input lens unit 3901 is 2:2 (that is, 1:1) while the aspect ratio of the output lens unit 3902 is 4:1. Note that the lens profiles do not scale, but now the horizontal and vertical designs show different f-numbers. This scaling factor can also be applied to the etendue squeezers explained below (FIG. 39B to FIG. 40B).

FIG. 39B shows the procedure to build a centered etendue squeezer with squeeze-factor N:1. The procedure is: (1) generate the unit cell by taking the input 1:N rectangular contour 3903, rotating it 90° to obtain the output N:1 contour 3904; and (2) generate the tessellation by creating a copy of the unit cell, and moving it 1 to the right and 1 to top (1 denotes the smaller dimension of the rectangle), and so on. The figure shows case N=3, but the procedure is general.

Figure 39C:
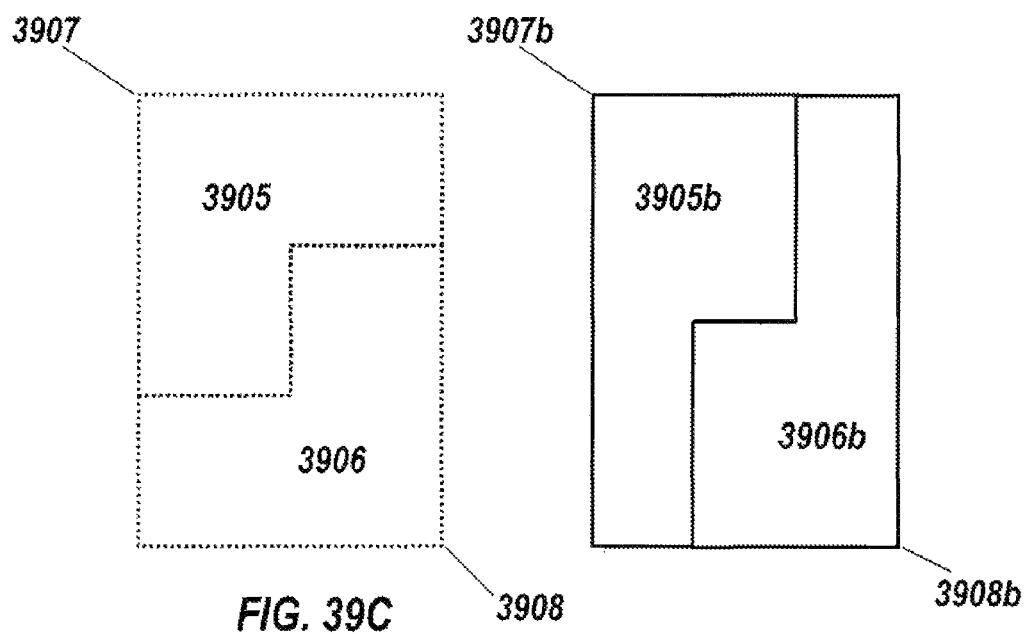
FIG. 39C-G shows different versions of 3:2 etendue squeezing.

FIG. 39C shows an etendue squeezer with squeeze-factor 3:2=1.5. For greater clarity, input and output elements are shown separately on the left and on the right, respectively, instead of how they are actually superimposed, as in previous Figures. In contrast to the previous squeezers, the contour of these lenticular elements is not symmetric neither in a vertical plane nor in a horizontal plane. If 3905 and 3905*b* are one lens pair, the afocal design must be non-inverting in both vertical and horizontal directions, and can be centered one a center line passing through 3907 and 3907*b* (the same applies to the other lens pair 3906 and 3906*b*, with their center line passing through 3908 and 3908*b*). On the other hand, it is also possible to design 3905 and 3906*b* as a lens pair and 3906 and 3905*b* as the other lens pair, but then inversion in both horizontal and vertical dimensions is needed, and the surfaces are not longer centered.

Figure 39D:
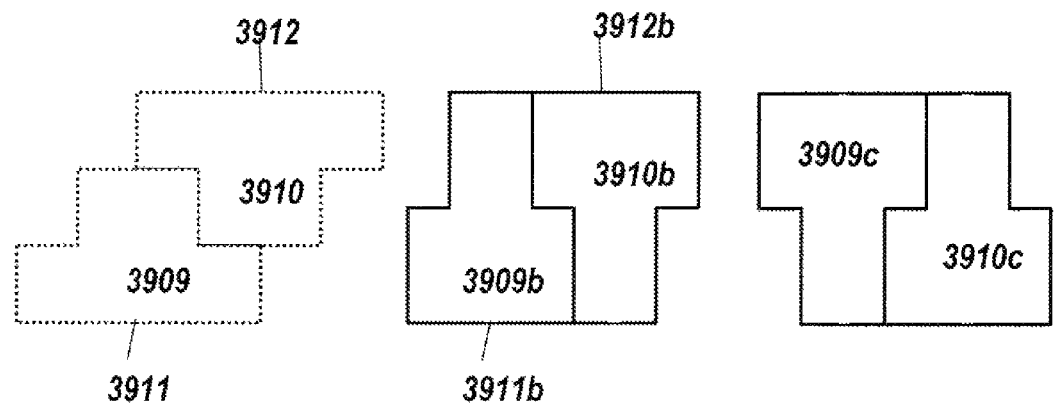

FIG. 39D shows other etendue squeezers with squeeze factor 3:2=1.5. In this case, the contours are symmetrical with respect to vertical planes, and thus they can be use for both horizontal inverting and non-inverting systems with horizontal centering. If also vertical centering is required, no vertical inversion must be chosen and lens pairs 3909-3909*b* and 3910-3910*b* are designed centered at lines 3911-3911*b* and 3912-3912*b*, respectively. In case vertical inversion is preferred, lens pairs 3909-3909*c* and 3910-3910*c* will not be centered vertically.

Figure 39E:
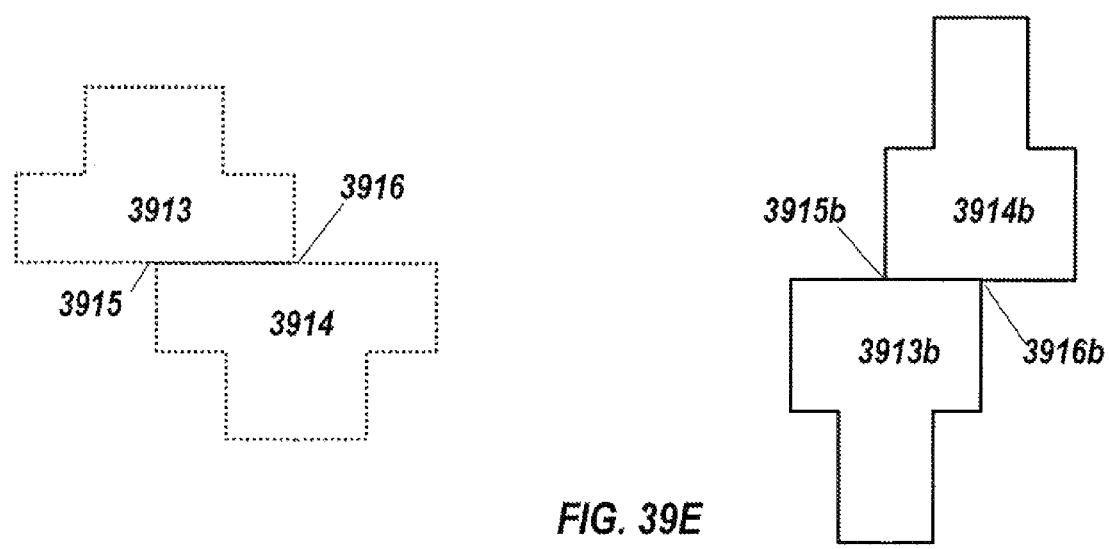

FIG. 39E shows another vertically centered, inverting etendue squeezer with squeeze factor 3:2=1.5, in which lens pairs 3913-3913*b* and 3914-3914*b* are designed centered at lines 3915-3915*b* and 3916-3916*b*, respectively.

Figure 39F:
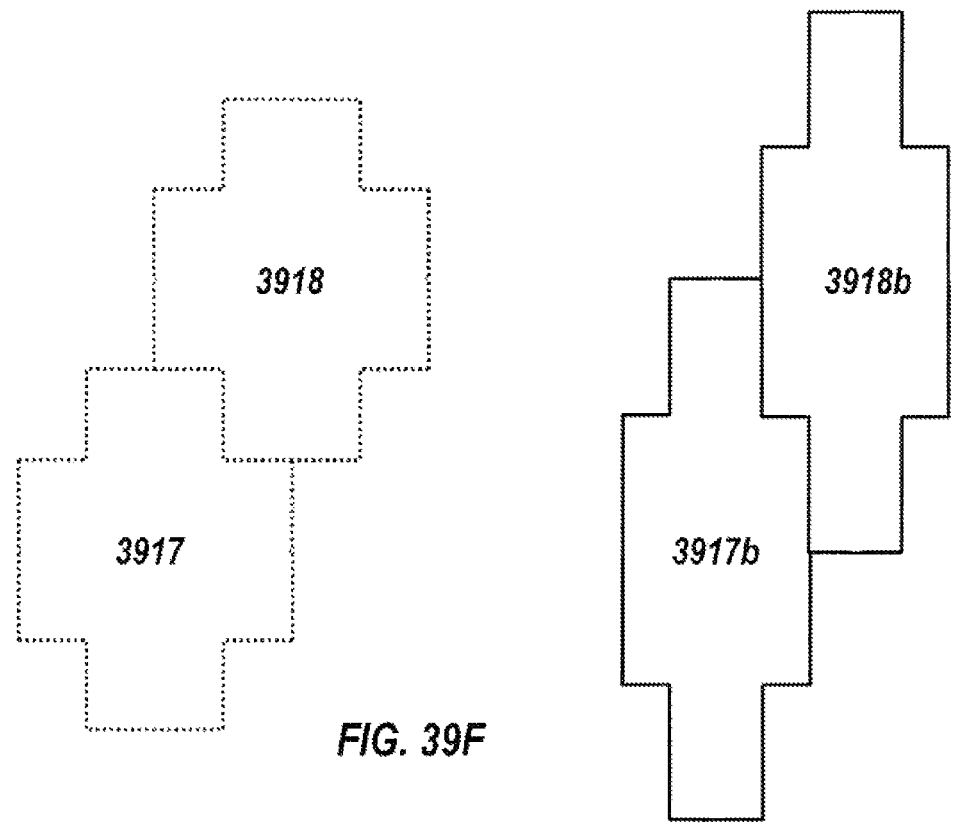

FIG. 39F shows another etendue squeezer with squeeze factor 3:2=1.5 and lens pairs 3917-3917*b* and 3918-3918*b*. In contrast to the previous 1.5 squeezers, this is symmetric horizontally and vertically, and thus can be designed as centered independently of the inversion or non-inversion in the horizontal and vertical directions.

Figure 39G:
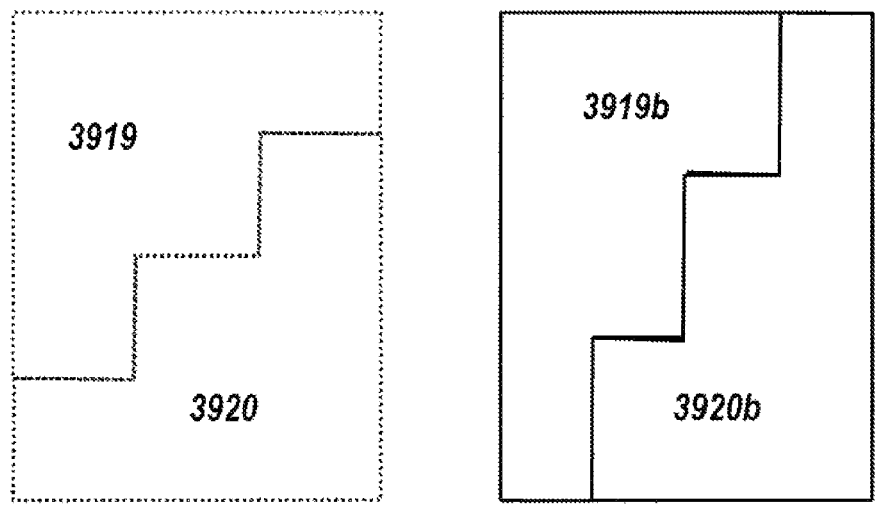

FIG. 39G shows a generalization of the previous 3:2 squeezers, a centered etendue squeezer similar to that of FIG. 39C but with squeeze factor (N+2):(N−1) and lens pairs 3919-3919*b* and 3920-3920*b*. with N indicating the number of steps in the contour (N=1 in FIG. 39C; N=2 in the example of FIG. 39F).

In the previous etendue squeezers, afocal type optical systems have been considered. These tessellations, however, can also be considered for building integrator arrays. For instance, the tessellation of FIG. 38B can be applied not only to afocal lenses FIG. 38A, but to improve the integrator array lenses disclosed in FIG. 2 of U.S. Pat. No. 5,662,401, which were highly decentered. The tessellation of FIG. 38B makes all the lens pairs centered, thus minimizing light-blocking at the entry and maximizing the illuminated area at the exit.

Figure 40A:
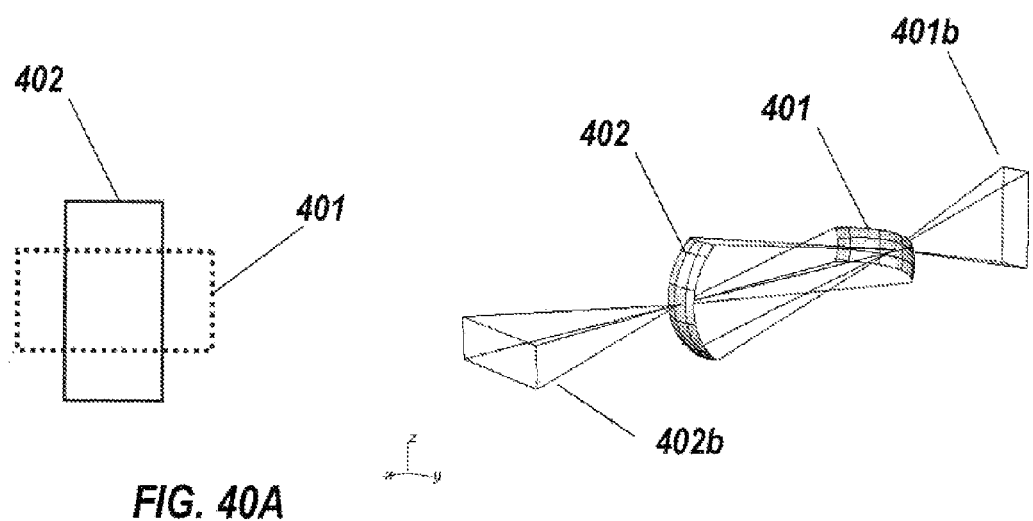
FIG. 40A shows a rectangle-rectangle etendue-squeezing focal lenticular element.

FIG. 40A shows the centered rectangular lenses 401 and 402 imaging one to the other (i.e., the lens surfaces have rotational symmetry and the same focal length), with the same contour as afocal lenses of FIG. 38A. Light exiting lens 402 makes far-field pattern 402b, while lens 401 makes pattern 401b.

Figure 40B:
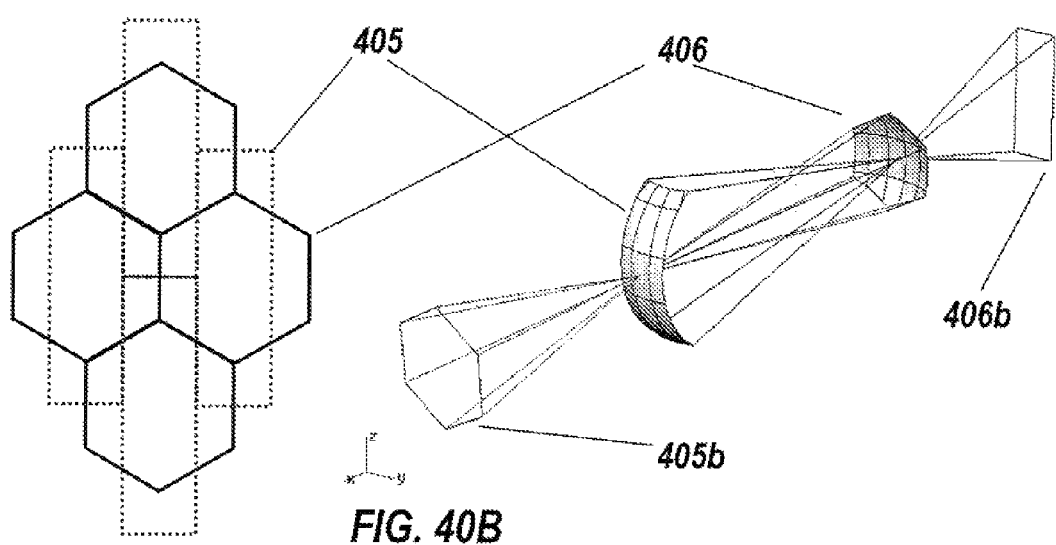
FIG. 40B shows a hexagon-rectangle etendue-squeezing focal lenticular element.

Since for integrating lenses the contour of the input and output lens elements can be different, the same advantages of the symmetry can be obtained for the rectangle-to-hexagon centered tessellation shown in FIG. 40B. As can be easily checked, the aspect ratio of the rectangular lens 405 is $2\sqrt{3}=3.46$, as is the far-field pattern 406b of hexagonal lens 406. The far-field pattern 405b is equally hexagonal.

The use of integrator elements causes input and output bundles to replicate the lens contours. This is a clear distinction with respect to afocal systems, in which the angular expansion-compression of the input bundles is done irrespective of the shape of the input field of view. In the case of the integrator shown to the right in FIG. 40A, the input bundle with the 2:1 field of view 401b is transformed into the 1:2 field of view 402b, with both shown in outline to the left. But if the input bundle has the 1:1 field of view contained in 401b, the output will remain as 402b, without reducing the vertical spread. What is reduced is the illuminated part of the surface 402, which is reduced to the central part.

On the other hand, if high efficiency is required, afocal systems with finite-sized sources may present additional problems, of crosstalk between lens pairs of the integrators. To avoid them, slightly reduce the expansion factor and increase the compression factor as needed to illuminate a smaller portion of the exit lens unit aperture. The lower the f-number of an afocal system, the smaller is the importance of this edge effect.

Another distinguishing feature of afocal versus integrator arrays is that the first are capable of image formation. This means that if the 2:1 etendue squeezer array of FIG. 38B is placed in front of a camera with a telephoto objective, it will modify the field of view of the camera, making the image on the photo stretch in one dimension by a factor of 2 and compress the same in the other. This feature, along with the corresponding image processing, can be of interest in applications in which a low-aspect-ratio (height/width) field of view is desired, but isn't available in standard image sensors.

For anyone skilled in the art it is obvious that the aforementioned lens systems can be analogously deduced for two-reflector systems, refractive-reflective combinations, or lens systems separated by air.

The previous examples have shown etendue-squeezing elements tessellating the plane in a Cartesian coordinate grid, but the concept can be equally well applied to other coordinate systems, For instance, the embodiments of the following sections use polar-coordinate tessellations.

2.2. Application of the 3D SMS Design Method to Etendue-Squeezing Devices

Figure 41:
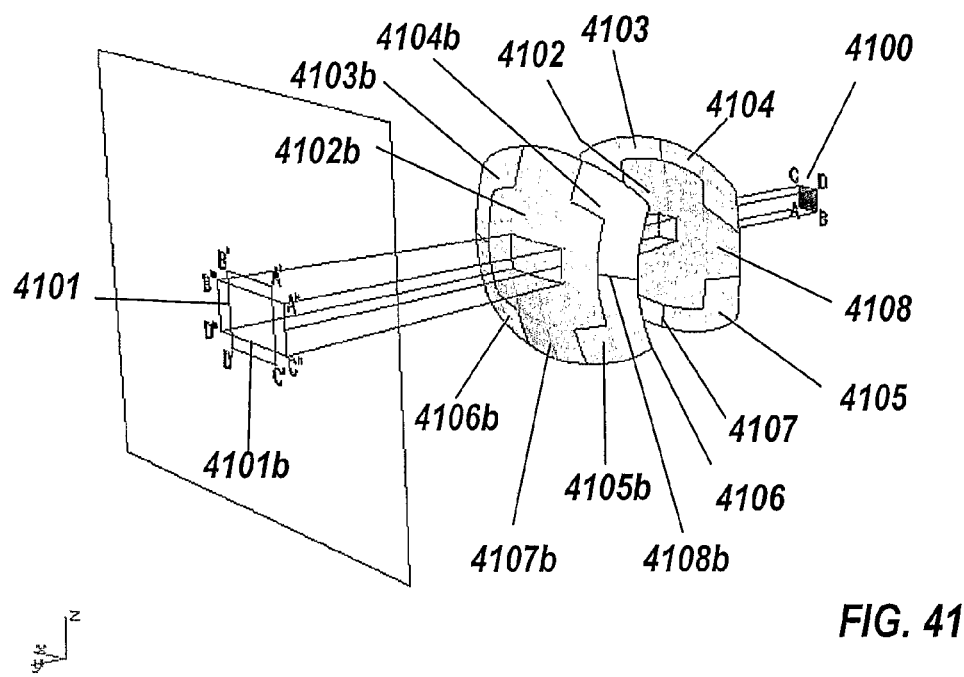
FIG. 41 shows a pair of lenticular-elements each comprised of two interlocked free-form surfaces.

FIG. 41 shows a lens with two free-form sides, designed with the 3D SMS method, being two pairs of centered non-inverting 3:2 etendue-squeezing lenticular elements. Pair 4102-4102b is analogous to those shown in FIG. 39F, while pairs 4103-4103b to 4106-4106b are analogous to those shown in FIG. 39C. The determination of the contours of these lenses was based on an initial 3D SMS free-form lens design, similar to the procedure for the free-form integrator designs, as detailed in Sections 1.3.1 and 1.3.2 above.

Assume that an initial 3D SMS free-form lens design is done to transform the A, B, C bundles of the chip 4100 into the bundles A', B' and C' of the target 4101. The design method will produce a one-to-one correspondence between points of the SMS ribs 4107 and 4107b, given by the common parameter u, and another one-to-one correspondence between SMS spines 4108 and 4108b, given by the common parameter v, as was detailed in section 1.3.2. Since the etendue-squeezing system will produce a projected image 4101b that is 1.5 times shorter and 1.5 times wider, its edges can be estimated by proper reparameterization of the exit rib and spine. Consider the case of pair 4102-4102b, and without loss of generality consider that the point u=0 and v=0 is where the rib 4107b and spine 4108b cross. The reparameterization of 4107b with parameter u'=1.5u and v'=u/1.5 will define the proper vertical expansion and horizontal compression of the exit contour.

The calculation of the free-form surfaces with the etendue squeezer of FIG. 41 is done with the 3D SMS method as applied to the etendue-squeezed target 4101b of bundles A", B" and C".

FIG. 42A-42D show another system comprising two lenses with two prefixed flat sides and two free-from surfaces designed with the 3D SMS method. The function of this lens-system is to improve the collimation of the parabolic condenser 420. These lenses comprise 2:1 etendue squeezing lenticular element pairs (421-421b, 422-422b and 423-423b), the contours of which follow polar coordinate planes centered at the paraboloid axis. These lenses not only produce a meridional emission angle (correcting the coma of the paraboloid) but, due to the 2:1 etendue-squeeze factor, this angle is half of that produced by rotational symmetric coma correctors of other lenses.

Figure 42A:
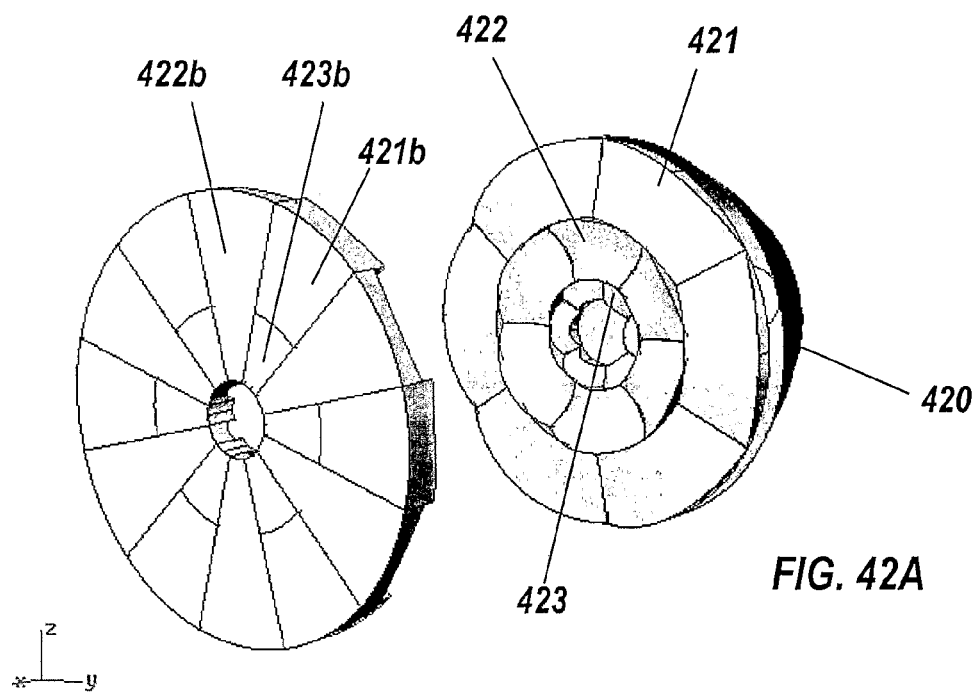
FIG. 42A is a front perspective view of a dual-lens free-form lenticular condensing system.
Figure 42B:
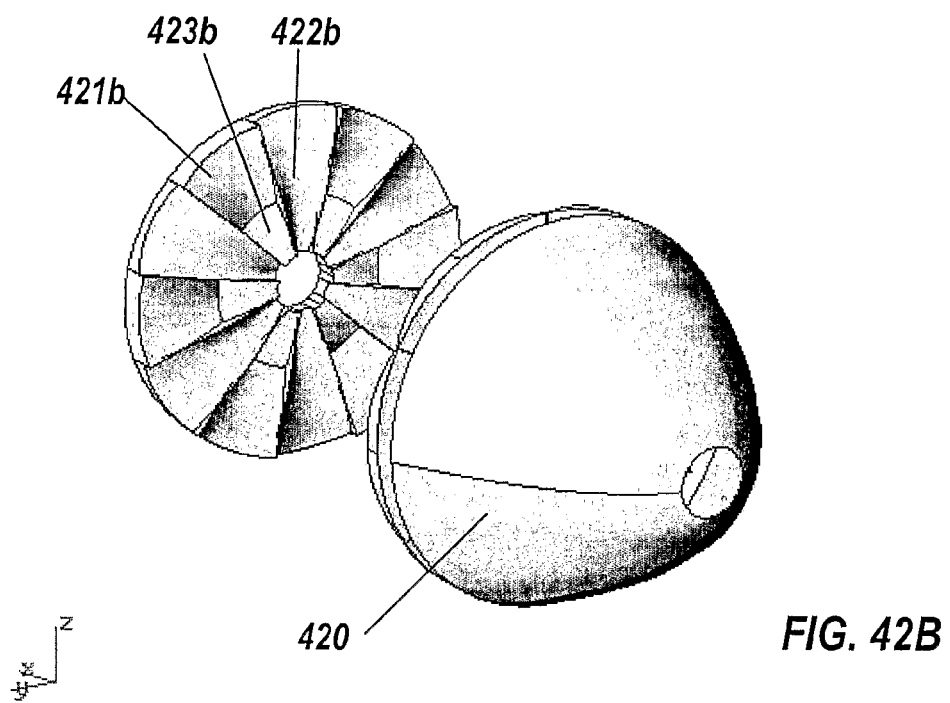
FIG. 42B is a rear perspective view of the system of FIG. 42A.
Figure 42C:
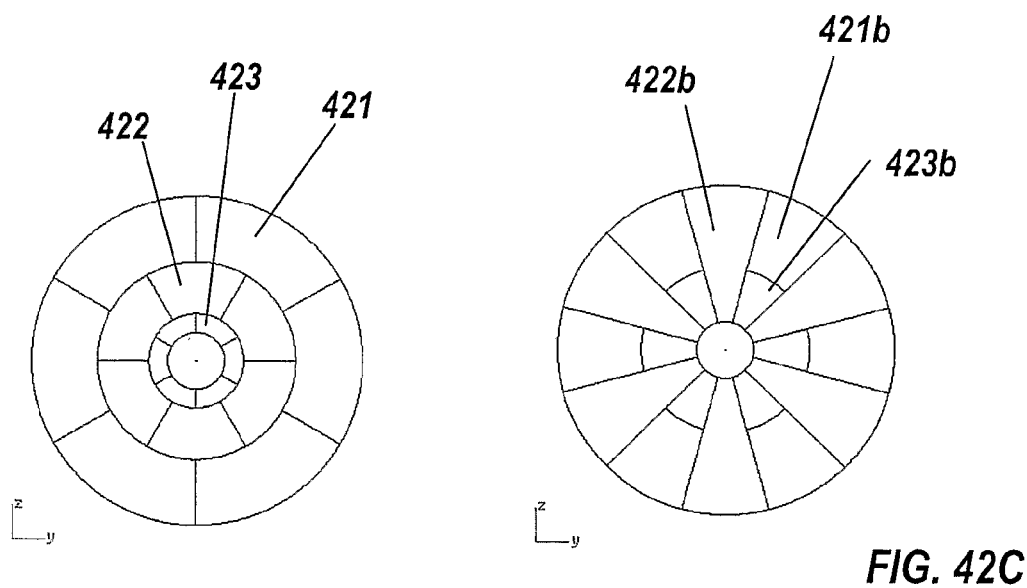
FIG. 42C shows plan views of the two lenses.

FIG. 42A and FIG. 42B shows perspective views of the design, while FIG. 42C shows front views of the two lenses.

2.3. The XX Free-Form Etendue-Squeezing Condenser

Figure 43A:
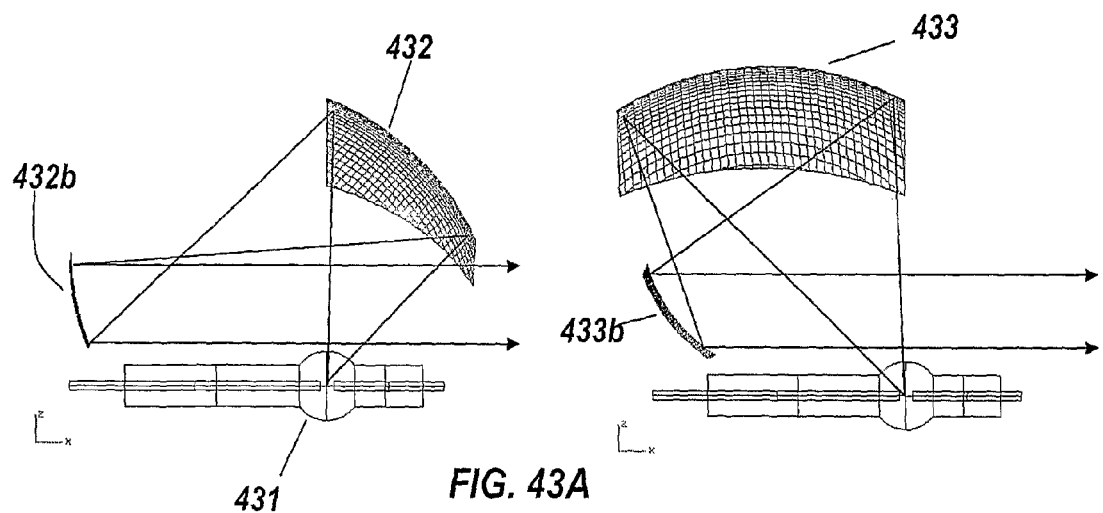
FIG. 43A is a side view of two stages in the design of a lenticular condensing reflector for an arc lamp.

FIGS. 43A-43-C show another 2:1 etendue-squeezing system, one tessellated in polar coordinates. It comprises two free-form reflectors, designed with the 3D SMS, that collect the light emitted by a light bulb 431 (which could be halogen or discharge type) and collimates it to a target placed at infinity. FIG. 43.A shows separately a side view of two lenticular mirror pairs. Mirror 432 collects the rays emitted by the source towards positive x, reflecting them to its mirror pair 432b, which reflect them as a collimated beam. On the other hand, mirror 433 is collecting the rays emitted by the source towards negative x, reflecting them to its mirror pair 433b, which also reflects them as a collimated beam. In this example, both mirror are inverting-type in this meridional direction, but the other combinations are also possible.

FIG. 43.B shows the two mirror pairs 432-432b and 433-433b in a front view (that is, as it is seen from the target). Both input mirrors 432 and 433 cover 90° sagittal sectors from the source, but they are shifted 45°. Their respective output mirrors 432b and 433b are sagittally centered with them, but due to the etendue squeeze factor, they only occupy 45° sagittal sectors. Therefore, 432b and 433b do not overlap. These mirrors are of the non-inverting type in the sagittal dimension, but other combinations are also possible.

Figure 43B:
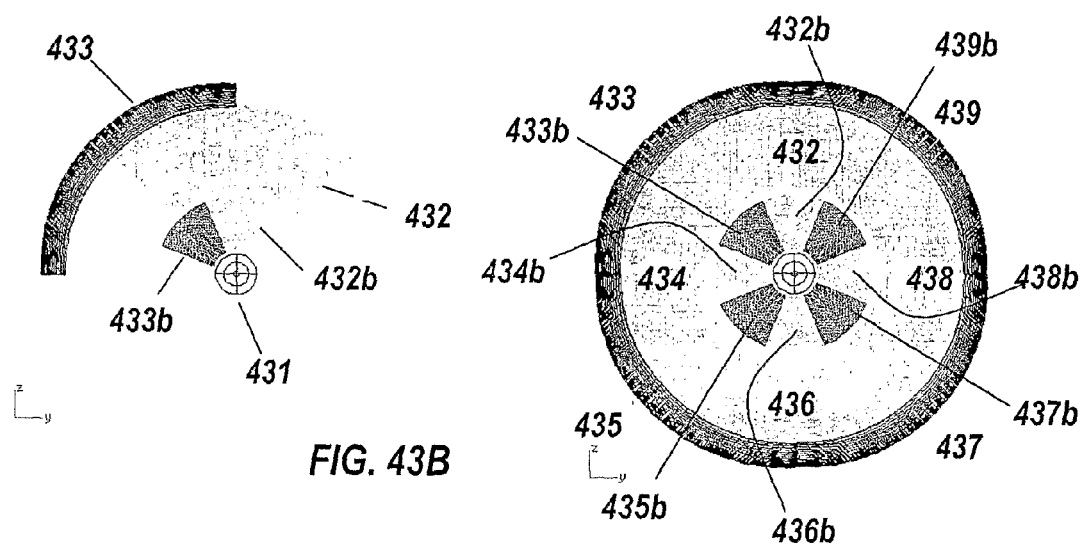
FIG. 43B is an end view of the reflector of FIG. 43A.
Figure 43C:
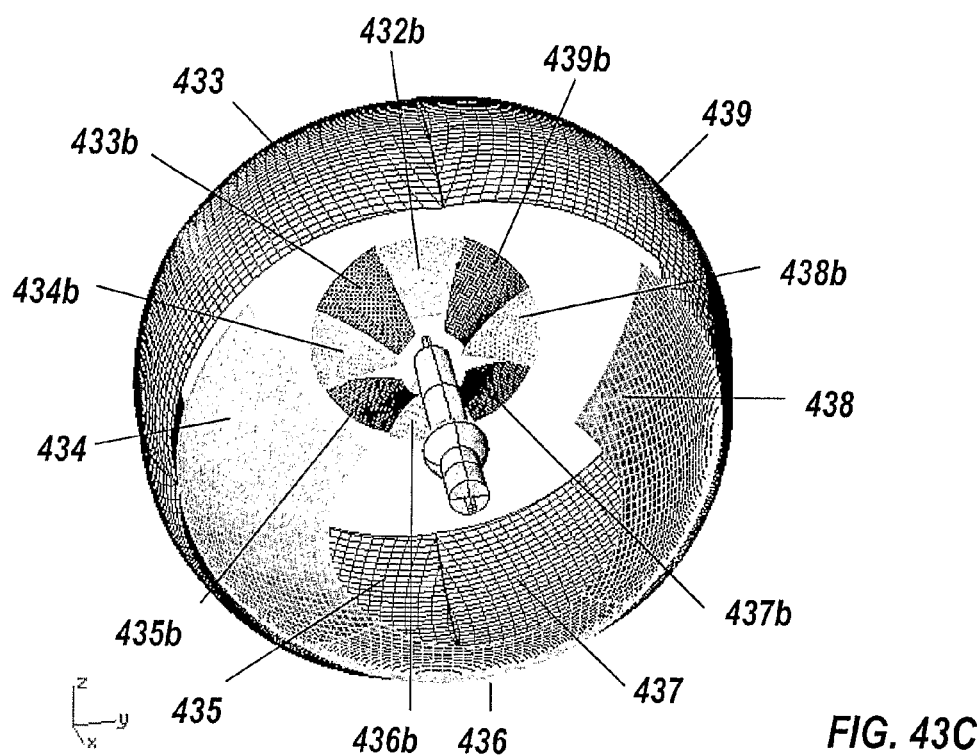
FIG. 43C is a cutaway perspective view of the finished reflector.

The remaining six symmetrical mirror pairs 434-434b to 439-439b will complete the device, which is shown in perspective view in FIG. 43C (in which mirror 432 has been removed).

The device disclosed in FIG. 43A-43C has then the same functionality as a parabolic condenser. Not only does it perform much better in term of collection efficiency for small targets (gains up to 40% are predicted by ray traces for circular targets), but the exit aperture is smaller. This last feature means that when integrator array lenses are used at the exit, the separation between the integrator array lenses can be reduced.

Figure 44A:
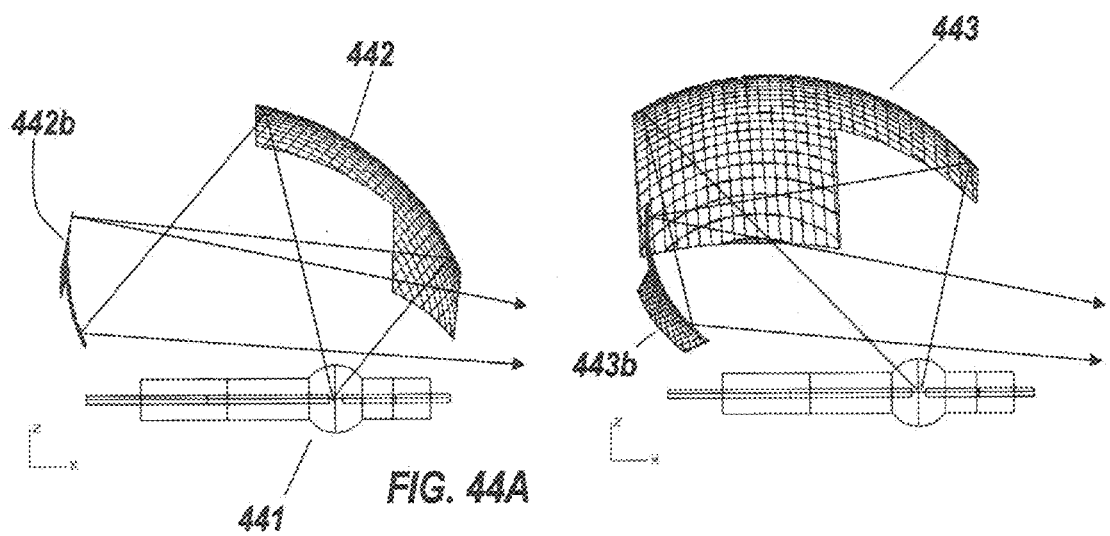
FIG. 44A is a side view of two stages in the design of another lenticular condensing reflector for an arc lamp.
Figure 44B:
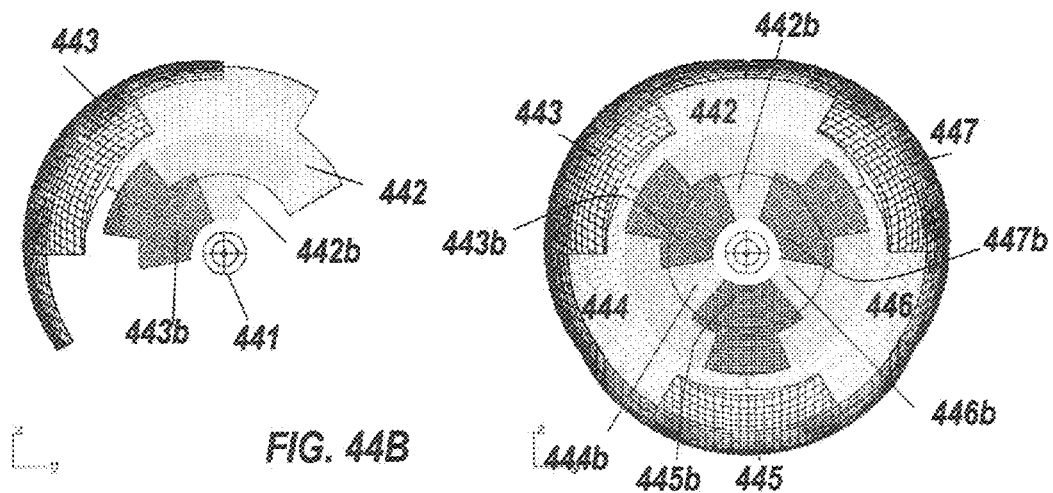
FIG. 44B is an end view of the reflector of FIG. 44A.
Figure 44C:
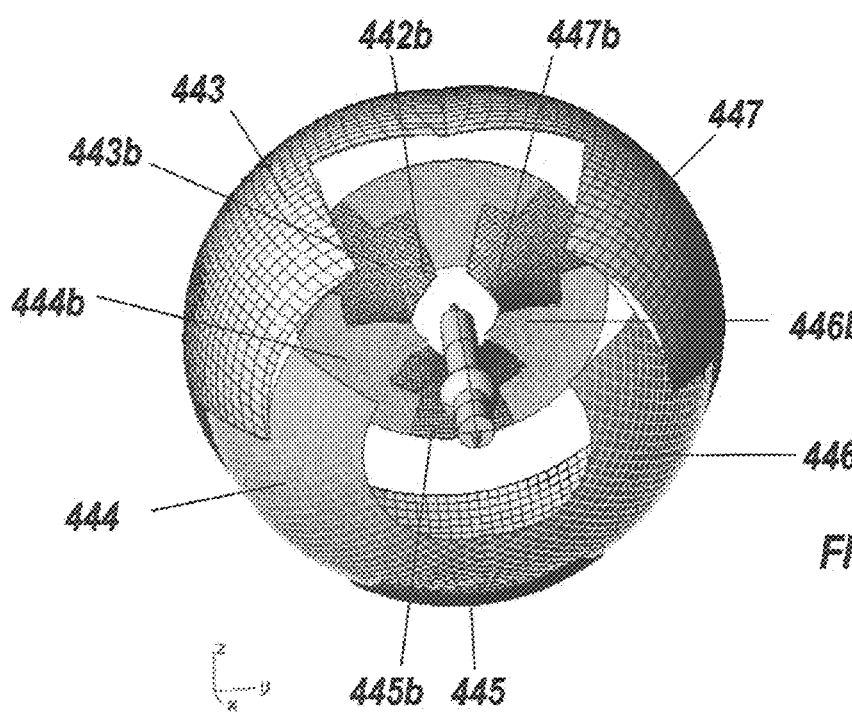
FIG. 44C is a cutaway perspective view of the finished reflector.

The selection of the sagittal-sector extension of the input mirrors of the device in FIG. 43A-43C can be changed from 90° degrees to any other value of the form-360°/M, where M is in an integer, M≧2. FIG. 44A-44C show the same design as FIG. 43A-43C but for M=3 and an etendue squeeze factor 1.5 (using tessellation of FIG. 39D). In this case, the device collects the light from lamp 441 and directs it to a target placed a finite distance (not shown in the figures), with the same functionality as an elliptical condenser. The resulting device has six symmetrical mirror pairs 442-442b to 447-447b.

3. Etendue-Rotating Optics

Figure 45A:
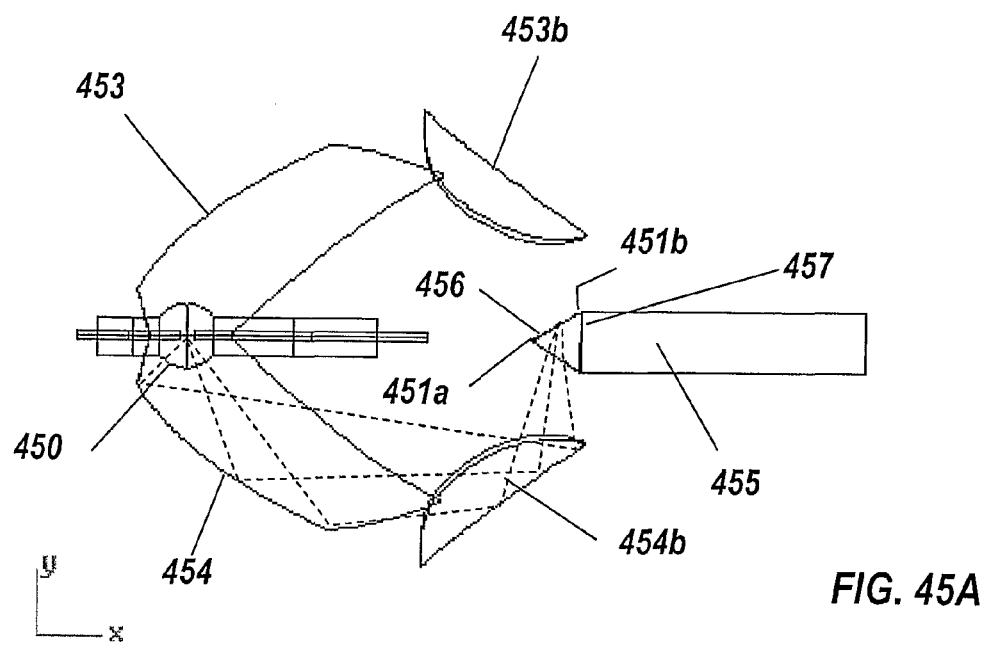
FIG. 45A is a side view of the design of an etendue-rotating lenticular condensing reflector system with an integrating rod.
Figure 45B:
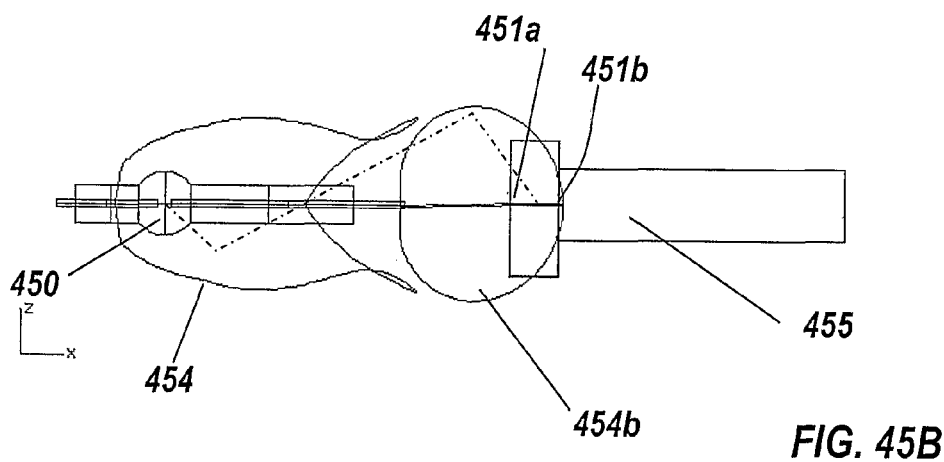
FIG. 45B shows some rays in the system of FIG. 45A.
Figure 45C:
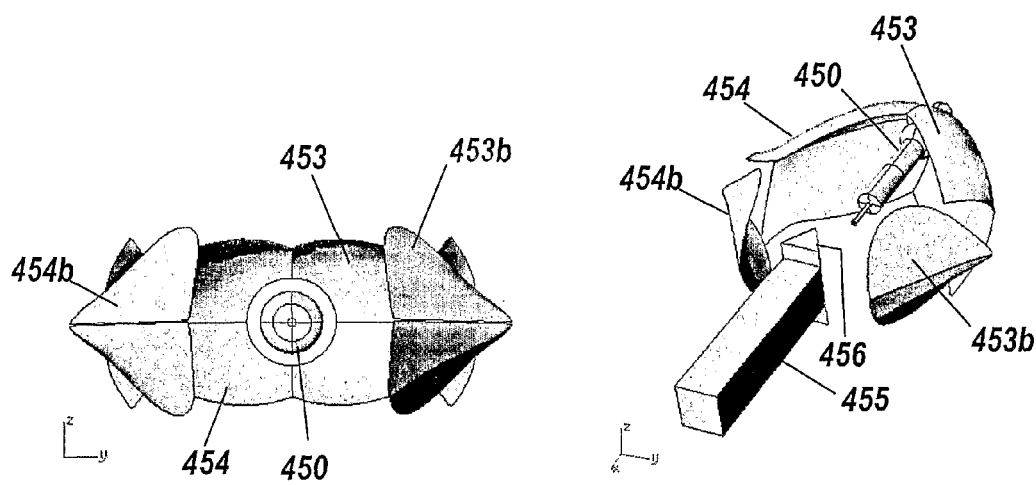
FIG. 45C shows a front and a cutaway perspective view of the condenser.

FIGS. 45A to 45C discloses an etendue-rotating optical design composed by mirrors. Here the target is located at a finite distance, but it can as easily be done for an infinite target. The 3D SMS method is used to calculate the two free-form mirrors 454 and 454b, which collect the light emitted by an arc (or filament) of light bulb 450 towards directions with negative y-values, and send it to the target, which is the inner face 456 of the prism 455. The SMS ribs of the design are calculated such that the 2-bundles generated at the two edge points of the arc along the x-axis are coupled to the edge points 451a and 451b of 456 at plane z=0 (see FIG. 45B). Therefore, the arc's projected images do not rotate, as desired.

The y-symmetric mirror pair 453 and 453b will work analogously for the light emitted by light bulb 450 towards directions with positive y-values, and will illuminate a y-symmetric target.

The illumination of 456 from mirror 454b will be totally internally reflected into the integration prism 455. The combined illumination of 453b and 454b and the TIR reflections will produce an equivalent target 457 illuminated with the required f-number centered along x-axis. Target 457 could be chosen, for instance, with 16:9 aspect ratio, and prism 455 will present a homogeneous irradiance at the exit.

The advantages of this device in FIG. 45A-C over the elliptical condenser are: (1) the collection efficiency is improved due to the better matching with rectangular apertures, (2) it presents a very low profile in the z-axis direction, and (3) the distance from arc 450 to the entry aperture of the prism at target 457 is also reduced. Advantages (2) and (3) are of interest for its application for compact projectors.

Figure 46A:
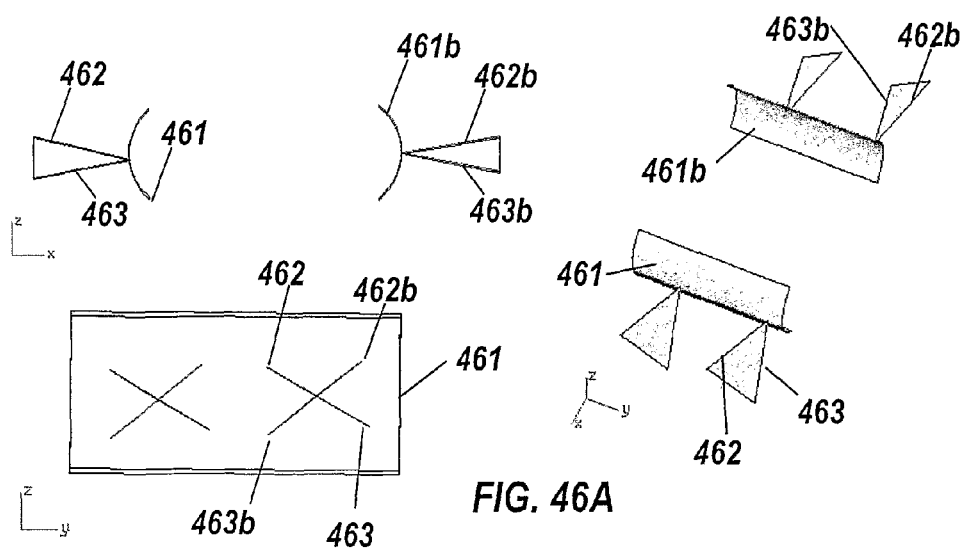
FIG. 46A shows the design principle for a free-form catadioptric condenser.

FIGS. 46A and 46B show a further etendue rotating optical design. The principle in which it is based is illustrated in FIG. 46A, which shows a linear lens pair 461 and 461b with the 2D cross section of a 1:1 inverting afocal system. This afocal system is 1:1 Keplerian (inverting) in one direction and 1:1 Galilean (non-inverting) in the transversal direction. Note that a 1:1 Galilean afocal system is just two parallel flat refracting surfaces. Fans of input and output rays are represented as isosceles triangles. The two equal-size sides of the isosceles triangles are the rays 462 and 463 at the input or the same rays at the output, labeled 462b and 463b. Since the lens pair is linear, the rays conserve its cosine q with respect to the axis of linear symmetry (y axis). Then if a ray proceeds towards increasing y at the input it must proceed towards increasing output at the exit. The 1:1 inverting afocal system is such that it changes the sign of the cosine r of the ray with respect the z axis (across the entry aperture). Thus the r at the output is −r at the input. Thus if the ray direction at the input is given by these 2 cosines (q,r) the direction at the output is given by (q,−r). For instance the ray 462 goes toward decreasing z at the input 461 and goes toward increasing z at the output 461b where it is labeled 462b. This ray proceeds toward increasing y at the input and at the output. In 3D, the linear lens transforms the plane fan of rays from 462 to 463 into a fan of rays which is the symmetric of the first one with respect the plane x-y as can be seen in the z-y view of FIG. 46A. Since this symmetry of the bundle is similar to a rotation, we will also use the etendue rotator name fit this etendue mirroring system (although strictly speaking the name is incorrect).

FIG. 46B discloses the etendue rotating optical device comprising a free-form lens that receives at its input the collimated light from the parabolic condenser 464. The lens comprises lenticular elements that transform the radially-oriented bundle emitted from axis line of the arc 465 into the x-axis oriented exit bundle 466. In the limit of small lens thickness, the lenticular element edge curves 467 are parabolas that bisect the radial coordinate lines 468 and the x-coordinate lines 469. The calculation of the 3D surfaces can be done, for instance, with the 3D SMS method.

4. Generalised Cartesian Oval Surfaces to Focus a 2-Bundle onto a Prescribed Curve A generalized Cartesian-oval surface is defined as the one that transforms a given input wavefront into a given output wavefront, whether by refraction or reflection.

Figure 49:
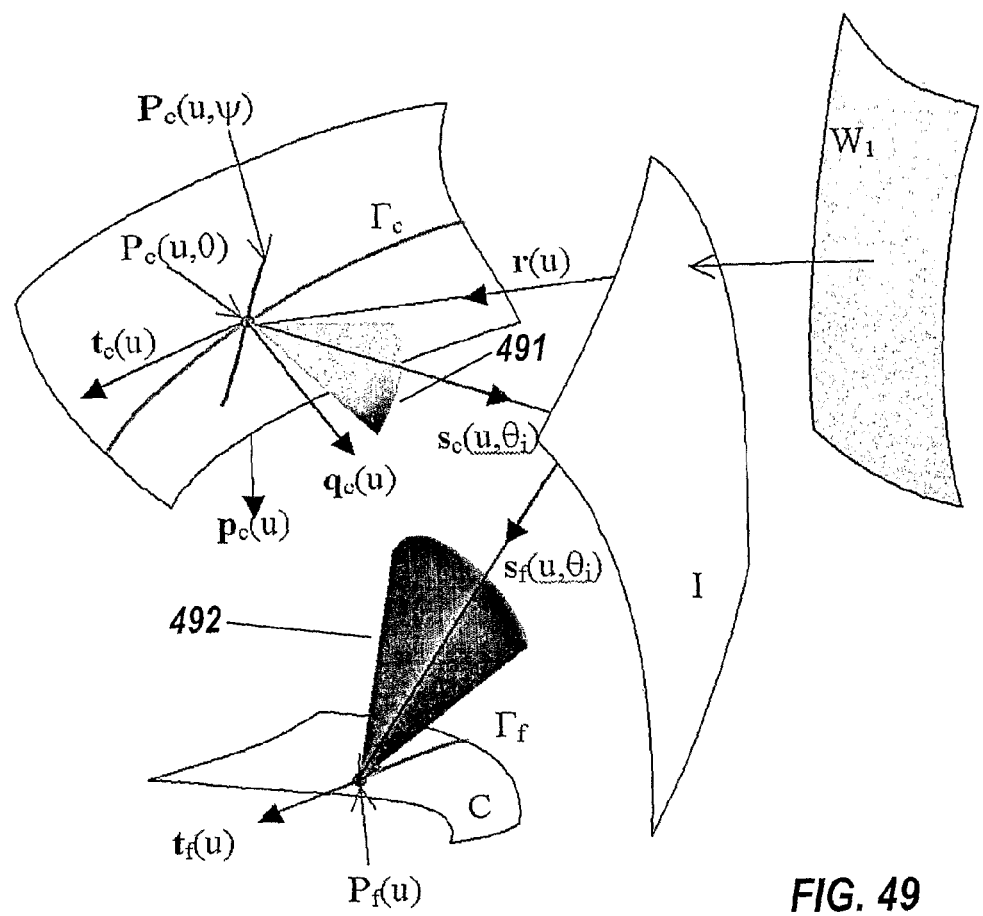
FIG. 49 shows how said RXIR is further lenticulated.

Sections 4.1 and 4.2, along with FIGS. 47 to 49, disclose the algorithms to calculate two particular types of generalized Cartesian ovals, which we will label as $COv(W,\Gamma_f,\Gamma_c)$ and $COv(W,\Gamma_f,\Gamma_c,I)$.

4.1. Algorithm $COv(W,\Gamma_f,\Gamma_c)$

The generalized Cartesian oval $COv(W,\Gamma_f,\Gamma_c)$ is defined as the surface that contains a particular curve $\Gamma_c$ and focuses a particular 2-bunble given by one of its wavefronts W to target curve $\Gamma_f$.

$COv(W,\Gamma_f,\Gamma_c)$ is a refracting or reflecting surface containing curve $\Gamma_c$ that deflects the rays of wavefront W sending them to points of the target $\Gamma_f$. This Cartesian-Oval surface is completely defined, given refractive indices $n_1$ and $n_2$ on either side of it, target curve $\Gamma_f$, design-wavefront W, and curve $\Gamma_c$ to be included in it. In the case of reflection $n_1=n_2$. FIG. 47 shows the design method:

1. Trace the rays of $W_1$ that intercept curve $\Gamma_c$, any position of which has unique parameter u. Ray r(u) of $W_1$ is that which intercepts $\Gamma_c$ at the point $P_c(u)$. FIG. 47 shows unit-vector $t_c(u)$ tangent to curve $\Gamma_c$ at intercept-point $P_c(u)$ 2. FIG. 47 shows cone 471 of rays exiting from $P_c(u)$ having an optical scalar product with $t_c(u)$ equalling that formed between r(u) and $t_c(u)$. That is, cone 471 comprises those rays having optical direction cosine with respect to $t_c(u)$ given by $c_1(u)=n_1 r \cdot t_c(u)$. Point $P_f(U)$ is the intersection of cone 471 with target curve $\Gamma_f$.

3. FIG. 47 also shows ray $r_i(u)$ linking $P_c(u)$ and $P_f(U)$. Unit vector $t_f(u)$ is tangent to target $\Gamma_f$ at intercept point $P_f(u)$, and forms optical direction cosine with ray $r_i(u)$ of $c_2(u)=n_2 r_i(u) \cdot t_f(u)$. Cone 472 comprises rays issuing from $P_f(u)$ that have optical direction cosine with $t_f(u)$ equal to $c_2(u)$. The set of rays formed by all such cones along target $\Gamma_f$ create a 2-parameter wavefront $W_2$. FIG. 47 also shows first parameter u and second parameter v, which indexes rays around cone 472.

4. Using parameter u along target $\Gamma_f$ (although any other would do), calculate the function l(u):

$$l(u) = \int_{u_0}^{u} c_2(u)\, dl$$
$$= \int_{u_0}^{u} n_2 r_i(u) \cdot t_f(u) \left|\frac{\partial P_f}{\partial u}\right| du$$
$$= \int_{u_0}^{u} n_2 r_i(u) \cdot \frac{\partial P_f}{\partial u}\, du$$

where dl is a differential of length along the target curve $\Gamma_f$ and $u_0$ is the parameter u at an endpoint of the curve.

5. Now consider a point P along the trajectory of one ray of $W_2$. This ray must cross the curve $\Gamma_f$ at some point $P_f(u)$. Define the optical path length for the point P:

$$l(P) = \mathrm{sign}\{t_f(u)\cdot(P-P_f(u))\}\,|P-P_f(u)| + l(u)$$

From this it is possible to calculate a wavefront surface $W_2$ such that all its points have a constant l(P).

6. Once $W_2$ has been calculated, then the standard Cartesian oval is calculated for wavefronts $W_1'$ and $W_2$, only imposing that it passes through a point of $\Gamma_c$ (any point is valid, since the method ensures that the Cartesian oval will contain the curve $\Gamma_c$).

Whenever such a calculation of $W_2$ may become troublesome, FIG. 48 shows an alternative fourth step:

4. Establish parameterisation v of the rays of the cone of optical direction cosine $c_2(u)$ with respect to $t_c(u)$, as shown in FIG. 48, where ray $r_i(u)$ corresponds to v=0. Move back along the rays of cone 481 departing from the point $P_f(u)$, and find the points $P_c(u,v)$ such that the optical path length from $W_1$ to $P_c(u,v)$ (denoted by $l(W_1,P_c(u,v))$) plus the optical path length from $P_c(u,v)$ to $P_f(u)$ is a constant value, i.e., $$l(W_1,P_c(u,v))+\mathrm{sign}\{t_f(u)\cdot(P_f(u)-P_c(u,v))\}|P_f(u)-P_c(u,v)|=l(W_1,P_c(u,0))+\mathrm{sign}\{t_f(u)\cdot(P_f(u)-P_c(u,0))\}|P_f(u)-P_c(u,0)|$$

The surface comprising all such points $P_c(u,v)$ is the Cartesian Oval linking $W_1$ and $W_2$.

4.2. Algorithm COv(W,$\Gamma_f$,$\Gamma_c$,I),

The generalized Cartesian oval COv(W,$\Gamma_f$,$\Gamma_c$,I) is the surface that contains a particular curve $\Gamma_c$ and focuses to target curve $\Gamma_f$ a particular wavefront $W_1$ that has to be first refracted at the surface I, then deflected at the Cartesian oval and finally reflected at the same surface I, as shown in FIG. 49.

1. Refract $W_1$ through surface I. For the remaining steps $W_1$ will denote the wavefront after this refraction.

2. For any value of parameter u along the curve $\Gamma_c$ calculate the point $P_c(u)$ and the ray vector r(u) of the ray of $W_1$ passing through $P_c(u)$. Let $t_c(u)$ be the unit vector tangent to $\Gamma_c$ at $P_c(u)$ and let $p_c(u)$, $q_c(u)$ be the unit vectors defined by the following equations.

$$p_c(u) = \frac{t_c(u)\times r(u)}{\sqrt{1-(t_c(u)\cdot r(u))^2}}$$

$$q_c(u) = t_c(u)\times p_c(u)$$

3. Calculate the optical direction cosine $c_1(u)$ with respect to $t_c(u)$, define as $c_1(u)=n_1 r(u)\cdot t_c(u)$.

4. Generate cone-of-rays 491 issuing from $P_c(u)$ with an optical direction cosine with respect to $t_c(u)$ equal to $c_1(u)$, i.e. those with ray vectors $s_c(u,\theta)$ given by $$s_c(u,\theta) = \frac{c_1(u)}{n_2}t_c(u) + \sqrt{1-\left(\frac{c_1(u)}{n_2}\right)^2}\,(p_c(u)\sin\theta + q_c(u)\cos\theta)$$

5. Trace this cone of rays through deflection at surface I and find the surface $\Gamma_i(u,\theta)$ formed by the rays after this deflection.

6. Find the intersection point $P_f(u)$ between the surface $\Gamma_i(u,\theta)$ and the curve $\Gamma_f$ and find the value of $\theta$ for this point, $\theta_i$. Calculate the unit vector $t_f(u)$ tangent to the curve $\Gamma_f$ at the point $P_f(u)$. Calculate the point I(u) at which the ray corresponding to $\theta_i$ is deflected at surface I.

7. Calculate $c_2(u)=n_2\, s_f(u,\theta_i)\cdot t_f(u)\cdot s_f(u,\theta_i)$ is the ray vector of ray $s_c(u,\theta)$ after reflection at surface I.

8. Calculate the optical path length from wavefront $W_1$ to the point $P_f(u)$ as ($C_o$ is the function giving the optical path length from a point after the first refraction at surface I referred in step 1)

$$l(u)=C_o(W_1,P_c(u),n_1)+n_2(I(u)-P_c(u))\cdot s_c(u,\theta_i) + n_2(P_f(u)-I(u))\cdot s_f(u,\theta_i)$$

9. Calculate the vectors $$p_f(u) = \frac{t_f(u)\times s_f(u,\theta_i)}{\sqrt{1-(t_f(u)\cdot s_f(u,\theta_i))^2}}$$

$$q_f(u) = t_f(u)\times p_f(u)$$

10. Generate cone-of-rays 492 at $P_f(u)$ with an optical direction cosine with respect to $t_f(u)$ equal to $c_2(u)$, i.e. those with ray vectors $s_f(u,\psi)$ $$s_f(u,\psi) = \frac{c_2(u)}{n_2}t_f(u) - \sqrt{1-\left(\frac{c_2(u)}{n_2}\right)^2}\,(p_f(u)\sin\psi + q_f(u)\cos\psi)$$

Note that for $\psi=0$, $s_f(u,\psi)=s_f(u,\theta_i)$

11. Reflect these rays back through surface I (the ray vectors before reflection at surface I are consistently called $s_c(u,\psi)$) and find the points $P_c(u,\psi)$ along the trajectories of these rays for which:

$$C_o(W_1,P_c(u,\psi),n_1)+n_2(I(u,\psi)-P_c(u,\psi))\cdot s_c(u,\psi)+n_2(P_f(u)-I(u,\psi))\cdot s_f(u,\psi)=l(u)$$

These points $P_c(u,\psi)$ define the desired Cartesian Oval, COv(W,$\Gamma_f$,$\Gamma_c$,I). Note that since $s_f(u,\psi)=s_f(u,\theta_i)$ for $\psi=0$, then for $\psi=0$ $P_c(u,\psi)=P_c(u)$.

Some embodiments are based on the design of free-form optical surfaces that control the light beam by three methods: etendue rotation, etendue-squeezing, and Kohler integration. These three methods of light control, along with the degree of freedom provided by the use of free-form optics, open a novel range of capabilities and devices, unattainable with state-of-the-art optics, in the fields of headlamps, condensers, or LED color mixing.

Design methods are disclosed for illumination lenses, with numerous embodiments, comprising pairs of free-form surfaces. These free-form lenticulations can beneficially provide robust tolerance to variations in position or luminosity of multiple light sources. Additionally or alternatively, they provide unprecedented sharpness of a cutoff line.

In addition, embodiments are also given for the particular case where the lenticulations have rotational symmetry. In this case, the Kohler integration is carried out only in the radial direction.

While the invention herein disclosed has been described by means of specific embodiments and applications thereof, numerous modifications and variations could be made thereto by those skilled in the art without departing from the scope of the invention set forth in the claims.

What is claimed is:

1. A rotation symmetric optical system receiving light from a source and sending it to a target, the system comprising:
   four optical surfaces, which are ordered by a light trip from the source towards the target,
   wherein the four optical surfaces comprise a first surface, a second surface, a third surface, and a fourth surface;
   wherein the second surface defines a change of material and refractive index and where two of the four surfaces have coordinated lenticulations forming a Kohler radial integrator such that one surface of the Kohler radial integrator images the source onto another surface of the Kohler radial integrator and the another surface of the Kohler radial integrator images said one surface onto the target.

2. The system of claim 1, wherein the two surfaces forming the Kohler integrator are the third and fourth surfaces where the third surface comprises a primary mirror and the fourth surface comprises a secondary mirror.

3. The system of claim 1, wherein the two surfaces forming the Kohler integrator are the third and fourth surfaces where the third surface comprises a primary mirror and the fourth surface comprises a refracting surface.

4. The system of claim 1, the first surface is a flat refractive surface, and the second surface, the third surface and the fourth surface are refractive surfaces;
   wherein the first flat refractive surface and the second, third and fourth refractive surfaces define changes of material and refractive index.

5. The system of claim 4, wherein the two surfaces forming the Kohler integrator are the second and the third refracting surfaces.

6. The system of claim 5, wherein the second refractive surface has Fresnel faceting.

7. The system of claim 1, wherein the fourth surface is a refractive dome above the target.

8. The system of claim 1, further comprising:
   five optical surfaces, which are ordered by the sight trip from the source toward the target;
   the five optical surfaces comprising the first surface where the first surface comprises a refractive surface, the second surface where the second surface comprises a refractive surface, the third surface comprises a primary mirror surface, the fourth surface comprises a secondary mirror surface, and a refractive dome;
   wherein the refractive dome is positioned above the target;
   wherein the first refractive surface and the second refractive surface define a change of material and refractive index; and
   wherein two of the five surfaces have the coordinated lenticulations forming the Kohler radial integrator with the source and the target.

9. The system of claim 8, wherein the two surfaces forming the Kohler integrator comprise the primary mirror surface and the secondary mirror surface, and where the second refractive, surface does not define a change of material and thus the material after the first surface is the same until the light reaches the dome forming a single solid piece.

10. The system of claim 8, wherein the two surfaces forming the Kohler integrator are the first and second refractive surfaces.

11. The system of claim 8, wherein the two surfaces forming the Kohler integrator are the first refractive surface and the primary mirror surface.

12. The system of claim 8, wherein the two surfaces forming the Kohler integrator are the first refractive surface and the secondary mirror surface.

13. The system of claim 8, wherein the two surfaces forming the Kohler integrator are the first refractive surface and the refractive dome.

14. The system of claim 8, wherein the two surfaces forming the Kohler integrator are the second refractive surface and the primary mirror surface.

15. The system of claim 14, wherein the first surface is a first refractive surface and the second surface is a second refractive surface, where the first refractive surface further defines a change of material and refractive index.

16. The system of claim 15, wherein the two surfaces forming the Kohler integrator are the third surface and the refractive dome where the third surface comprises a mirror.

17. The system of claim 15, wherein the two surfaces forming the Kohler integrator are the first refractive surface and the refractive dome.

18. The system of claim 15, wherein the two surfaces forming the Kohler integrator are the second refractive surface and the refractive dome.

19. The system of claim 15, wherein the two surfaces forming the Kohler integrator are the first refractive surface and the third surface, where the third surface comprises a mirror.

20. The system of claim 15, wherein the two surfaces forming the Kohler integrator are the second refractive surface and the third surface, where the third surface comprises a mirror.

21. The system of claim 8, wherein the two surfaces forming the Kohler integrator are the second refractive surface and the secondary mirror surface.

22. The system of claim 8, wherein the two surfaces forming the Kohler integrator are the second refractive surface and the refractive dome.

23. The system of claim 8, wherein the two surfaces forming the Kohler integrator are the primary mirror surface and the refractive dome.

24. The system of claim 8, wherein the two surfaces forming the Kohler integrator are the secondary mirror and the refractive dome.

* * * * *